United States Patent [19]

Carter et al.

[11] 3,766,521

[45] Oct. 16, 1973

[54] MULTIPLE B-ADJACENT GROUP ERROR CORRECTION AND DETECTION CODES AND SELF-CHECKING TRANSLATORS THEREFOR

[75] Inventors: William C. Carter, Ridgefield, Conn.; Edward P. Hsieh, Yorktown Heights; Aspi B. Wadia, Chappaqua, both of N.Y.

[73] Assignee: International Business Machines Corporation, Armonk, N.Y.

[22] Filed: Sept. 26, 1972

[21] Appl. No.: 247,071

[52] U.S. Cl. ................ 340/146.1 AL, 235/153 AM

[51] Int. Cl. ......................... H04l 1/10, G11c 29/00

[58] Field of Search............................ 235/153 AM; 340/146.1 AL

[56] References Cited

UNITED STATES PATENTS 3,697,949 10/1972 Carter et al. .............. 340/146.1 AL

OTHER PUBLICATIONS

Patel, A. M., Error Correcting Code for Hybrid Errors, In IBM Tech. Disc. Bull. 14(4): p. 1288–1290, Sept. 1971.

*Primary Examiner*—Eugene G. Botz
*Assistant Examiner*—R. Stephen Dildine, Jr.
*Attorney*—Isidore Match et al.

[57] ABSTRACT

Novel error correction and detection codes and self-checking translators therefor are disclosed. A first of these codes is a $t$ b-adjacent bit group error correcting d-adjacent bit group error detecting code using a quantity of $2t+d$ groups of $b$ check bits. This code with a b-bit BSM (basic storage module) memory organization is capable of correcting b-adjacent errors due to failures in any $t$ basic storage modules, detecting b-adjacent errors due to failures in any $t+d$ basic storage modules, and, because of the translator design, detecting with high probability b-adjacent errors in $2t+2d-1$ storage modules where $1 \leq t$, $0 \leq d$. If $k$ b-bit BSM's are needed for data, then $t$ and $d$ may be chosen as any integers such that $k+2t+d \leq 2^b+1$, and $2t+d \leq 2^b-1$. In this case $k+2+d$ b-bit BSM's are needed for coded word storage. Correction of b-adjacent errors means that if errors occur in from 1 to $b$ bits in any pattern in the output of a b-bit BSM, these bit errors will be corrected. Self-checking translators are provided for these codes which employ substantially less circuitry than known translators for the same purpose. The failure-tolerance capabilities of these translators are such that every single failure in the translator circuitry is either detected or does not cause erroneous output and the probable accumulation of undetected failures in the translator circuitry before ultimate detection does not produce any erroneous output that goes undetected.

28 Claims, 45 Drawing Figures

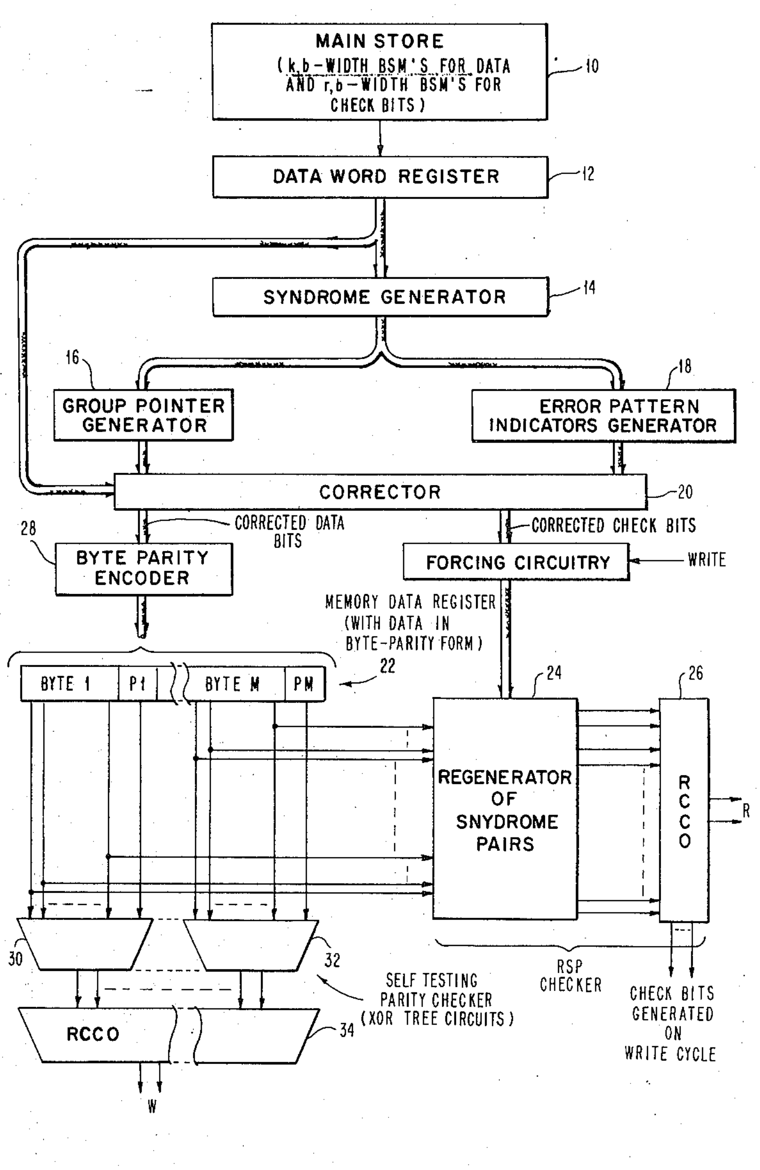
MAIN STORE
( k,b-WIDTH BSM'S FOR DATA
AND r,b-WIDTH BSM'S FOR
CHECK BITS )
10
DATA WORD REGISTER
12
SYNDROME GENERATOR
14
16
GROUP POINTER
GENERATOR
18
ERROR PATTERN
INDICATORS GENERATOR
CORRECTOR
20
CORRECTED DATA
BITS
CORRECTED CHECK BITS
28
BYTE PARITY
ENCODER
FORCING CIRCUITRY
WRITE
MEMORY DATA REGISTER
(WITH DATA IN
BYTE-PARITY FORM)
22
BYTE 1
P1
BYTE M
PM
24
26
REGENERATOR
OF
SNYDROME
PAIRS
RCCO
R
30
32
SELF TESTING
PARITY CHECKER
(XOR TREE CIRCUITS)
RSP
CHECKER
CHECK BITS
GENERATED
ON
WRITE CYCLE
RCCO
34
W

PATENTED OCT 16 1973 3,766,521

SHEET 04 OF 39

PATENTED OCT 16 1973

3,766,521

SHEET 19 OF 39

REGENERATOR OF SYNDROME PAIRS (B) 23

| FIG. 4A |
|---|
| FIG. 4B |

FIG. 4

FIG. 4A

EQUATIONS PERTAINING TO SYNDROME GENERATOR

DATA WORD = $d_{1,1}, d_{1,2}, d_{1,3}, d_{1,4}, \ldots, d_{12,1}, d_{12,2}, d_{12,3}, d_{12,4}$ $$S_1 = \begin{bmatrix} s_1 \\ s_2 \\ s_3 \\ s_4 \end{bmatrix} \quad S_2 = \begin{bmatrix} s_5 \\ s_6 \\ s_7 \\ s_8 \end{bmatrix} \quad S_3 = \begin{bmatrix} s_9 \\ s_{10} \\ s_{11} \\ s_{12} \end{bmatrix} \quad S_4 = \begin{bmatrix} s_{13} \\ s_{14} \\ s_{15} \\ s_{16} \end{bmatrix}$$

$s_i = d_{1,i} \oplus d_{2,i} \oplus \cdots \oplus d_{12,i}$ FOR $i = 1,2,3,4$ $$s_5 = d_{1,2} \oplus d_{2,1} \oplus d_{2,2} \oplus d_{3,3} \oplus d_{4,1} \oplus d_{4,3} \oplus d_{5,1} \oplus d_{5,4} \oplus d_{6,4} \oplus d_{7,2} \oplus d_{7,3} \oplus d_{8,1} \oplus d_{8,2} \oplus d_{8,3} \oplus d_{10,1}$$

$$s_6 = d_{1,3} \oplus d_{2,2} \oplus d_{2,3} \oplus d_{3,1} \oplus d_{3,4} \oplus d_{4,1} \oplus d_{4,2} \oplus d_{4,4} \oplus d_{5,1} \oplus d_{5,2} \oplus d_{6,1} \oplus d_{7,1} \oplus d_{7,3} \oplus d_{7,4} \oplus d_{8,1} \oplus d_{8,2} \oplus d_{8,3} \oplus d_{8,4} \oplus d_{10,2}$$

$$s_7 = d_{1,1} \oplus d_{1,4} \oplus d_{2,1} \oplus d_{2,3} \oplus d_{2,4} \oplus d_{3,1} \oplus d_{3,2} \oplus d_{4,1} \oplus d_{4,2} \oplus d_{4,3} \oplus d_{5,2} \oplus d_{5,3} \oplus d_{6,2} \oplus d_{7,2} \oplus d_{7,4} \oplus d_{8,2} \oplus d_{8,3} \oplus d_{8,4} \oplus d_{10,3}$$

$$s_8 = d_{1,1} \oplus d_{2,1} \oplus d_{2,4} \oplus d_{3,2} \oplus d_{4,2} \oplus d_{4,4} \oplus d_{5,3} \oplus d_{6,3} \oplus d_{6,4} \oplus d_{7,1} \oplus d_{7,2} \oplus d_{8,1} \oplus d_{8,2} \oplus d_{8,4} \oplus d_{10,4}$$

$$s_9 = d_{1,3} \oplus d_{2,1} \oplus d_{2,4} \oplus d_{3,1} \oplus d_{3,2} \oplus d_{4,2} \oplus d_{5,1} \oplus d_{5,3} \oplus d_{5,4} \oplus d_{6,3} \oplus d_{6,4} \oplus d_{7,1} \oplus d_{7,2} \oplus d_{7,3} \oplus d_{8,2} \oplus d_{8,3} \oplus d_{11,1}$$

$$s_{10} = d_{1,1} \oplus d_{1,4} \oplus d_{2,1} \oplus d_{2,2} \oplus d_{2,4} \oplus d_{3,2} \oplus d_{3,3} \oplus d_{4,3} \oplus d_{5,2} \oplus d_{5,4} \oplus d_{6,4} \oplus d_{7,1} \oplus d_{7,2} \oplus d_{7,3} \oplus d_{7,4} \oplus d_{8,1} \oplus d_{8,3} \oplus d_{8,4} \oplus d_{11,2}$$

$$s_{11} = d_{1,1} \oplus d_{1,2} \oplus d_{2,1} \oplus d_{2,2} \oplus d_{2,3} \oplus d_{3,1} \oplus d_{3,3} \oplus d_{3,4} \oplus d_{4,1} \oplus d_{4,4} \oplus d_{5,1} \oplus d_{5,3} \oplus d_{6,1} \oplus d_{7,1} \oplus d_{7,2} \oplus d_{7,4} \oplus d_{8,2} \oplus d_{8,4} \oplus d_{11,3}$$

$$s_{12} = d_{1,2} \oplus d_{2,2} \oplus d_{2,4} \oplus d_{3,1} \oplus d_{3,4} \oplus d_{4,1} \oplus d_{5,2} \oplus d_{5,3} \oplus d_{6,2} \oplus d_{6,3} \oplus d_{6,4} \oplus d_{7,1} \oplus d_{7,2} \oplus d_{7,4} \oplus d_{8,1} \oplus d_{8,2} \oplus d_{11,4}$$

$$s_{13} = d_{1,1} \oplus d_{1,4} \oplus d_{2,2} \oplus d_{2,3} \oplus d_{2,4} \oplus d_{3,1} \oplus d_{3,3} \oplus d_{3,4} \oplus d_{4,1} \oplus d_{4,2} \oplus d_{4,4} \oplus d_{5,1} \oplus d_{5,2} \oplus d_{5,4} \oplus d_{6,2} \oplus d_{6,3} \oplus d_{6,4} \oplus d_{7,1} \oplus d_{8,1} \oplus d_{12,1}$$

$$s_{14} = d_{1,1} \oplus d_{1,2} \oplus d_{2,3} \oplus d_{2,4} \oplus d_{3,2} \oplus d_{3,4} \oplus d_{4,1} \oplus d_{4,2} \oplus d_{4,3} \oplus d_{5,1} \oplus d_{5,2} \oplus d_{5,3} \oplus d_{6,3} \oplus d_{6,4} \oplus d_{7,2} \oplus d_{8,2} \oplus d_{12,2}$$

$$s_{15} = d_{1,2} \oplus d_{1,3} \oplus d_{2,4} \oplus d_{3,1} \oplus d_{3,3} \oplus d_{4,1} \oplus d_{4,2} \oplus d_{4,3} \oplus d_{4,4} \oplus d_{5,1} \oplus d_{5,2} \oplus d_{5,3} \oplus d_{5,4} \oplus d_{6,4} \oplus d_{7,3} \oplus d_{8,3} \oplus d_{12,3}$$

$$s_{16} = d_{1,3} \oplus d_{2,1} \oplus d_{2,2} \oplus d_{2,3} \oplus d_{2,4} \oplus d_{3,2} \oplus d_{3,3} \oplus d_{4,1} \oplus d_{4,3} \oplus d_{5,1} \oplus d_{5,3} \oplus d_{6,1} \oplus d_{6,2} \oplus d_{6,3} \oplus d_{6,4} \oplus d_{7,4} \oplus d_{8,4} \oplus d_{12,4}$$

FIG. 4B

FIG. 5

EQUATIONS
PERTAINING TO GROUP POINTER GENERATOR $$G_{1,2} = [\bar{s}_9 = (\bar{s}_5 \oplus \bar{s}_2 \oplus \bar{s}_3)] \wedge [\bar{s}_{10} = (\bar{s}_6 \oplus \bar{s}_1 \oplus \bar{s}_3 \oplus \bar{s}_4)]$$
$$\wedge [\bar{s}_{11} = (\bar{s}_7 \oplus \bar{s}_2 \oplus \bar{s}_4)] \wedge [\bar{s}_{12} = (\bar{s}_8 \oplus \bar{s}_1 \oplus \bar{s}_2)]$$
$$\wedge [\bar{s}_{13} = (\bar{s}_9 \oplus \bar{s}_6 \oplus \bar{s}_7)] \wedge [\bar{s}_{14} = (\bar{s}_{10} \oplus \bar{s}_5 \oplus \bar{s}_7 \oplus \bar{s}_8)]$$
$$\wedge [\bar{s}_{15} = (\bar{s}_{11} \oplus \bar{s}_6 \oplus \bar{s}_8)] \wedge [\bar{s}_{16} = (\bar{s}_{12} \oplus \bar{s}_5 \oplus \bar{s}_6)]$$

$$G_{3,4} = [\bar{s}_9 = (\bar{s}_5 \oplus \bar{s}_1 \oplus \bar{s}_2 \oplus \bar{s}_3)] \wedge [\bar{s}_{10} = (\bar{s}_6 \oplus \bar{s}_1 \oplus \bar{s}_2 \oplus \bar{s}_3 \oplus \bar{s}_4)]$$
$$\wedge [\bar{s}_{11} = (\bar{s}_7 \oplus \bar{s}_2 \oplus \bar{s}_3 \oplus \bar{s}_4)] \wedge [\bar{s}_{12} = (\bar{s}_8 \oplus \bar{s}_1 \oplus \bar{s}_2 \oplus \bar{s}_4)]$$
$$\wedge [\bar{s}_{13} = (\bar{s}_9 \oplus \bar{s}_5 \oplus \bar{s}_6 \oplus \bar{s}_7)] \wedge [\bar{s}_{14} = (\bar{s}_{10} \oplus \bar{s}_5 \oplus \bar{s}_6 \oplus \bar{s}_7 \oplus \bar{s}_8)]$$
$$\wedge [\bar{s}_{15} = (\bar{s}_{11} \oplus \bar{s}_6 \oplus \bar{s}_7 \oplus \bar{s}_8)] \wedge [\bar{s}_{16} = (\bar{s}_{12} \oplus \bar{s}_5 \oplus \bar{s}_6 \oplus \bar{s}_8)]$$

$$G_{5,6} = [\bar{s}_9 = (\bar{s}_5 \oplus \bar{s}_3)] \wedge [\bar{s}_{10} = (\bar{s}_6 \oplus \bar{s}_1 \oplus \bar{s}_4)] \wedge [\bar{s}_{11} = (\bar{s}_7 \oplus \bar{s}_1 \oplus \bar{s}_2)]$$
$$\wedge [\bar{s}_{12} = (\bar{s}_8 \oplus \bar{s}_2)] \wedge [\bar{s}_{13} = (\bar{s}_9 \oplus \bar{s}_7)] \wedge [\bar{s}_{14} = (\bar{s}_{10} \oplus \bar{s}_5 \oplus \bar{s}_8)]$$
$$\wedge [\bar{s}_{15} = (\bar{s}_{11} \oplus \bar{s}_5 \oplus \bar{s}_6)] \wedge [\bar{s}_{16} = (\bar{s}_{12} \oplus \bar{s}_6)]$$

$$G_{7,8} = [\bar{s}_9 = (\bar{s}_5 \oplus \bar{s}_1)] \wedge [\bar{s}_{10} = (\bar{s}_6 \oplus \bar{s}_2)] \wedge [\bar{s}_{11} = (\bar{s}_7 \oplus \bar{s}_3)]$$
$$\wedge [\bar{s}_{12} = (\bar{s}_8 \oplus \bar{s}_4)] \wedge [\bar{s}_{13} = (\bar{s}_9 \oplus \bar{s}_5)] \wedge [\bar{s}_{14} = (\bar{s}_{10} \oplus \bar{s}_6)]$$
$$\wedge [\bar{s}_{15} = (\bar{s}_{11} \oplus \bar{s}_7)] \wedge [\bar{s}_{16} = (\bar{s}_{12} \oplus \bar{s}_8)]$$

$$G_{9,10} = \bigwedge_{i=8}^{16} (\bar{s}_i = 0) = s_8 \wedge s_9 \wedge s_{10} \cdots\cdots \wedge s_{16}$$

$$G_{11,12} = \bigwedge_{i=1}^{8} (\bar{s}_i = 0) = s_1 \wedge s_2 \wedge s_3 \cdots\cdots \wedge s_8$$

FIG.6A

EQUATIONS PERTAINING TO ERROR PATTERN GENERATOR

FIG.6

| FIG. 6A |
| --- |
| FIG. 6B |

$$e_{1,1} = \bar{s}_1 \oplus \bar{s}_2 \oplus \bar{s}_5$$

$$e_{1,2} = \bar{s}_2 \oplus \bar{s}_3 \oplus \bar{s}_6$$

$$e_{1,3} = \bar{s}_1 \oplus \bar{s}_3 \oplus \bar{s}_4 \oplus \bar{s}_7$$

$$e_{1,4} = \bar{s}_1 \oplus \bar{s}_4 \oplus \bar{s}_8$$

$$e_{2,1} = \bar{s}_2 \oplus \bar{s}_5$$

$$e_{2,2} = \bar{s}_3 \oplus \bar{s}_6$$

$$e_{2,3} = \bar{s}_1 \oplus \bar{s}_4 \oplus \bar{s}_7$$

$$e_{2,4} = \bar{s}_1 \oplus \bar{s}_8$$

$$e_{3,1} = \bar{s}_1 \oplus \bar{s}_3 \oplus \bar{s}_5$$

$$e_{3,2} = \bar{s}_1 \oplus \bar{s}_2 \oplus \bar{s}_4 \oplus \bar{s}_6$$

$$e_{3,3} = \bar{s}_1 \oplus \bar{s}_2 \oplus \bar{s}_3 \oplus \bar{s}_7$$

$$e_{3,4} = \bar{s}_2 \oplus \bar{s}_4 \oplus \bar{s}_8$$

$$e_{4,1} = \bar{s}_3 \oplus \bar{s}_5$$

$$e_{4,2} = \bar{s}_1 \oplus \bar{s}_4 \oplus \bar{s}_6$$

$$e_{4,3} = \bar{s}_1 \oplus \bar{s}_2 \oplus \bar{s}_7$$

$$e_{4,4} = \bar{s}_2 \oplus \bar{s}_8$$

$$e_{5,1} = \bar{s}_4 \oplus \bar{s}_5$$

$$e_{5,2} = \bar{s}_1 \oplus \bar{s}_6$$

$$e_{5,3} = \bar{s}_2 \oplus \bar{s}_7$$

FIG.6B $e_{5,4} = \bar{s}_3 \oplus \bar{s}_4 \oplus \bar{s}_8$ $e_{6,1} = \bar{s}_1 \oplus \bar{s}_4 \oplus \bar{s}_5$ $e_{6,2} = \bar{s}_1 \oplus \bar{s}_2 \oplus \bar{s}_6$ $e_{6,3} = \bar{s}_2 \oplus \bar{s}_3 \oplus \bar{s}_7$ $e_{6,4} = \bar{s}_3 \oplus \bar{s}_8$ $e_{7,1} = \bar{s}_1 \oplus \bar{s}_2 \oplus \bar{s}_3 \oplus \bar{s}_5$ $e_{7,2} = \bar{s}_1 \oplus \bar{s}_2 \oplus \bar{s}_3 \oplus \bar{s}_4 \oplus \bar{s}_6$ $e_{7,3} = \bar{s}_2 \oplus \bar{s}_3 \oplus \bar{s}_4 \oplus \bar{s}_7$ $e_{7,4} = \bar{s}_1 \oplus \bar{s}_2 \oplus \bar{s}_4 \oplus \bar{s}_8$ $e_{8,1} = \bar{s}_2 \oplus \bar{s}_4 \oplus \bar{s}_5$ $e_{8,2} = \bar{s}_1 \oplus \bar{s}_3 \oplus \bar{s}_4 \oplus \bar{s}_6$ $e_{8,3} = \bar{s}_2 \oplus \bar{s}_4 \oplus \bar{s}_7$ $e_{8,4} = \bar{s}_1 \oplus \bar{s}_2 \oplus \bar{s}_8$ $e_{9,1} = \bar{s}_1$ $e_{9,2} = \bar{s}_2$ $e_{9,3} = \bar{s}_3$ $e_{9,4} = \bar{s}_4$ $e_{10,1} = \bar{s}_5$ $e_{10,2} = \bar{s}_6$ $e_{10,3} = \bar{s}_7$ $e_{10,4} = \bar{s}_8$ $e_{11,1} = \bar{s}_9$ $e_{11,2} = \bar{s}_{10}$ $e_{11,3} = \bar{s}_{11}$ $e_{11,4} = \bar{s}_{12}$ $e_{12,1} = \bar{s}_{13}$ $e_{12,2} = \bar{s}_{14}$ $e_{12,3} = \bar{s}_{15}$ $e_{12,4} = \bar{s}_{16}$

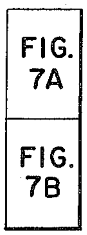

FIG. 7

FIG. 7A

EQUATIONS PERTAINING TO REGENERATION OF SYNDROME PAIRS $$s_{5,0} = \hat{d}_{1,2} \oplus \hat{d}_{2,1} \oplus \hat{d}_{2,2} \oplus \hat{d}_{3,3} \oplus \hat{d}_{4,1} \oplus \hat{d}_{4,3} \oplus \hat{d}_{5,1} \oplus \hat{d}_{5,4}$$

$$s_{5,1} = \hat{d}_{6,4} \oplus \hat{d}_{7,2} \oplus \hat{d}_{7,3} \oplus \hat{d}_{8,1} \oplus \hat{d}_{8,2} \oplus \hat{d}_{8,3} \oplus \hat{d}_{10,1}$$

$$s_{6,0} = \hat{d}_{1,3} \oplus \hat{d}_{2,2} \oplus \hat{d}_{2,3} \oplus \hat{d}_{3,1} \oplus \hat{d}_{3,4} \oplus \hat{d}_{4,1} \oplus \hat{d}_{4,2} \oplus \hat{d}_{4,4} \oplus \hat{d}_{5,1} \oplus \hat{d}_{5,2}$$

$$s_{6,1} = \hat{d}_{6,1} \oplus \hat{d}_{7,1} \oplus \hat{d}_{7,3} \oplus \hat{d}_{7,4} \oplus \hat{d}_{8,1} \oplus \hat{d}_{8,2} \oplus \hat{d}_{8,3} \oplus \hat{d}_{8,4} \oplus \hat{d}_{10,2}$$

$$s_{7,0} = \hat{d}_{1,1} \oplus \hat{d}_{1,4} \oplus \hat{d}_{2,1} \oplus \hat{d}_{2,3} \oplus \hat{d}_{2,4} \oplus \hat{d}_{3,1} \oplus \hat{d}_{3,2} \oplus \hat{d}_{4,1} \oplus \hat{d}_{4,2} \oplus \hat{d}_{4,3}$$

$$s_{7,1} = \hat{d}_{5,2} \oplus \hat{d}_{5,3} \oplus \hat{d}_{6,2} \oplus \hat{d}_{7,2} \oplus \hat{d}_{7,4} \oplus \hat{d}_{8,2} \oplus \hat{d}_{8,3} \oplus \hat{d}_{8,4} \oplus \hat{d}_{10,3}$$

$$s_{8,0} = \hat{d}_{1,1} \oplus \hat{d}_{2,1} \oplus \hat{d}_{2,4} \oplus \hat{d}_{3,2} \oplus \hat{d}_{4,2} \oplus \hat{d}_{4,4} \oplus \hat{d}_{5,3} \oplus \hat{d}_{6,3}$$

$$s_{8,1} = \hat{d}_{6,4} \oplus \hat{d}_{7,1} \oplus \hat{d}_{7,2} \oplus \hat{d}_{8,1} \oplus \hat{d}_{8,2} \oplus \hat{d}_{8,4} \oplus \hat{d}_{10,4}$$

$$s_{9,0} = \hat{d}_{1,3} \oplus \hat{d}_{2,1} \oplus \hat{d}_{2,4} \oplus \hat{d}_{3,1} \oplus \hat{d}_{3,2} \oplus \hat{d}_{4,2} \oplus \hat{d}_{5,1} \oplus \hat{d}_{5,3} \oplus \hat{d}_{5,4}$$

$$s_{9,1} = \hat{d}_{6,3} \oplus \hat{d}_{6,4} \oplus \hat{d}_{7,1} \oplus \hat{d}_{7,2} \oplus \hat{d}_{7,3} \oplus \hat{d}_{8,2} \oplus \hat{d}_{8,3} \oplus \hat{d}_{11,1}$$

$$s_{10,0} = \hat{d}_{1,1} \oplus \hat{d}_{1,4} \oplus \hat{d}_{2,1} \oplus \hat{d}_{2,2} \oplus \hat{d}_{2,4} \oplus \hat{d}_{3,2} \oplus \hat{d}_{3,3} \oplus \hat{d}_{4,3} \oplus \hat{d}_{5,2} \oplus \hat{d}_{5,4}$$

$$s_{10,1} = \hat{d}_{6,4} \oplus \hat{d}_{7,1} \oplus \hat{d}_{7,2} \oplus \hat{d}_{7,3} \oplus \hat{d}_{7,4} \oplus \hat{d}_{8,1} \oplus \hat{d}_{8,3} \oplus \hat{d}_{8,4} \oplus \hat{d}_{11,2}$$

$$s_{11,0} = \hat{d}_{1,1} \oplus \hat{d}_{1,2} \oplus \hat{d}_{2,1} \oplus \hat{d}_{2,2} \oplus \hat{d}_{2,3} \oplus \hat{d}_{3,1} \oplus \hat{d}_{3,3} \oplus \hat{d}_{3,4} \oplus \hat{d}_{4,1} \oplus \hat{d}_{4,4}$$

$$s_{11,1} = \hat{d}_{5,1} \oplus \hat{d}_{5,3} \oplus \hat{d}_{6,1} \oplus \hat{d}_{7,1} \oplus \hat{d}_{7,2} \oplus \hat{d}_{7,4} \oplus \hat{d}_{8,2} \oplus \hat{d}_{8,4} \oplus \hat{d}_{11,3}$$

$$s_{12,0} = \hat{d}_{1,2} \oplus \hat{d}_{2,2} \oplus \hat{d}_{2,4} \oplus \hat{d}_{3,1} \oplus \hat{d}_{3,4} \oplus \hat{d}_{4,1} \oplus \hat{d}_{5,2} \oplus \hat{d}_{5,3} \oplus \hat{d}_{6,2}$$

$$s_{12,1} = \hat{d}_{6,3} \oplus \hat{d}_{6,4} \oplus \hat{d}_{7,1} \oplus \hat{d}_{7,2} \oplus \hat{d}_{7,4} \oplus \hat{d}_{8,1} \oplus \hat{d}_{8,2} \oplus \hat{d}_{11,4}$$

$$s_{13,0} = \hat{d}_{1,1} \oplus \hat{d}_{1,4} \oplus \hat{d}_{2,2} \oplus \hat{d}_{2,3} \oplus \hat{d}_{2,4} \oplus \hat{d}_{3,1} \oplus \hat{d}_{3,3} \oplus \hat{d}_{3,4} \oplus \hat{d}_{4,1} \oplus \hat{d}_{4,2}$$

$$s_{13,1} = \hat{d}_{4,4} \oplus \hat{d}_{5,1} \oplus \hat{d}_{5,2} \oplus \hat{d}_{5,4} \oplus \hat{d}_{6,2} \oplus \hat{d}_{6,3} \oplus \hat{d}_{6,4} \oplus \hat{d}_{7,1} \oplus \hat{d}_{8,1} \oplus \hat{d}_{12,1}$$

$$s_{14,0} = \hat{d}_{1,1} \oplus \hat{d}_{1,2} \oplus \hat{d}_{2,3} \oplus \hat{d}_{2,4} \oplus \hat{d}_{3,2} \oplus \hat{d}_{3,4} \oplus \hat{d}_{4,1} \oplus \hat{d}_{4,2} \oplus \hat{d}_{4,3}$$

$$s_{14,1} = \hat{d}_{5,1} \oplus \hat{d}_{5,2} \oplus \hat{d}_{5,3} \oplus \hat{d}_{6,3} \oplus \hat{d}_{6,4} \oplus \hat{d}_{7,2} \oplus \hat{d}_{8,2} \oplus \hat{d}_{12,2}$$

$$s_{15,0} = \hat{d}_{1,2} \oplus \hat{d}_{1,3} \oplus \hat{d}_{2,4} \oplus \hat{d}_{3,1} \oplus \hat{d}_{3,3} \oplus \hat{d}_{4,1} \oplus \hat{d}_{4,2} \oplus \hat{d}_{4,3} \oplus \hat{d}_{4,4}$$

$$s_{15,1} = \hat{d}_{5,1} \oplus \hat{d}_{5,2} \oplus \hat{d}_{5,3} \oplus \hat{d}_{5,4} \oplus \hat{d}_{6,4} \oplus \hat{d}_{7,3} \oplus \hat{d}_{8,3} \oplus \hat{d}_{12,3}$$

$$s_{16,0} = \hat{d}_{1,3} \oplus \hat{d}_{2,1} \oplus \hat{d}_{2,2} \oplus \hat{d}_{2,3} \oplus \hat{d}_{2,4} \oplus \hat{d}_{3,2} \oplus \hat{d}_{3,3} \oplus \hat{d}_{4,1} \oplus \hat{d}_{4,3}$$

$$s_{16,1} = \hat{d}_{5,1} \oplus \hat{d}_{5,3} \oplus \hat{d}_{6,1} \oplus \hat{d}_{6,2} \oplus \hat{d}_{6,3} \oplus \hat{d}_{6,4} \oplus \hat{d}_{7,4} \oplus \hat{d}_{8,4} \oplus \hat{d}_{12,4}$$

FIG. 7B

FIG. 8

FIG. 8A
FIG. 8B
FIG. 8C

EQUATIONS PERTAINING TO CORRECTOR CIRCUIT $$\hat{d}_{1,1} = d_{1,1} \oplus (G_{1,2} \wedge e_{1,1})$$
$$\hat{d}_{1,2} = d_{1,2} \oplus (G_{1,2} \wedge e_{1,2})$$
$$\hat{d}_{1,3} = d_{1,3} \oplus (G_{1,2} \wedge e_{1,3})$$
$$\hat{d}_{1,4} = d_{1,4} \oplus (G_{1,2} \wedge e_{1,4})$$

$$\hat{d}_{2,1} = d_{2,1} \oplus (G_{1,2} \wedge e_{2,1})$$
$$\hat{d}_{2,2} = d_{2,2} \oplus (G_{1,2} \wedge e_{2,2})$$
$$\hat{d}_{2,3} = d_{2,3} \oplus (G_{1,2} \wedge e_{2,3})$$
$$\hat{d}_{2,4} = d_{2,4} \oplus (G_{1,2} \wedge e_{2,4})$$

FIG. 8A $$\hat{d}_{3,1} = d_{3,1} \oplus (G_{3,4} \wedge e_{3,1})$$
$$\hat{d}_{3,2} = d_{3,2} \oplus (G_{3,4} \wedge e_{3,2})$$
$$\hat{d}_{3,3} = d_{3,3} \oplus (G_{3,4} \wedge e_{3,3})$$
$$\hat{d}_{3,4} = d_{3,4} \oplus (G_{3,4} \wedge e_{3,4})$$

$$\hat{d}_{4,1} = d_{4,1} \oplus (G_{3,4} \wedge e_{4,1})$$
$$\hat{d}_{4,2} = d_{4,2} \oplus (G_{3,4} \wedge e_{4,2})$$
$$\hat{d}_{4,3} = d_{4,3} \oplus (G_{3,4} \wedge e_{4,3})$$
$$\hat{d}_{4,4} = d_{4,4} \oplus (G_{3,4} \wedge e_{4,4})$$

FIG. 8B $$\hat{d}_{5,1} = d_{5,1} \oplus (G_{5,6} \wedge e_{5,1})$$
$$\hat{d}_{5,2} = d_{5,2} \oplus (G_{5,6} \wedge e_{5,2})$$
$$\hat{d}_{5,3} = d_{5,3} \oplus (G_{5,6} \wedge e_{5,3})$$
$$\hat{d}_{5,4} = d_{5,4} \oplus (G_{5,6} \wedge e_{5,4})$$

$$\hat{d}_{6,1} = d_{6,1} \oplus (G_{5,6} \wedge e_{6,1})$$
$$\hat{d}_{6,2} = d_{6,2} \oplus (G_{5,6} \wedge e_{6,2})$$
$$\hat{d}_{6,3} = d_{6,3} \oplus (G_{5,6} \wedge e_{6,3})$$
$$\hat{d}_{6,4} = d_{6,4} \oplus (G_{5,6} \wedge e_{6,4})$$

$$\hat{d}_{7,1} = d_{7,1} \oplus (G_{7,8} \wedge e_{7,1})$$
$$\hat{d}_{7,2} = d_{7,2} \oplus (G_{7,8} \wedge e_{7,2})$$
$$\hat{d}_{7,3} = d_{7,3} \oplus (G_{7,8} \wedge e_{7,3})$$
$$\hat{d}_{7,4} = d_{7,4} \oplus (G_{7,8} \wedge e_{7,4})$$

$$\hat{d}_{8,1} = d_{8,1} \oplus (G_{7,8} \wedge e_{8,1})$$
$$\hat{d}_{8,2} = d_{8,2} \oplus (G_{7,8} \wedge e_{8,2})$$
$$\hat{d}_{8,3} = d_{8,3} \oplus (G_{7,8} \wedge e_{8,3})$$
$$\hat{d}_{8,4} = d_{8,4} \oplus (G_{7,8} \wedge e_{8,4})$$

$$\hat{d}_{9,1} = d_{9,1} \oplus (G_{9,10} \wedge e_{9,1})$$
$$\hat{d}_{9,2} = d_{9,2} \oplus (G_{9,10} \wedge e_{9,2})$$

FIG. 8C $$\hat{d}_{9,3} = d_{9,3} \oplus (G_{9,10} \wedge e_{9,3})$$
$$\hat{d}_{9,4} = d_{9,4} \oplus (G_{9,10} \wedge e_{9,4})$$

$$\hat{d}_{10,1} = d_{10,1} \oplus (G_{9,10} \wedge e_{10,1})$$
$$\hat{d}_{10,2} = d_{10,2} \oplus (G_{9,10} \wedge e_{10,2})$$
$$\hat{d}_{10,3} = d_{10,3} \oplus (G_{9,10} \wedge e_{10,3})$$
$$\hat{d}_{10,4} = d_{10,4} \oplus (G_{9,10} \wedge e_{10,4})$$

$$\hat{d}_{11,1} = d_{11,1} \oplus (G_{11,12} \wedge e_{11,1})$$
$$\hat{d}_{11,2} = d_{11,2} \oplus (G_{11,12} \wedge e_{11,2})$$
$$\hat{d}_{11,3} = d_{11,3} \oplus (G_{11,12} \wedge e_{11,3})$$
$$\hat{d}_{11,4} = d_{11,4} \oplus (G_{11,12} \wedge e_{11,4})$$

$$\hat{d}_{12,1} = d_{12,1} \oplus (G_{11,12} \wedge e_{12,1})$$
$$\hat{d}_{12,2} = d_{12,2} \oplus (G_{11,12} \wedge e_{12,2})$$
$$\hat{d}_{12,3} = d_{12,3} \oplus (G_{11,12} \wedge e_{12,3})$$
$$\hat{d}_{12,4} = d_{12,4} \oplus (G_{11,12} \wedge e_{12,4})$$

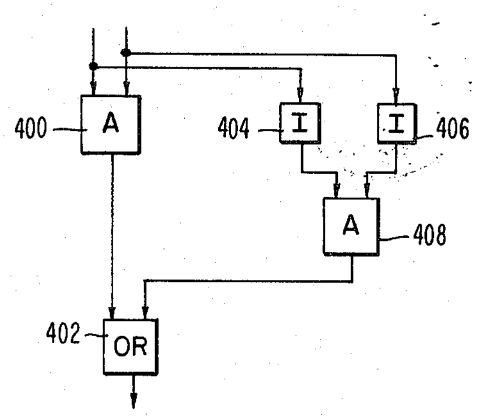

FIG. 9

MULTIPLE B-ADJACENT GROUP ERROR CORRECTION AND DETECTION CODES AND SELF-CHECKING TRANSLATORS THEREFOR

BACKGROUND OF THE INVENTION

This invention relates to error correcting and detecting arrangements in data processing apparatus. More particularly, it relates to error correction and detection arrangements employing novel error correction and detection codes, translators therefor which enable greater scope of error correction and detection, coupled with enchanced efficiency of code translator circuitry requirements.

In presently used memory systems in data processing apparatus, correction and detection of errors is effected by a variety of techniques. Of the latter techniques, the one having the most widespread use, is parity checking wherein at least an additional bit is included with data bits of an information unit, the parity check bits being employed to indicate the correctness of the data of a particular information unit. Thus, a parity bit indicates whether an odd or even number of binary 1's appear in the information unit. Is such parity checking schemes, means are provided for generating the proper parity bits at various transmission points within a central processing unit and means are concommittently provided for checking the parity.

In addition to the use of parity checking detection of errors, there have been utilized numerous error correction and detection codes. A typical class of such codes is generally known as Hamming single error correction, double error bit detection codes. With the latter type codes, there can be corrected errors in one single bit wide basic storage module (BSM) and the detection of errors in two BSM's. Techniques for the construction of such a code may be found in the publication of Hamming, R.W. "Error Detecting and Error Correcting Codes," Bell Systems Technical Journal, 29, 1950, pages 147–160.

Techniques which have been utilized for error correction and detection is the generation of "syndromes" which indicate whether errors have occurred and which particular bit in a particular word need be corrected. Such syndromes are discussed in the text of W. Wesley Peterson, "Error-Correcting Codes," M.I.T. Press, 1961. An example of the generation of syndromes is set forth in U.S. Pat. application Ser. No. 125,652, filed Mar. 18, 1971 "Error-Free Decoding for Failure-Tolerant Memories," inventors, William C. Carter, Donald C. Jessup, Jr., Robert A. Henle, and Aspi B. Wadia, and assigned to the IBM Corportaion.

The aforementioned codes and translators therefor, while providing error detection and correction of data errors occurring in a memory or storage device, which uses 1 bit wide BSM's, are unable to cope with b-bit wide BSM's for b>1. Codes which could cope with b-bit wide BSM's, are disclosed by I.S. Reed and G. Solomon, Polynomial Codes over Certain Finite Fields, J. SIAM, June 1960, could not have parallel combinational logic decoders and translators and, thus, are unsuited for use in a memory. Further improvements in detection are not possible because of the translator design. To overcome this deficiency, there is disclosed in the aforementioned patent application, a translator for single-bit error-correcting double bit error detecting code which detects failures in the translator itself.

While the latter code and its self-checking translator has proved to be quite efficacious in its purported use, it is applicable only to the single-bit per BSM memory organization. It has also presented the disadvantage of being relatively inflexible in its structure, thereby resulting in inefficiency of circuitry proliferation and the incapability of having its design optimized. In many situations, flexible methods of encoding and decoding together with the capability of having enhanced error correction and detection to enable the optimization of system design are important in the design of LSI (large scale integration) main stores, in the design of backup stores and in the design of large capacity secondary storage devices.

Accordingly, it is an important object of this invention to provide novel error correcting and detecting codes which are capable of achieving parallel combinational correction/detection of multiple errors, and encoding and decoding of storage data.

It is another object to provide error correction and detection of multiple b-adjacent bit error patterns.

It is a further object to provide redundancy comparable to known multiple error correcting and detecting codes which cannot have parallel combinational decoding.

It is still another object to provide efficient self-checking translators for such codes.

It is yet another object to provide translators which will enable the detection with high probability of more than t+d errors up to $2t+2d-1$ errors.

It is still a further object to provide the abovementioned novel codes and the translators therefor wherein there is enabled percentage efficiency in the utilization of the required amounts of circuitry. +

It is yet another object in accordance with the preceding objects to provide novel codes and self-checking translators therefor wherein the code and translators are capable of being designed according to expected component failures.

SUMMARY OF THE INVENTION

Generally speaking and in accordance with the invention, there is provided an error correction and detection code and a translator therefor. The code is used with a memory arrangement which comprises a quantity $k$ of b-bit width BSM's (basic storage modules) for providing data and a quantity $r$ of b-bit width BSM's for providing checkbits whereby a word comprises $kb + rb$ bits, $r$ being chosen to be equal to $2t + d$ whereby $t$ is the quantity of b-adjacent errors desired to be corrected and $d$ is the quantity of additional b-adjacent errors desired to be detected. If $b$ is a multiple of $m$, the code is for $mk$ groups, $b/m$ bits wide for data, and $mr$ groups, $b/m$ bits wide for check bits with $m(k+r) \leq 2^{bm}+1$ and $mr \leq 2^{bm}-1$. The code corrects specified combination, all if desired, of $mt$ $b/m$ adjacent errors, detects under all conditions, all of $m(t+d)$ $b/m$ adjacent errors not corrected and detects with a very high probability $$\max\left\{0, 1-\binom{mk+mt=j}{mt}\frac{2^{jb/m}-1}{(2^{b/m}-1)^{mr}}\right\}$$

$(m(t+d)+j)^{b/m}$ errors with $j \geq 1$. The code thus detects all $(m(t+d)+j)^{b/m}$ adjacent errors, where $j \geq 1$, which do not change a code word into a correctable word.

The code is defined by choosing particular columns of the following matrix M to constitute the columns of $$M=\begin{bmatrix} I & I & \ldots & I & \ldots & I & I & 0 & 0 & 0 \\ I & A & & A^{i} & & A^{k-1} & 0 & I & 0 & 0 \\ I & A^{2} & & A^{2i} & & A^{2(k-1)} & 0 & 0 & I & 0 \\ \cdot & \cdot & & \cdot & & \cdot & \cdot & \cdot & \cdot & \cdot \\ \cdot & \cdot & & \cdot & & \cdot & \cdot & \cdot & \cdot & \cdot \\ \cdot & \cdot & & \cdot & & \cdot & \cdot & \cdot & \cdot & \cdot \\ I & A^{r-1} & & A^{(r-1)i} & & A^{(r-1)(k-1)} & 0 & 0 & 0 & I \end{bmatrix}$$

to constitute columns of the parity check matrix H corresponding to the code where $r=2t+d$. In matrix M, A is a $bxb$ matrix which generates the multiplicative group of GF $[2^b]$ wherein GF $[2^b]$ represents a Galois Field, I is a $bxb$ identity matrix, $2^b-1>r$ and $k+r \leq 2^b+1$, unless $r=3$ when $k+3 \leq 2^b+2$. The choice of columns for H is made by determining that each set of $t$ columns corresponding to set of $t$ b-adjacent errors which are to be corrected induces a unique syndrome pattern. Codes with length up to $2^b+1$ can always be chosen.

The error correction and detection achieved by the invention is based upon the properties of combinational logic functions termed group pointers and error pattern indicators. A group pointer points to a group in error. An error pattern indicator specifies possible corrections for bits within a group.

The self-checking translator used in conjunction with the code comprises a syndrome generator using the parity check matrix H whose columns are selected from the matrix M shown hereinabove. Syndromes are employed to generate both the group pointers and error pattern indicators. The data bits and check bits are corrected by a correction means utilizing the generated group pointers for error pattern indicators. The data bits are encoded in byte parity for processor use and are checked by a self-testing and self-checking parity checker and a reduction circuit for checker outputs. The corrected data bits and the corrected check bits are used to regenerate syndrome pairs which feed another reduction circuit for checker outputs. A resultant regeneration of syndrome pairs check is a completely checked and self-testing arrangement and detects any input data errors or circuit failures first-hand.

The foregoing and other objects, features and advantages of the invention will be apparent from the more particular description of preferred embodiments of the invention, as illustrated in the accompanying drawings.

BRIEF DESCRIPTION OF THE DRAWINGS

In the drawings.

FIG. 3A–32-1, taken together as in FIG. 3, is a detailed depiction of a translator suitable for use in the translators shown in FIGS. 1 and 2;

FIGS. 4A and 4B, taken together as in FIG. 4, is a list of logic equations for the syndromes generated in translator shown in FIG. 3;

FIG. 5 is a list of logic equations for the group pointers generated in the translator shown in FIG. 3;

FIGS. 6A and 6B, taken together as in FIG. 6, is a list of logic equations for the error pattern indicators generated in the translator shown in FIG. 3;

FIGS. 7A and 7B, taken together as in FIG. 7, is a list of logic equations for the regenerated syndrome pairs produced in the translator shown in FIG. 3; denote FIGS. 8A–8C, taken together as in FIG. 8, is a list of logic equations for the corrected data and check bits produced in the translator shown in FIG. 3; and FIG. 9 is an embodiment of a coincidence or "equals" circuit utilized in the generation of group pointers in the translator.

DESCRIPTION OF PREFERRED EMBODIMENTS

Figure 1:
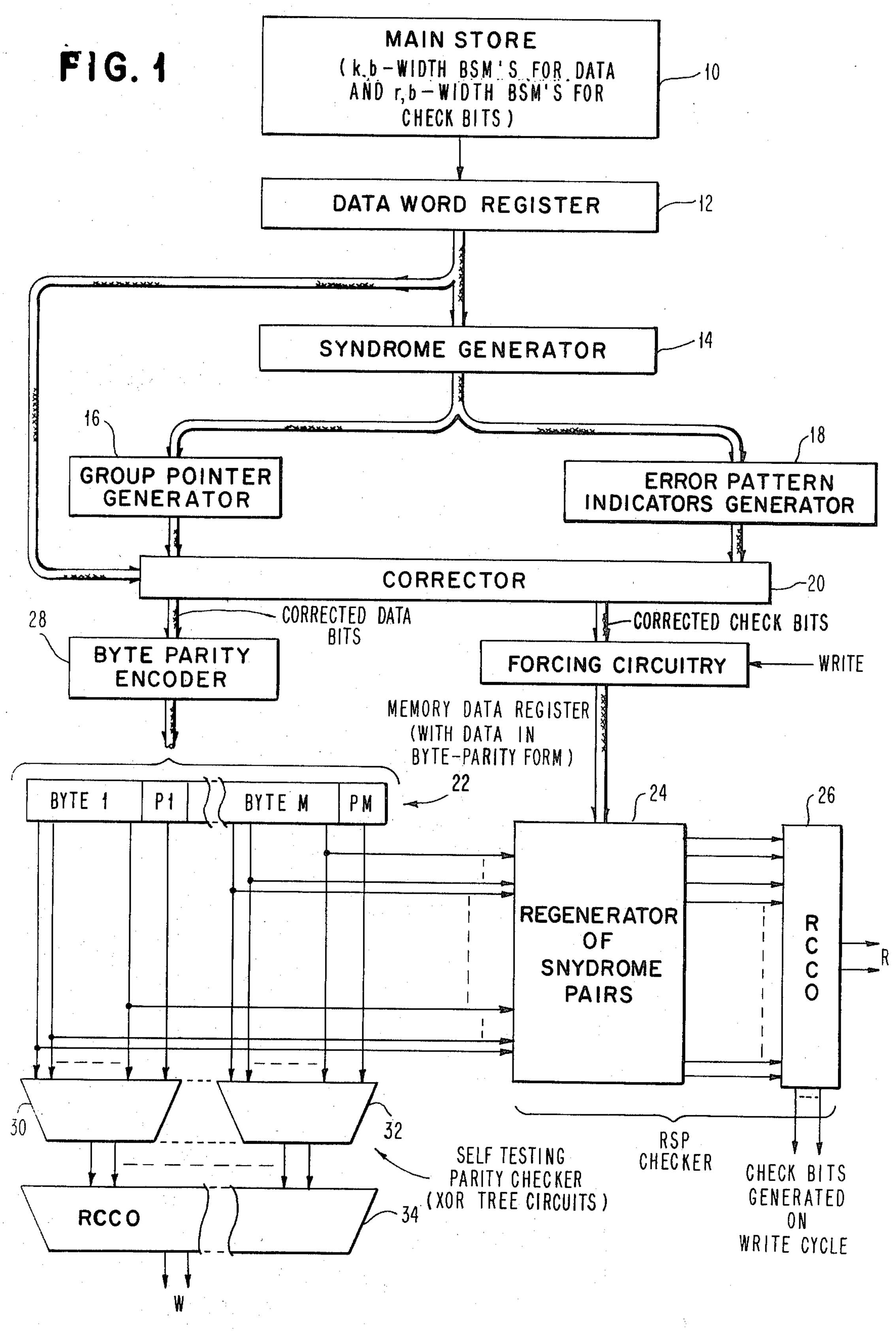
FIG. 1, is a block diagram of a preferred embodiment of a self-checking translator constructed according to the principles of the invention.

In the description of the invention which follows hereinbelow, the following terms are employed:

Self-checking circuit — A circuit in which no single failure produces an erroneous output that goes undetected.

Self-testing circuit — A circuit in which every single circuit failure is detected during normal operation.

BSM — Basic Storage Module — A memory organization consisting of a plurality of basic storage modules operating in parallel such that a data word of the memory is composed of b-bit groups from each basic storage module (BSM). Such type of organization permits any failure in the BSM to appear as an error in a single b-adjacent bit group.

In order to reduce the amount of address decoder circuitry, multiple bit/BSM memory organization is normally employed. To enable the toleration of failures in a single BSM (which affects a group of adjacent bits in the code word), in acordance with the invention, there are provided novel classes of codes and translators.

In a first of these novel classes of codes, there is provided a single b-adjacent bit group error correction by means of a double b/2-adjacent bit group error correcting code using the same number of check bits as in the single b-adjacent correcting code. This type of code, with a b-bit/BSM memory organization, has been found to be capable of correcting errors due to failures in any single BSM and, detecting with a probability greater than 0.98, errors due to failures in any two BSM's.

In a second of these novel classes of codes, there are provided single b-adjacent bit group correcting double b-adjacent bit group error detecting codes using 1.5 times the number of check bits as in the single b-adjacent bit group error detecting code. This type of code with a b-bit/BSM memory organization is capable of correcting errors due to failures in any single BSM, detecting errors due to failures in any two BSM's, and detecting with a probability of greater than 0.95, errors due to failures in any three BSM's.

In accordance with the invention, there is also provided respective translators for the inventive codes. As will be shown hereinbelow, the failure-tolerant capacity of these translators is characterized in that every single failure in the translator circuitry is either detected or does not cause erroneous output, and the probable accumulation of undetected failures in the translator circuitry before ultimate detection does not produce erroneous output that goes undetected.

There is now described the first of these code classes, suitably termed "Code 1," 1," and its self-checking memory translator.

Code 1

The parity check matrix for this code for a b-bit/BSM memory organization is as shown immediately hereinbelow.

|←——Data Bits——→|←Check Bits→|

$$H=\begin{pmatrix} I & I & \ldots I \ldots & I & I & 0 & 0 & 0 \\ A & A^2 & A^j & A^k & 0 & I & 0 & 0 \\ A^2 & A^4 & A^{2j} & A^{2k} & 0 & 0 & I & 0 \\ A^3 & A^6 & A^{3j} & A^{3k} & 0 & 0 & 0 & I \end{pmatrix}$$

In this matrix, $K \leq 2^{b/2}-2$, K even $I = b/2 \times b/2$ identity matrix $A = b/2 \times b/2$ matrix over GF [2] whose characteristic polynomial is a primitive polynomial of degree $b/2$ Number check bits used — $2b$ Maximum number of information bits $= b/2\ (2^{b/2}-2)$ All columns are chosen so that the errors to be corrected give unique syndrome patterns.

Since it can be shown that, by proper choice, all double b/2-adjacent bit group errors give use to distinct syndromes, the code is double b/2-adjacent bit group corrected. Consequently, single b-adjacent bit group errors can be corrected. To accomplish single b-adjacent bit group error correction, double b/2-adjacent bit group pointers $G_{ij}$ and b/2-adjacent bit group error pattern indicators $e_i$, $e_j$ are generated. The value of a pointer $G_{ij}$ will be 1 if the b/2-adjacent bit groups $i$ or $j$ are both in error. For any $i$, $e_i$ will specify the error pattern to be corrected when the b/2-adjacent bit group $i$ is in error. Since the intent is to correct only single b-adjacent bit groups, the only group pointers that need be generated are $G_{ij}$ with $(i,j) \in (1,2); (3,4); \ldots (k+3, k+4)$.

Reference is now made to FIG. 1 wherein there is shown an embodiment of a self-checking translator, according to the invention, and suitable for use with code 1 set forth hereinabove. In this implementation, syndromes are first generated in syndrome generator 14 from the bits in the data word register (DWR) 12 (shown associated with the basic storage modules (BSM's) 10 of the memory organization according to the parity check matrix H described hereinabove for code 1. Thus, if word w is a word in data word register 12, the corresponding syndrome S is given by the equation $$S = 1 \oplus Hw$$

wherein 1 is a $2b \times 1$ matrix of all 1's and $$w=\begin{bmatrix} d_{1,1} \\ \cdot \\ \cdot \\ d_{1,b/2} \\ \cdot \\ \cdot \\ d_{k+4,1} \\ \cdot \\ \cdot \\ d_{k+4,b/2} \end{bmatrix}$$

whereby all syndrome bits are equal to 1 when $w$ is a code word. Group pointers are then generated from the syndrome bits in group pointer generator 16. Group pointer $G_{12}, G_{34}, \ldots, G_{k+3,k+4}$ indicate which of the b-adjacent bit groups are in error as the result of failure in a single basic storage module. The group pointers are generated as an implementation of logical assertions on the syndrome bits.

If the syndrome S is expressed as four b/2-bit vectors $S_1, S_2, S_3, S_4$ as shown immediately below.

$$S=\begin{bmatrix} S_1 \\ S_2 \\ S_3 \\ S_4 \end{bmatrix},\quad S_1=\begin{bmatrix} s_1 \\ \cdot \\ \cdot \\ s_{b/2} \end{bmatrix},\quad S_2=\begin{bmatrix} s_{b/2+1} \\ \cdot \\ \cdot \\ s_b \end{bmatrix},$$

$$S_3=\begin{bmatrix} s_{b+1} \\ \cdot \\ \cdot \\ s_{3b/2} \end{bmatrix},\quad S_4=\begin{bmatrix} s_{3b/2+1} \\ \cdot \\ \cdot \\ s_{2b} \end{bmatrix}$$

it can be shown that, if the b/2-adjacent bit groups $i$ and $j$, $(i,j<k)$ of the word w are in error with error patterns $e_i$ and $e_j$ respectively, then $$\begin{aligned} \bar{S}_1 &= e_i \oplus e_j \\ \bar{S}_2 &= A^i e_i \oplus A^j e_j \\ \bar{S}_3 &= A^{2i} e_i \oplus A^{2j} e_j \\ \bar{S}_4 &= A^{3i} e_i \oplus A^{3j} e_j \end{aligned} \qquad (1)$$

where $\bar{S}_i$ is a vector whose elements are complements of the elements of $S_i$. Solving for $e_i$, $e_j$ using the first two equations in (1); there results $$\begin{aligned} e_i &= (1/A_i \oplus A^j)\ (A^j \bar{S}_1 \oplus \bar{S}_2) \\ e_j &= (1/A^i \oplus A^j)\ (A^i \bar{S}_1 \oplus \bar{S}_2) \end{aligned} \qquad (2)$$

Substituting (2) into the last two equations of (1) yields $$\begin{aligned} \bar{S}_3 &= A^{i+j} \bar{S}_1 \oplus (A^i + A^j) \bar{S}_2 \\ \bar{S}_4 &= A^{i+j}\ (A^i \oplus A^j) \bar{S}_1 \oplus (A^{2i} \oplus A^{2j} \oplus A^{i+j}) \bar{S}_2 \end{aligned} \qquad (3)$$

Consequently, the group pointer $G_{ij}$ for $G_{ij}$ for $i, j \in (1, 2, \ldots, k)$ is given by $$G_{ij} = [\bar{S}_3 = A^{i+j} \bar{S}_1 \oplus (A^i \oplus A^j) \bar{S}_2]\ \Lambda\ [\bar{S}_4 = (A^{i+j}(A^i \oplus A^j) \bar{S}_1 \oplus (A^{2i} \oplus A^{2j} \oplus A^{ij}) \bar{S}_2)] \qquad (4)$$

wherein the = sign within the bracketed expressions indicates coincidence and the Λ sign indicates AND. Equation (4) gives the expression for the group pointers $G_{12}, G_{34}, \ldots, G_{k-1,k}$. The group pointers for the check bit groups are given by $$G_{k+1,k+2} = \bigwedge_{i=2b}^{4b} \bar{s}_i = 0$$

and (5)

$$G_{k+3,k+4} = \bigwedge_{i=1}^{2} \bar{s}_i = 0$$

The error pattern indicators for the check bit groups are generated in error pattern indicator generator 18 and are given by $$e_{k+1} = \bar{S}_1 \qquad e_{k+3} = \bar{S}_3$$
$$e_{k+2} = \bar{S}_2 \qquad e_{k+4} = \bar{S}_4 \tag{6}$$

Minimization of circuitry for the group pointer and error pattern generation can be achieved by selecting the column of the parity check matrix shown immediately hereinbelow. This parity check matrix is also for code 1 and is for minimizing circuitry in a b-bit/BSM memory organization.

|← Data Bits →|← Check Bits →|

$$H=\left(\begin{array}{cccccccc:cccc} I & I & I & I & \ldots & I & I & & I & 0 & 0 & 0 \\ A & A\oplus I^2 & A & A^2\oplus I & \ldots & A^k & A^k\oplus I & & 0 & I & 0 & 0 \\ A^2 & (A\oplus I)^2 & A^4 & (A^2\oplus I)^2 & \ldots & A^{2k} & (A^k\oplus I)^2 & & 0 & 0 & 1 & 0 \\ A^2 & (A\oplus I)^2 & A^6 & (A^2\oplus I)^3 & \ldots & A^{3k} & (A^k\oplus I)^3 & & 0 & 0 & 0 & 1 \end{array}\right)$$

where $k \leq 2^{b/2}-2$ $I = b/2 \times b/2$ identity matrix $A = b/2 \times b/2$ matrix over GF[2] whose characteristic polynomial is a primitive polynomial of degree $b/2$.

Number of check bits used $= 2b$.

maximum number of information bits $= b/2\ (2^{b/2}-2)$

In the matrix shown immediately hereinabove, each pair of adjacent columns 1, 2; 3, 4; . . . ; $k$–1, $k$ is of the form $$\begin{bmatrix} I & I \\ A^l & A^{b/2} \oplus I \\ A^{2l} & (A^l \oplus I)^2 \\ A^{3l} & (A^l \oplus I)^3 \end{bmatrix}$$

Care is taken to ensure that no two columns of the entire H matrix are identical and all groups of 4 columns containing a a pointer are linearly independent. For example, the parity check matrix for an 8-bit/BSM memory organization with 32 bits word width is shown immediately hereinbelow.

|← Data Bits →|← Check Bits →|

$$H=\left(\begin{array}{cccccccc:cccc} I & I & I & I & I & I & I & I & I & 0 & 0 & 0 \\ A & A^4 & A^2 & A^8 & A^3 & A^{14} & A^5 & A^{10} & 0 & I & 0 & 0 \\ A^2 & A^8 & A^4 & A & A^6 & A^{13} & A^{10} & A^5 & 0 & 0 & I & 0 \\ A^3 & A^{12} & A^6 & A^9 & A^9 & A^{12} & I & I & 0 & 0 & 0 & 0 \end{array}\right)$$

$$A=\begin{bmatrix} 0 & 1 & 0 & 0 \\ 0 & 0 & 1 & 0 \\ 1 & 0 & 0 & 1 \\ 1 & 0 & 0 & 0 \end{bmatrix}$$

It is seen that the above matrix has 32 information bits and 16 check bits.

The group pointers used in the 8-bit/BSM memory organization are as follows:

$$G_{12} = [(\bar{S}_3 = (\bar{S}_2 \oplus A^5\bar{S}_1)]\ \Lambda\ [\bar{S}_4 = (\bar{S}_3 \oplus A^5\bar{S}_2)]$$
$$G_{34} = [(\bar{S}_3 = (\bar{S}_2 \oplus A^{10}\bar{S}_1)]\ \Lambda\ [\bar{S}_4 = (\bar{S}_3 \oplus {}_A{}^{10}\ \bar{S}_2)]$$
$$G_{56} = [(\bar{S}_3 = (\bar{S}_2 \oplus {}_A{}^2\bar{S}_1)]\ \Lambda\ [\bar{S}_4 = (\bar{S}_3 \oplus A^2\bar{S}_2)]$$
$$G_{78} = [(\bar{S}_3 = (\bar{S}_2 \oplus \bar{S}_1)]\ \Lambda\ [\bar{S}_4 = (\bar{S}_3 \oplus \bar{S}_2)]$$

$$G_{9,10} = \underset{i=8}{\overset{16}{\Lambda}}\ (\bar{s}_i = 0)$$

$$G_{11,12} = \underset{i=1}{\overset{8}{\Lambda}}\ (\bar{s}_i = 0)$$

As a result, the general $G_{ij}$ pointer for the case where adjacent columns are chosen as shown above becomes $G_{ij} = [\bar{S}_3 = (\bar{S}_2 \oplus B\bar{S}_1)]\ \Lambda\ [\bar{S}_4 = (\bar{S}_3 \oplus B\bar{S}_2)]$ with $$B = A^l\ (A^l \oplus I) \text{ and} \tag{7}$$

$$(i,j) \in \{1,2);\ (3,4);\ \ldots\ ;\ (k-1,\ k)$$

The error pattern indicators for the b/2-adjacent bit groups $i,j$ become $$e_i = (A^l \oplus I)\ \bar{S}_1 \oplus \bar{S}_2$$
$$e_j = e_{i+1} = A^l\bar{S}_1 \oplus \bar{S}_2 \tag{8}$$

The group pointers have the following properties:

*a*. In code space, all $G_{ij} = 1$ and all $e_l = 0$.

*b*. In single b/2-adjacent bit group error space, exactly one $G_{ij} = 1$ and either $e_i \neq 0$, or $e_j \neq 0$, the other error pattern indicator $e_l$, $l \neq i,j$ are non-zero.

*c*. In single b-adjacent bit group error space, exactly one $G_{ij} = 1$ and all $e_l$ are non-zero, $1 < l < k+4$.

*d*. In double b/2-adjacent bit group error space, all $G_{ij} = 0$. Actually, all $G_{ij} = 0$ for all syndrome patterns other than those in cases *a*, *b*, *c*.

At this juncture, since it is known as to which group is in error from the group pointers $G_{ij}$ and as to the error patterns to be corrected, the corrector stage 20 in FIG. 1 performs single b-adjacent bit group correction according to the following equations:

$$\hat{d}_{il} = d_{il} \oplus G_{i,i+1}e_{il}\quad 1 \leq l \leq b/2$$

$$\hat{d}_{i+1,l} = d_{i+1,\,l} \oplus G_{1,i+1}\ e_{i+1,l}\quad i = 1, 3, 5, \ldots, k+3$$

for the b-adjacent group consisting of the b/2-adjacent bit groups $i$, $i$+1, where $$e_{i,1} = \begin{bmatrix} e_{i,1} \\ \cdot \\ \cdot \\ \cdot \\ e_{i,b/2} \end{bmatrix}$$

and $d_{il}$ is the lth bit of the ith b/2-adjacent group.

The group pointers generated in stage 16 and the error pattern indicators generated in stage 18 are advantageously generated with the syndromes generated in stage 14 as inputs and not the complements of the syndromes as they appear in the above set forth equations. consequently, every error pattern indicators generator circuitry and every group pointer generator provides a regeneration of syndrome complements. Therefore, the translator, according to the invention, has the capability of tolerating a greater quantity of an accumulation of failures in the group pointer and error pattern indicator generation circuitry.

The corrector 20, which performs corrections to the individual bits, receives inputs from data word register 12, group pointer generator 16 and error pattern generator 18. The outputs of corrector 20 are corrected data bits and corrected check bits.

In considering the operation of corrector 20, it is to be realized that, since double b/2-adjacent bit group error syndromes are distinct, the syndromes for a word with four b/2-adjacent bit group errors will never be all 1's. This property can be employed to detect double group errors in the input word as follows. The corrected data bits in the memory data register 22 and the corrected check bits are applied to a stage 24 wherein they are employed to regenerate a set of self-testable syndrome pairs. These syndrome pairs in turn are applied to an RCCO circuit (reduction circuit for checker outputs) which produces an $$\overline{\begin{matrix}0\ 1\\1\ 0\end{matrix}}$$

output if and only if all of the syndrome pairs assumed the value $$\overline{\begin{matrix}0\ 1\\1\ 0\end{matrix}}.$$

Regenerator of syndrome pairs 24 and RCCO stage 26 together constitute an RSP (regenerated syndrome pair) checker. A double b-adjacent bit group error in the input data word will be detected as $$\overline{\begin{matrix}0\ 0\\1\ 1\end{matrix}}$$

at the output of this self-testing checker. The RSP checker also detects up to four b/2-adjacent bit groups of miscorrection in the corrected word resulting from circuit failure in the translator. Such regeneration of syndromes along with the capability wherein four b/2-adjacent groups do not produce an "all 1's" syndrome is required in order to guarantee the self-checking property of the translator. An example of the RCCO circuit 26 is fully described in U.S. Pat. No. 3,559,167.

The corrected data bits are applied to a byte parity encoder, 28 wherein byte parity is generated, the data bits and the parity bits both being stored in memory data register 22. In order to ensure that the generated parity bits in memory data register 22 are correct, each byte and its parity are respectively passed to self-testing-parity checkers 30, 32 which are suitably XOR tree circuits as disclosed in the aforementioned patent application Ser. No. 125,652. The signal pairs from these checkers are reduced to a single pair of self-testable signals w by an RCCO circuit 34. RCCO circuit 34 will detect any failure between the error corrector and the pair of lines providing the indication *w*.

For certain combinations of word sizes and number of Bits/BSM (basic storage module) organizations, the parity of the bytes can be obtained directly from a subset of the corrected check bit. Thus, byte parity encoder 28 and self-testing parity checkers 30 . . . 32 can be eliminated and the correctness of the byte parity bits are guaranteed by the RSP checker. In such case, each byte contains exactly one bit from each BSM. For example, in the case of 32 information bits and an 8 bit/BSM memory organization, the check bit $$dg,i = d_{1,i} \oplus_{2,i} \oplus . . . \oplus d_{8,i} \quad 1 \leq i \leq 4$$

where $d_{ki}$ is the $i^{th}$ bit of the $k^{th}$ b/2-adjacent bit group.

If the $^{th}$ byte of the memory word consists of $d_{1,i}$, $d_{2,i}$, . . . $d_{i,i}$, the parity *ki* of this byte is directly given by *dg,i*. Any parity error within a byte can now be detected by the RSP checker. A similar byte and parity association can be provided in the case of 48 information bits and a 12 bit/BSM memory organization, or 64 information bits and a 16 bit/BSM memory organization. In these cases, it has been found that a saving in excess of 16 percent of translator circuiry can be achieved.

Figure 2:
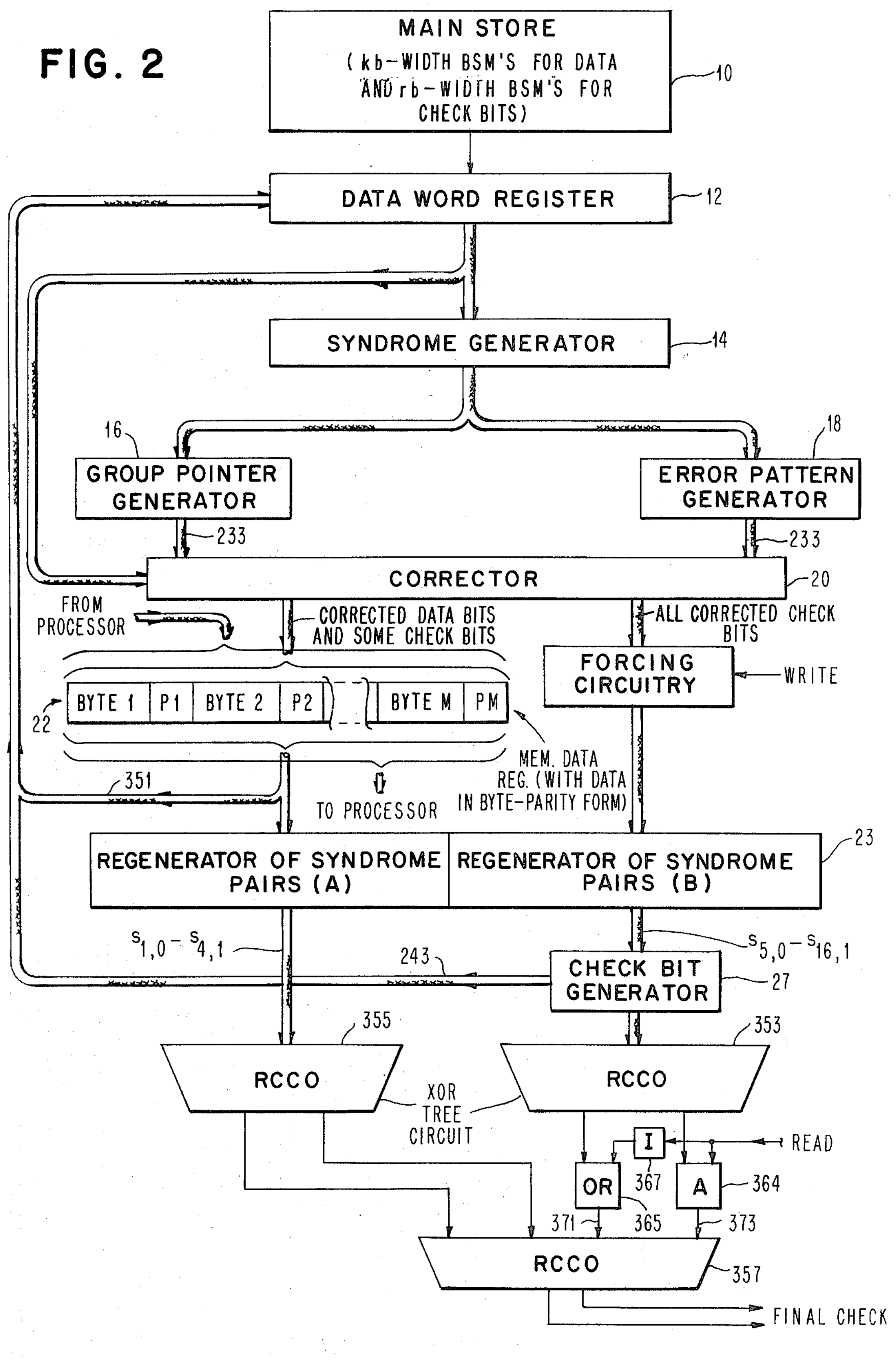
FIG. 2 is a block diagram of another embodiment of a translator according to the invention.
Figure 30:
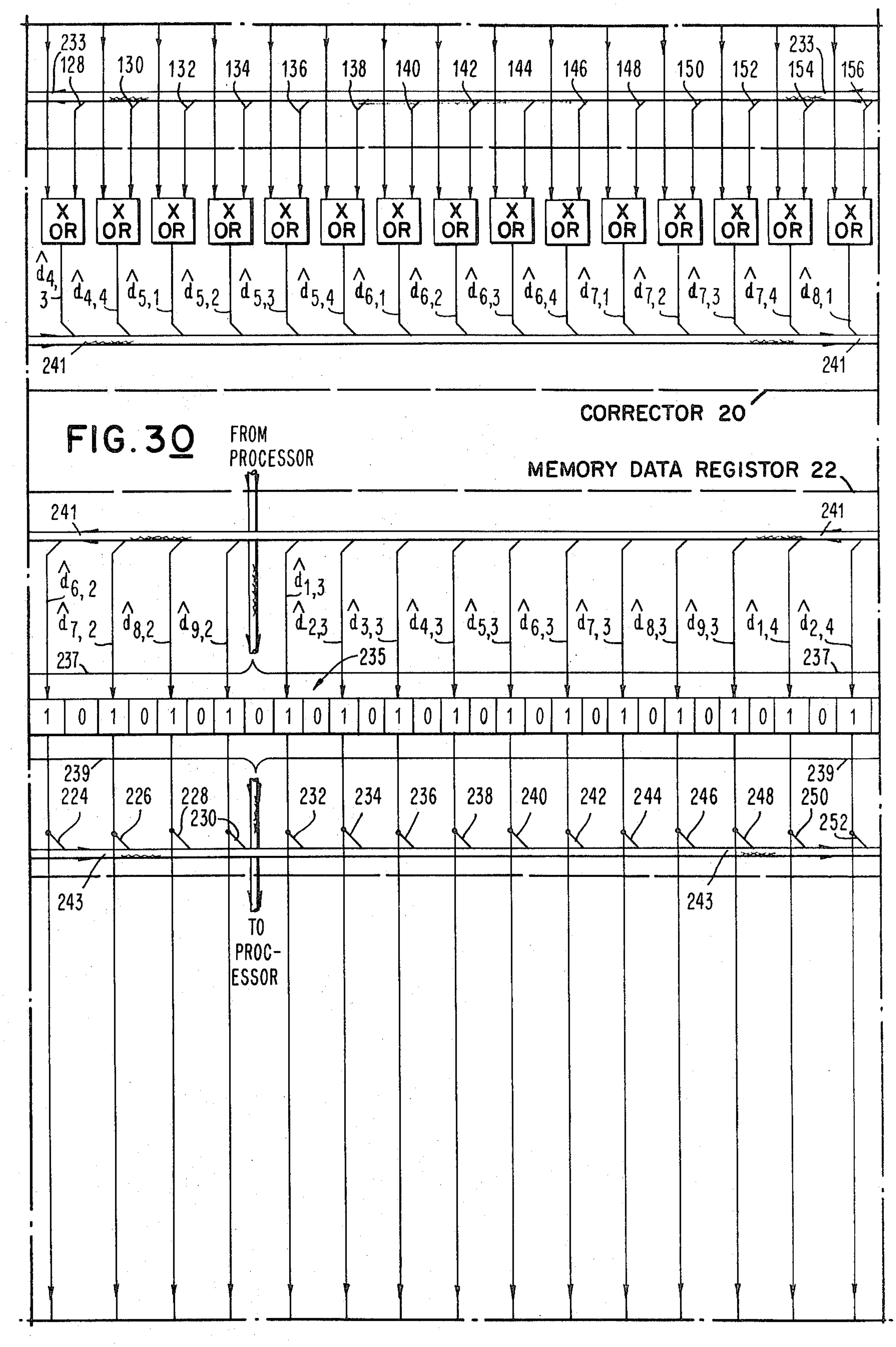

In he translator shown in FIG. 2, the stages 10, 12, 14, 16, 18, and 20 are the same as those correspóndingly designated in the translator depicted in FIG. 1.

In the remainder of the arrangement shown in FIG. 2, the corrected data bits with a parity bit for each byte is provided from corrector 20. The corrected data and check bits from corrector 20 are fed to a regenerator of syndrome pairs stage. The A section of syndrome pairs regenerator 23 receives the corrected data bits and the B section receives the corrected check bits. The forcing circuit 25 is a means for forcing all of the check bits to 1 during a write cycle whereby the check bits are generated at that time by check bit generator 27.

The RCCO circui 353 provides a pair of lines output from the input thereto of the generated check bits, i.e., the syndrome pairs regenerated from the corrected check bits. The RCCO circuit 355 provides a pair of lines output resulting from the input thereto of the regenerated syndrome pairs produced from the corrected data bits. The output of RCCO circuit 355 is directly applied to an RCCO circuit 357. During the read cycle, all syndrome pairs are from the RCCO circuit 353. during the write cycle the generation of syndrom pair (H) is essentially a byte parity check on the data to be encoded and put inside the memory with the syndrom generator (13) blocked.

The output pair of lines from RCCO circuit 357 is the final check pair of lines and is for checking all errors occurring between the data word register and this output. During read cycle it is a check of regenerated syndrom pairs. Durin the write cycle it is a check on the byte parity of the data in the Memory Data Register.

The inventive code, in addition to having the capability of correcting errors in two b/2-adjacent bit groups which is a property that results in the correction of single b-adjacent bit group errors, also has the capability of detecting a large percentage of double b-adjacent bit group errors.

In this latter connection, it is to be realized that a double b-adjacent bit group error is, in effect, an error in quadruple b/2-adjacent bit groups, *i*, *i*+1, *j*, *j*+1. The RSP checker, as shown in FIGS. 1 and 2, will detect all double b-adjacent bit group errors except those that produce the same syndromes as a single b-adjacent bit group error. it can be shown that the percentage of undetected double b-adjacent bit group errors is equal to $$n{-}4/2(2^b{-}1)$$

where $n=k+4$ and $k$ is the number of b/2-adjacent information bit groups. The percentage of undetected triple b-adjacent bit group errors similarly can be shown to be $$n{-}6/2(2^b{-}1) + 1/(2^b{-}1)2$$

The following table shows these percentages for different BSM widths and word sizes.

| Memory Organization | % Double b-adjacent Bit Group Errors Detected | % Triple b-adjacent Bit Group Errors Detected |
|---|---|---|
| 8 Bit/BSM* | 98.43 | 99.82 |
| 12 Bit/BSM+ | 99.93 | 99.93 |
| 16 Bit/BSM* | 99.99695 | 99.9985 |

* 32-bit data word assumed
\+ 48-bit data word assumed

There now follows herein below an analysis of translator circuit failure.

1. Syndrome Generator

Each syndrome line is the output of an independent XOR tree whose inputs are a subset of the bits from the data word register (DWR), the subset being determined by the parity check matrix. For example, $$s_1 = d_{1,1} \oplus d_{2,1} \oplus, \ldots \oplus d_{k,1}$$

Let it be assumed that the syndrome generator output is $s, s_2, \ldots, s_{2b}$. Then, any single failure in the XOR tree will propagate to the output interface and manifest itself as $s_i$ *s-a-*1 or $s_i$ *s-a-o*

*a.* $s_i$*s-a-*1

Since $s_i = 1$ in code space, $s_i$ *s-a-*1 is undetected in code space and, consequently, can accumulate. The accumulation of any number of $s_i$ *s-a-l*'s can cause misconnection in, at most, two b-adjacent bit groups in single group error space (property d of one of the group pointers).

*b.* $s_i$ *s-a-*0

From equations (5) and (6) set forth hereinabove, it is clear that one of the check bits will be miscorrected in code space and consequently will be detected by the RSP checker. This is true even in the presence of the accumulation of $s_j$ *s-a-l*'s.

2. Error Pattern Generator Failures

*a.* The output $e_{ij}$ *s-a-*1 is detected in code space since it causes a single bit miscorrection in group *i*.

*b.* Since $e_{ij} = 0$ in code space, $e_{ij}$ *s-a-*0 is undetectable in code space. It will be detected in single error space upon the reading out of a data word with an error involving group *i* bit *j*.

*c.* Internal failures in the circuitry generating $e_{ij}$ may or may not cause $e_{ij}$ to change value. However, the accumulation of any number of these internal failures cannot cause an erroneous output that goes undetected.

3. Group Pointer Generator

*a.* $G_{ij}$ *s-a-*b 0 is detected on the reading out of any word with error in the b/2-adjacent groups *i* or *j*. The probability of such detecting increases as the $G_{ij}$ *s-a-*0's accumulate. Thus, the circuit will not produce an erroneous output that goes undetected.

*b.* Since $G_{ij} = 1$ in code space, $G_{ij}$ *s-a-*1 is undetected in code space. The failure $G_{i,j}$ s-a-l is detected upon the reading of a work with any single b/2 adjacent error pattern that does not involve the b/2-adjacent groups *i* or *j*. An accumulation of up to two $G_{ij}$ *s-a-*1's will not cause an erroneous output that goes undetected.

Since the probability of a single group error is much greater than that of a triple $G_{ij}$ *s-a-*1's, further accumulation of $G_{ij}$ is unlikely.

Any failure in the lines internal to the $G_{ij}$ generating circuitry which consist of independent trees for each $G_{ij}$, may propagate as an error on a particular $G_{ij}$ line and consequently will produce no erroneous ouput that goes undetected, as shown above, for the errors in the $G_{ij}$ lines.

4. Corrective conjunct $AND_{ij}$ stuckes in the Corrector

*a.* $AND_{ij} = $ 0 in code space. Therefroe, $AND_{ij}$ *s-a-*0 is undetectable in code space. In the single error space, miscorrection of, at most, one group can be present in the corrected word because of the accumulation of any number of $AND_l$ *s-a-*0's. This will be detected by the RSP checker. The circuit will not produce erroneous results that go undetected.

*b.* $AND_{ij}$ *s-a-*1 in the presence of any number of accumulated $AND_{kl}$ *s-a-*0's is detected in code space, since this causes a single bit miscorrection for the bit $d_{ij}$.

5. The RSP Checker

The RSP checker consists of self-testable syndrome pairs from the corrected data bits in the memory data register (MDR) and the corrected check bits from the correcotr ouptut. The syndrome pairs are then reduced to a single self-testing pair by means of an RCCO circuit. The RSP checker also has, as outputs, 2*b* lines which are the check bits generated from the incoming byte-pairty word during the WRITE cycle. Since the entire checker is self-testing, any single failure in the RSP checker is self-testing, any single failure in the RSP checker will be detected in code space during normal operation. In addition, since any circuit which provides single self-testable outputs is self-checking, the RSP checker is self-checking. Any failure which causes an erroneous check bit generation in the WRITE cycle will be corrected when that particular word is read out from the memory and detected during any subsequent READ cycle as an RSP checker failure.

6. The Byte-Parity Generator and Checker

This component of the circuit is also self-testing and self-checking whereby any single failure between the error correction and the checker output is detected in code space during normal operation. The parity checkers check the correctness of the byte parity generation during the READ cycle and check the byte parity in the incoming data word during the WRITE cycle. For the codes that can be employed in the translator organization shwon in FIG. 2, the byte parity generator and parity checker are incorporated in the RSP checker with a small amount of gating. The self-testing and self-checking properties, as described herein above, still hold for those cases.

The following table shows the percentage increase of circuitry required to achieve self-checkability in translator memory translator over known translator implementation and without simple parity checking.

| | Number of circuits for self-checking translator | Number of circuits for conventional implementation with simple parity checking | Percent increase to achieve self checking property | Number of circuits for conventional implementation with number checking | Percent increase to achieve self-checking property |
|---|---|---|---|---|---|
| 8 bit/BSM [1] | 2,610 | 2,019 | 29.2 | 1,893 | 38.4 |
| 16 bit | 3,242 | 2,449 | 32.4 | 2,323 | 39.5 |

[1] 32-bit data word assumed.

The failure analysis discussed hereinabove points up that the invention together with the self-checking translator therefor has the following properties:

1. Every error resulting from failures within a single BSM is corrected.

2. In excess of 98 percent of the errors resulting from failures in two BSM's and more than 99 percent of the errors resulting from failures in three BSM's are detected for common computer word lengths.

3. Every failure and every probable accumulation of failures in the translator do not produce an erroneous output that goes undetected.

There is shown below a second embodiment of a code in accordance with the invention:

Data bits Check bits $$H=\begin{bmatrix} I & I & I & \cdots & I & \cdots & I & I & 0 & 0 \\ I & A & A^2 & \cdots & A^j & \cdots & A^k & 0 & I & 0 \\ I & A^2 & A^4 & \cdots & A^{2j} & \cdots & A^{2k} & 0 & 0 & I \end{bmatrix}$$

where $k \leq 2^b-2$, I is a $b\times b$ identity matrix,
maximum number of information bits $= b(k+1)$,
number of check bits $= 3b$.

A is a $b\times b$ matrix over GF[2] whose characteristic polynomial is a primitive polynomial of degree $b$.

This code has the capability of correcting a single group of b-adjacent bit errors, detecting any combination of two groups of b-adjacent bit group errors, and detecting with a probability greater than 0.95 triple b-adjacent group errors. The high percentage of triple group error detection is made possible by the use of the RSP checker in the translator which provides a final check on the regenerated syndromes formed from the corrected word.

There is shown herein below a single four-adjacent bit error correcting/double four-adjacent bit error detecting code. Such code would be used for a 4 bit/BSM memory organization. The columns corresponding to data bits are selected from the columns of the second code shown herein above such that the number of 1's in the pairty check matrix is minimal whereby a smaller amount of circuitry is needed for the translator.

|←—Information Bits—→|←Check Bits→|

$$H=\begin{pmatrix} I & I & I & I & I & I & I & I & I & 0 & 0 \\ I & A & A^2 & A^3 & A^7 & A^8 & A^{13} & A^{14} & 0 & I & 0 \\ I & A^2 & A^4 & A^6 & A^{14} & A & A^{11} & A^{13} & 0 & 0 & I \end{pmatrix}$$

Number of information bits=32
Number of check bits=12

$$A=\begin{bmatrix} 0 & 1 & 0 & 0 \\ 0 & 0 & 1 & 0 \\ 1 & 0 & 0 & 1 \\ 1 & 0 & 0 & 0 \end{bmatrix}$$

The organization of the self-checking translator is as shwon in FIGS. 1 and 2. In the operation of this translator, syndromes are first generated by syndrome generator 14 from the bits in data word register (DWR) 12 according to the parity check matrix shown as the second code herein above. Thus, if $w$ is a word in DWR 12, the corresponding syndromes is given by the equation $$S = 1 \oplus Hw$$

where 1 is a $3b\times l$ matrix of all 1's and $$w=\begin{bmatrix} do, 1 \\ \cdot \\ \cdot \\ do, b \\ \cdot \\ \cdot \\ \cdot \\ dk+3, 1 \\ \cdot \\ \cdot \\ dk+3, b \end{bmatrix}$$

Thereby, all syndrome bits are equal to 1 where $w$ is a code word. Group pointers are then generated from the syndrome bits. Group pointers $G_o, G_1, \ldots, G_{k+3}$ are the lines which indicate those of the b-bit groups that are in error as the result of failures in a single BSM. The group pointers are generated as an implementation of logical assertions among syndrome bits.

If the syndrome bits S is expressed as the three b-bit vector $S_1$, $S_2$, $S_3$ as shown below $$S=\begin{bmatrix} S_1 \\ S_2 \\ S_3 \end{bmatrix},\ S_1=\begin{bmatrix} s_1 \\ \cdot \\ \cdot \\ s_b \end{bmatrix},\ S_2=\begin{bmatrix} s_{b+1} \\ \cdot \\ \cdot \\ s_{2b} \end{bmatrix},\ S_3=\begin{bmatrix} s_{2b+1} \\ \cdot \\ \cdot \\ s_{3b} \end{bmatrix},$$

it can be shown that if group $i$ ($i \leq k$) of the word w has an error pattern $e$, then $$\bar{S}_1 = e$$
$$\bar{S}_2 = A^i e$$
$$\bar{S}_3 = A^{2i} e \qquad (9)$$

Therefore, $$\bar{S}_2 = A^i \bar{S}_1$$
$$\bar{S}_3 = A^{2i} \bar{S}_1 \qquad (10)$$

Consequently, $G_i$ is given by $$G_i = [(\bar{S}_2 = (A^i\bar{S}_1)] \Lambda [S_3 = (A^{2i}\bar{S}_1)]$$

The group pointer for the check bit groups $G_{k+1}$, $G_{k+2}$, $G_{k+3}$ is given by $$G_{k+1} = \mathop{\Lambda}_{1=b}^{3b} (\bar{s}_i=0)$$
$$G_{k+2} = \left(\mathop{\Lambda}_{i=1}^{b} (\bar{s}_i=0)\right) \Lambda \left(\mathop{\Lambda}_{i=2b}^{3b} (\bar{s}_i=0)\right)$$
$$G_{k+3} = \mathop{\Lambda}_{i=1}^{2b} (\bar{s}_i=0) \qquad (11)$$

The group pointers have the following properties:

*a*. In code space $G_i = 1$ for all $i$

*b*. In single b-bit group error space, $G_i = 1$ for exactly one $i$.

*c*. In double b-bit group error space, $G_i = 0$ for all $i$. Actually, $G_i = 0$ for all $i$ for all syndrome patterns other than those in cases (*a*), (*b*).

Knowing which group is in error from the group pointers and since from equation (1) above, $S_i = e$, the corrector can correct a single group error according to the following equations:

Corrected Data Bits $\hat{d}_{ij} = d_{ij} \oplus G_i\bar{s}_j$ $0 \leq i \leq k$ $1 \leq j \leq b$ where $d_{ij}$ is the $j^{th}$ bit of the $i^{th}$ group. Corrected Check Bits $d_{k+1,j} = \hat{d}_{k+1,j} + G_{k+1} \cdot \bar{s}_j$ $$\hat{d}_{k+2,j} = d_{k+2,j} + G_{k+2} \cdot \bar{s}_{j+b}$$
$$\hat{d}_{k+3,j} = d_{k+3,j} + G_{k+3} \cdot \bar{s}_{j+2k}$$
$$1 \leq j \leq b \qquad (4)$$

The final check on the corrected word at the memory data register (MDR) interface is again achieved by employing the self-testing RSP checker and the self-testing parity checker. The RSP checker can detect up to three groups of miscorrections in the corrected word resulting from circuit failure in the translation. The use of RSP checkers at the memory data register (MDR) interface accounts for the high probability of multiple group error detection (triple group errors, quadruple group errors) performed by the translator. Furthermore, a double group error in the presence of a single failure in the translator cannot cause an erroneous output that goes undetected.

The RSP checker also has as outputs 3b lines which are the check bits generated from the incoming byte-parity data word during the WRITE cycle. The byte parity bits in the read cycle can be obtained directly from a subset of the corrected check bits for different combinations of word sizes and BSM widths (32 bit words with a 4 bit/BSM memory organization, 48 bit words with a 6 bit/BSM memory organization, 64 bit words with an 8 bit/BSM memory organization, etc.). In these situations, the parity generator and checker can be integrated in the RSP checker. It has been found that a saving in excess of 16 percent of translator circuitry can thus be achieved.

The following table shows the percentage increase of circuitry required to achieve self-checkability in the memory translator over conventional translator implementation with and without simple parity checking. The table is based upon a 32-bit data word.

to be noted that the following is accomplished thereby.

1. Every error resulting from failures within a single BSM is corrected.
2. Every error resulting from failures in two BSM's is detected.
3. A probability of greater than 95 percent is provided for the detecting of errors resulting from failures in three or four BSM's.
4. Every failure and every probable accumulation of failures in the translator does not produce an erroneous output that goes undetected.

In summarizing the foregoing, there is presupposed the existence of a memory organization which comprise a $k$ quantity of b-bit width BSM's (basic storage modules) for data and an $r$ quantity of b-bit width BSM's for check bits whereby the amount of bits of a word in the data word register is $kb + rb$. The quantity $r$ is chosen to have a value of $2t + d$ wherein $t$ is the quantity of b-adjacent errors desired to have corrected and $d$ is the quantity of additional errors desired to be detected. The error detection and correction code is one which can be associated with an arrangement whereby for each word there are provided $mk$ groups of $b/m$ width for data and mr groups of $b/m$ width for check bits with $m(k + r) \leq 2^{b/m} + 1$ and $mr \leq 2^{b/m} -1$. The code can correct specified combinations, of bits in the b/m-bit group (all of $mt$ ( $b/m$)-bit adjacent errors, if desired), detect under all conditions, all of

| | Number of circuits for self-checking translator | Number of circuits for conventional implementation with simple parity checking | Percent increase to achieve self checking property | Number of circuits for conventional implementation with number checking | Percent increase to achieve self-checking property |
|---|---|---|---|---|---|
| 4 bit/BSM | 1,613 | 1,321 | 22.1 | 1,195 | 36.7 |
| 8 bit/BSM | 1,967 | 1,561 | 26 | 1,435 | 37.1 |

There now follows hereinbelow a description of the multiple group error detection capability of this second code.

In this latter connection, the percentage of undetected triple group errors at the input of the translator is given by $$n-3/(2^b-1)^2$$

where $n$ is the total number of b-adjacent bit groups and $b$ is the bit width of the BSM. The percentage of undetected quadruple b-adjacent bit group errors can similarly be shown to be $$n-42^b-1)^2 + 1/(2^b-1)^3$$

The following tables show these percentages for different BSM widths and computer word sizes.

Percentage of Triple Group Errors Detected

| | 32-bit word | 48-bit word | 64-bit word |
|---|---|---|---|
| 4 bit/BSM | 97.4% | 95.7% | — |
| 6 bit/BSM | — | 99.8% | — |
| 8 bit/BSM | 99.99385% | 99.99% | 99.98% |

Percentage of Quadruple Group Errors Detected

| | 32-bit word | 48-bit word | 64-bit word |
|---|---|---|---|
| 4 bit/BSM | 96.86% | 95.08% | — |
| 6 bit/BSM | — | 99.82% | — |
| 8 bit/BSM | 99.9954% | 99.992% | 99.989% |

In recapitulating the capabilities of the inventive codes together with their self-checking translator, it is $m(t + d)$ $(b/m)$-bit adjacent errors not corrected, detect with an extremely high probability, $$\max.\left\{0, 1-\binom{mk+mt-j}{mt}\frac{2^{jb/m}-1}{(2^{b/m}-1)^{mr}}\right\}$$

$m(t+d)+j$ $(b/m)$-bit adjacent errors with $j \geq 1$, and detect all $m(t+d)+j$ $(b/m)$-bit adjacent errors $(j \geq l)$ which do not change a code word into a correctable word.

As an example of the above, let it be assumed that a memory organization is employed wherein $b$ is a 16-bit width group, $k = 4$, and $r = 3$, and $t$ and $d$ are both taken to be 1.

With this example in the case where $m$ is taken to be 1, the code corrects 16-adjacent errors in any BSM (seven such errors being possible). There are $1 + 7(2^{16}-1)$ syndrome patterns which are correctable. There are $2^{48}$ possible syndrome patterns. Failures which produce any of the $2^{48} - 7(2^{16}) -6$ error patterns distinct from the correctable ones will be detected. These patterns include those formed by any 16-adjacent errors in any two BSM's.

With the example in the case where m is taken to be equal to 2, the code will correct any to all of the $$\binom{14}{2} = 91$$

8-adjacent errors in any half BSM. A possible choice is the seven adjacent groups, one in each BSM. If the latter choice is made, then the code has the same properties as in the case where $m = 1$, i.e., $[2\cdot 7 \leq 2^{8} + 1, 2\cdot 3 \leq 4 2^{8} - 1]$.

Generally, the inventive code is defined by choosing particular columns of the matrix M.

$$M = \begin{pmatrix} I & I & \ldots & I & \ldots & I & I\,0\,0\,0 \\ I & A & \ldots & A^{i} & & A^{k-1} & 0\,I\,0\,0 \\ I & A^{2} & \ldots & A^{2i} & & A^{2(k-1)} & \ldots \\ \cdot & \cdot & & \cdot & & \cdot & \ldots \\ \cdot & \cdot & & \cdot & & \cdot & \ldots \\ I & A^{r-1} & & A^{(r-1)i} & & A^{(r-1)(k-1)} & 0\,0\,0\,I \end{pmatrix}$$

to constitute the columns of the parity check matrix corresponding to the code wherein A is a bxb matrix which generates the multiplicative group of $GF[2^{b}]$ [2]. Suitably, a good choice for A is the companion matrix of a primitive polynomial of degree b with fewest terms over GF[2] [2,3]. In M, I is a $b \times b$ identity matrix, $2^{b} - 1 > r$ and $k < 2^{b} - 1$.

The error correction and detection is based upon the properties of combinational logic functions termed group pointers which point to groups in error and error pattern indicators which specify possible corrections for bits within a group. The equations for generating the group pointers and error pattern indicators can be derived from the parity check matrix M in a similar fashion as described in Code 1.

Figure 3A:
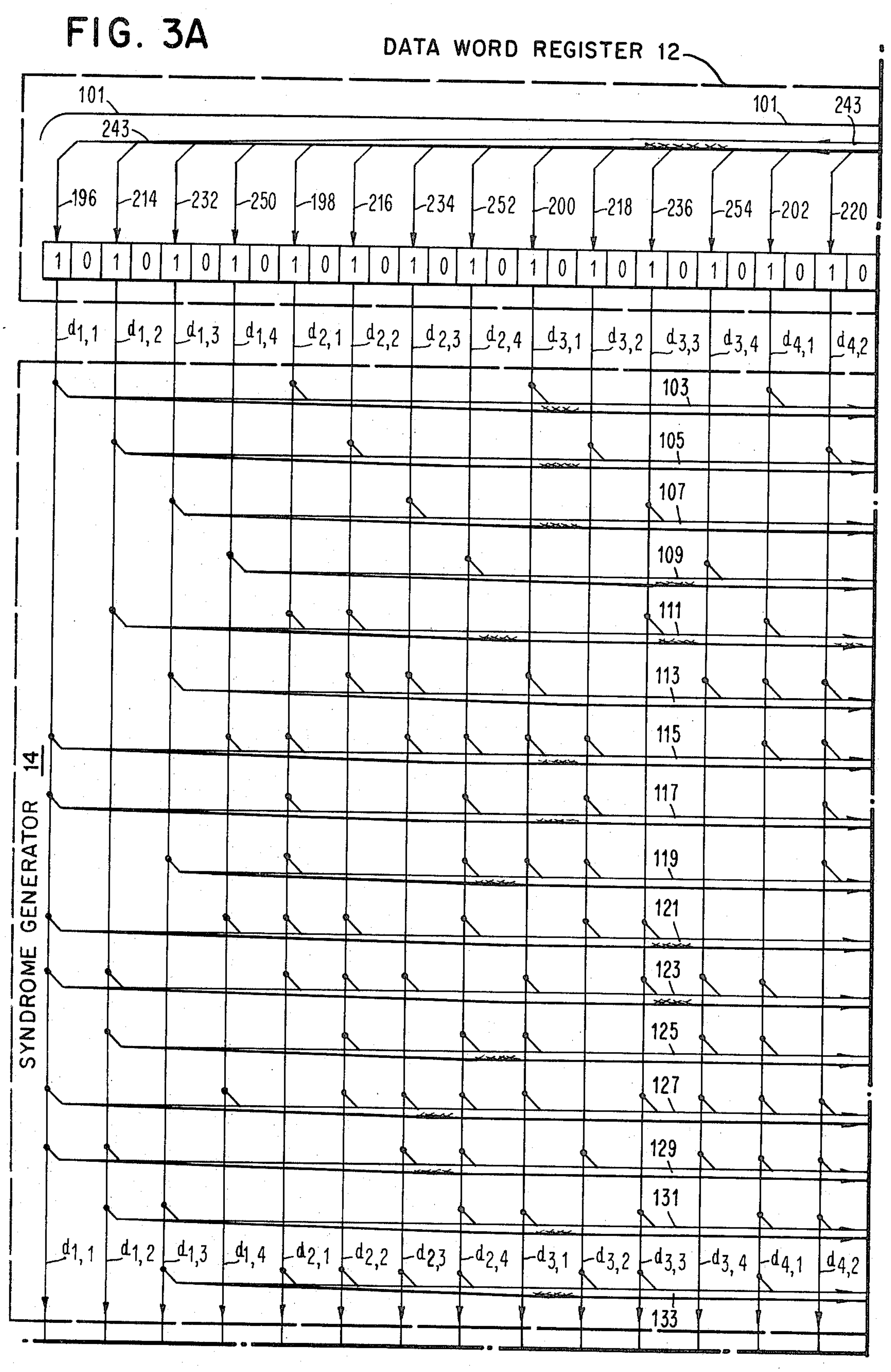
Figure 3B:
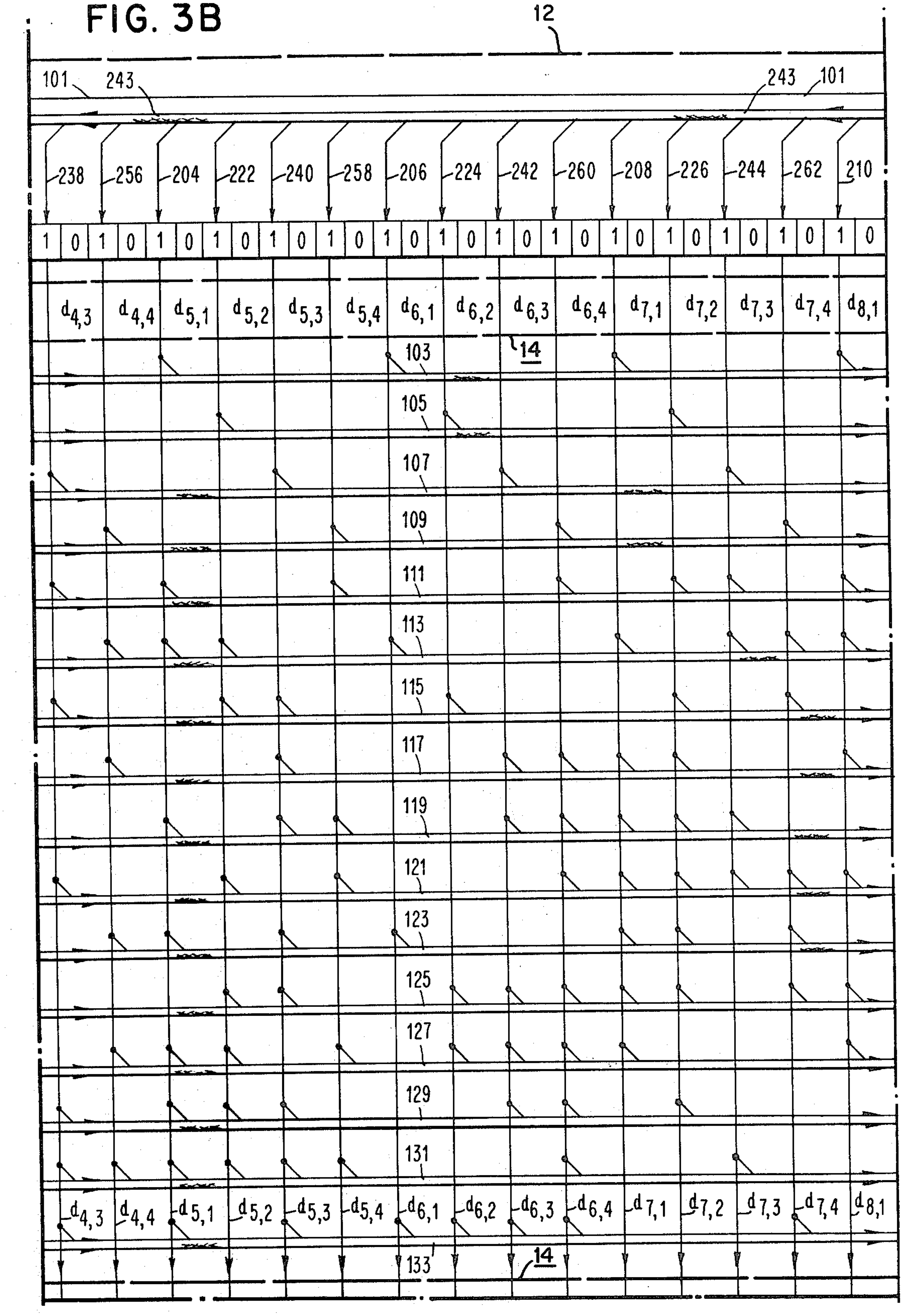
Figure 3C:
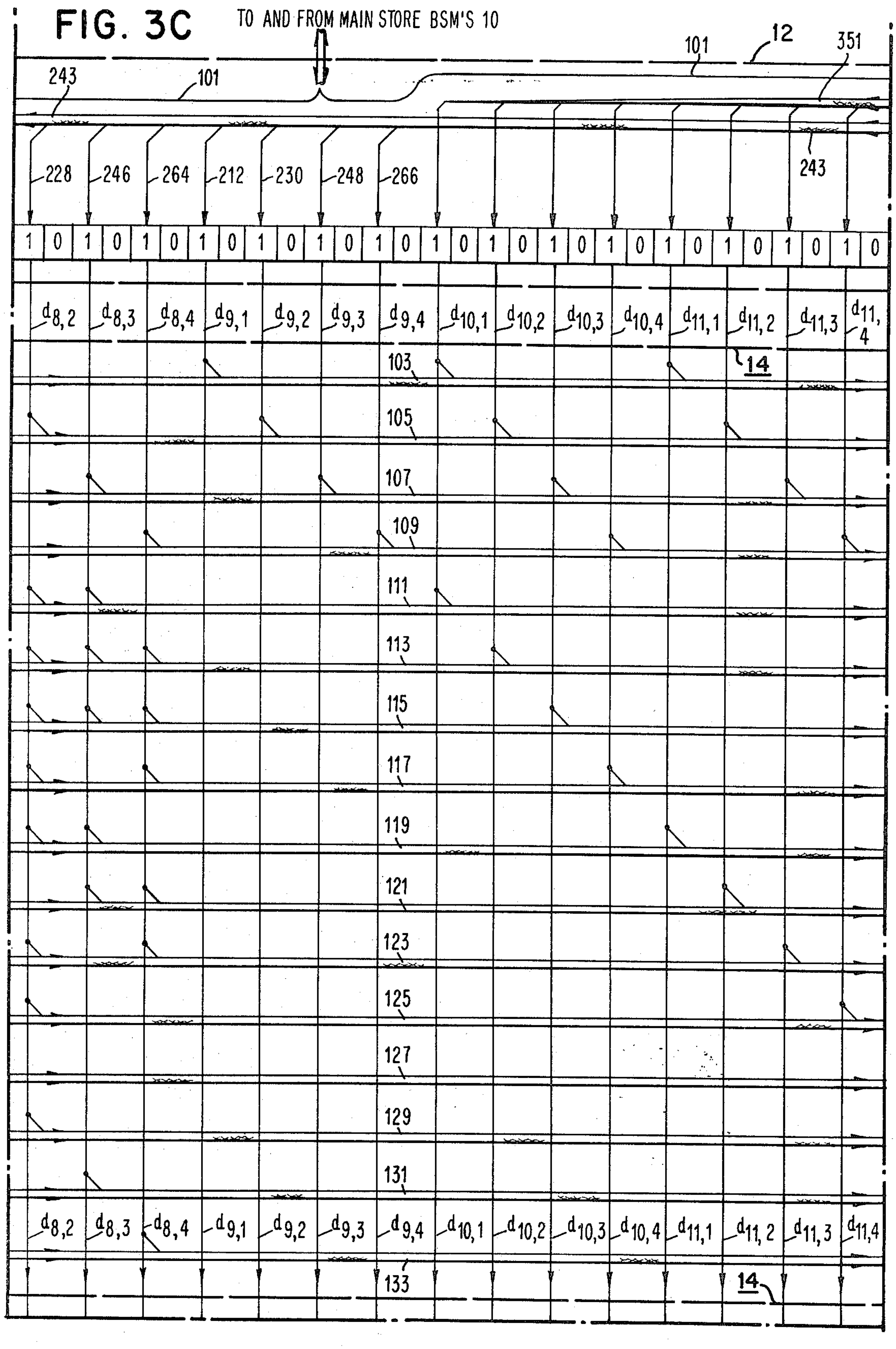
Figure 3D:
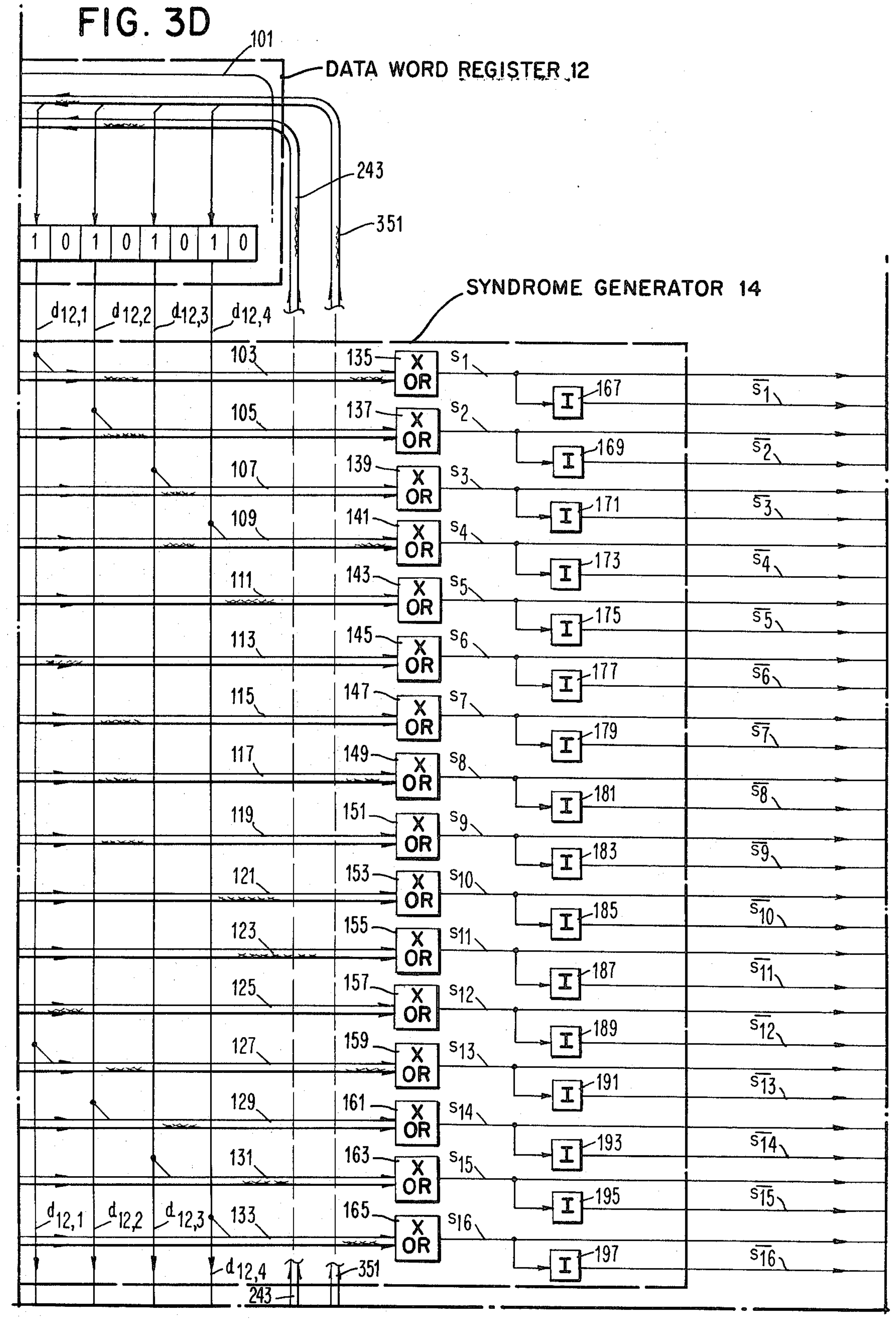
Figure 3E:
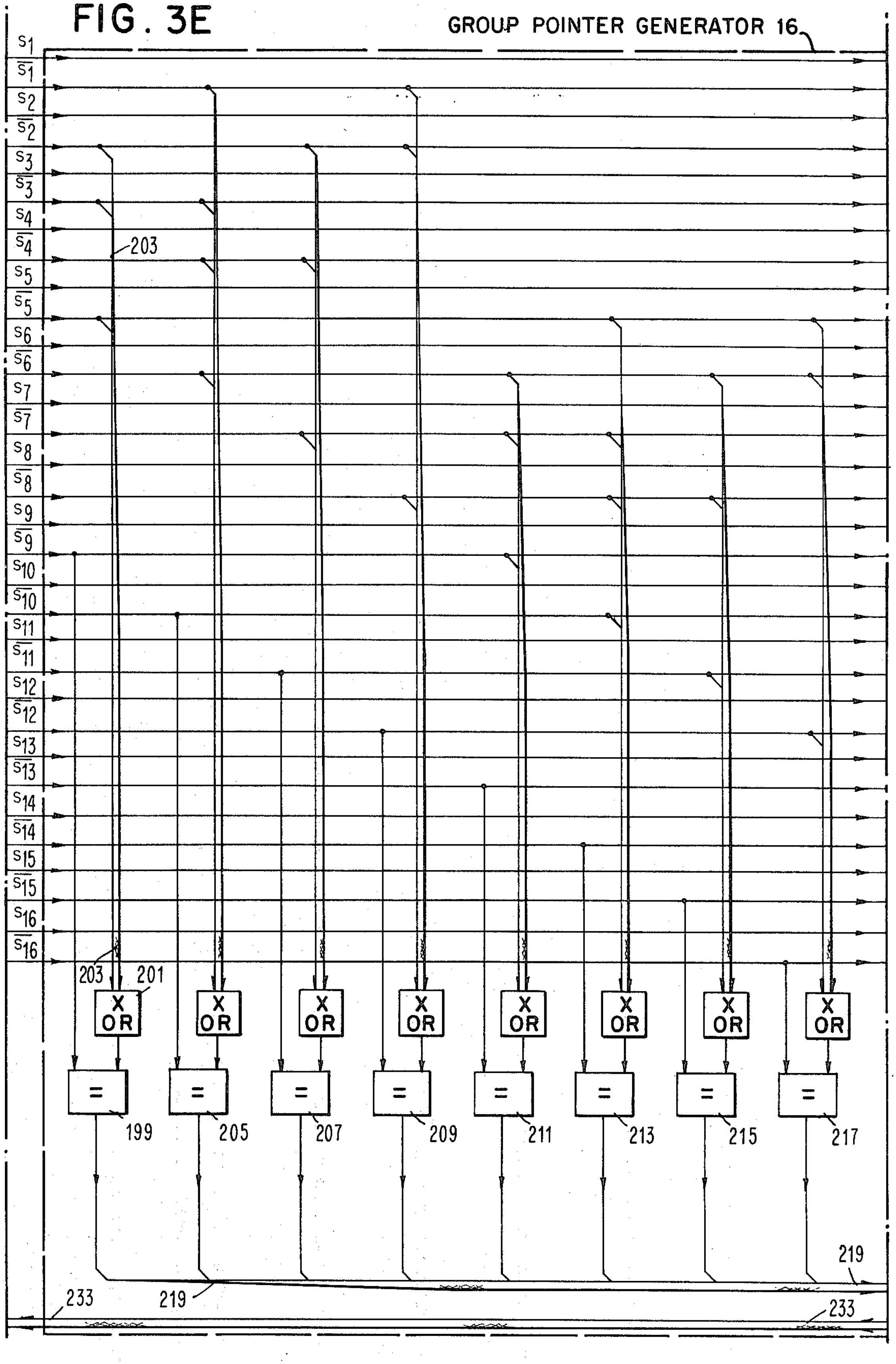
Figure 3F:
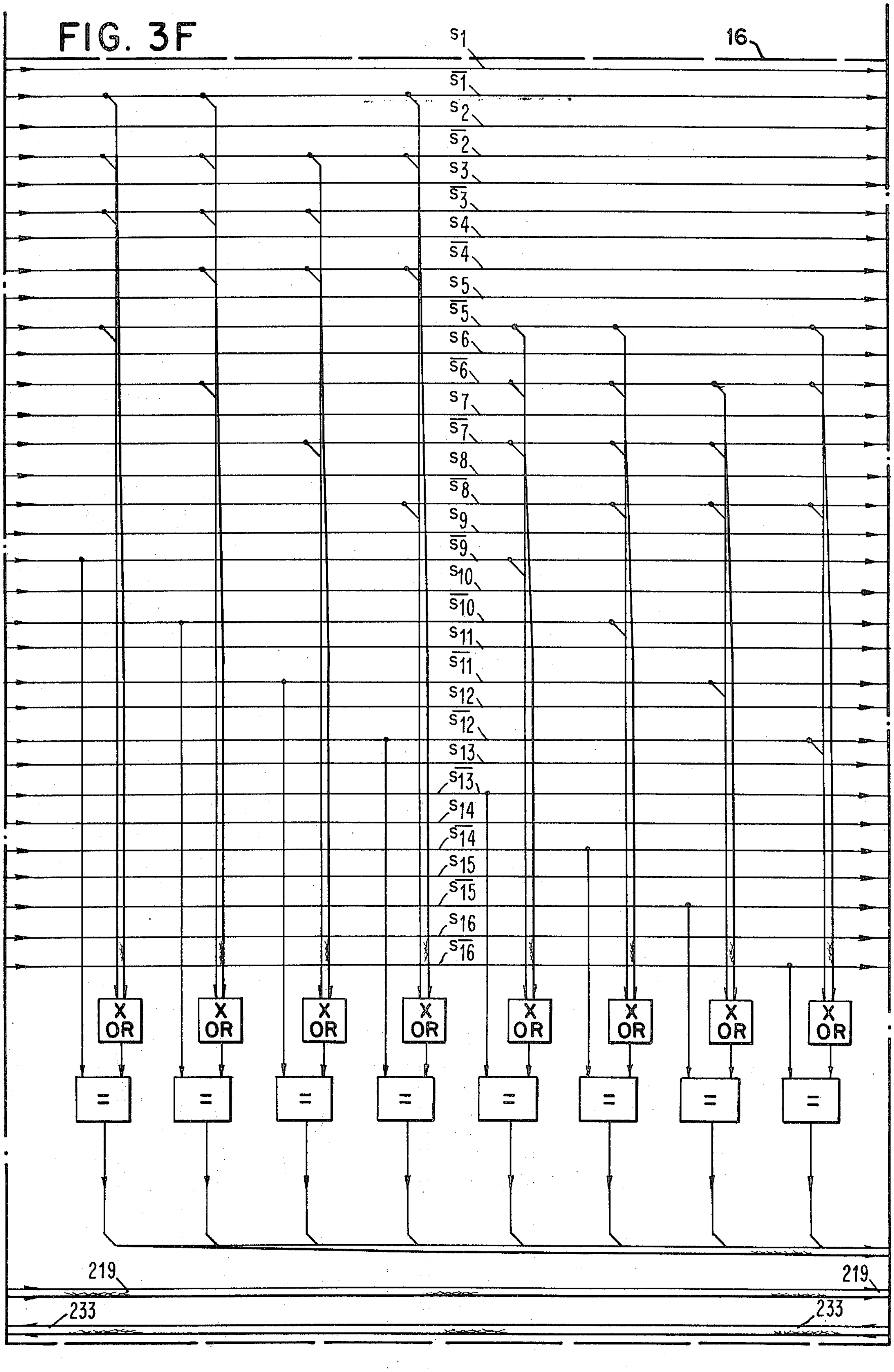
Figure 3G:
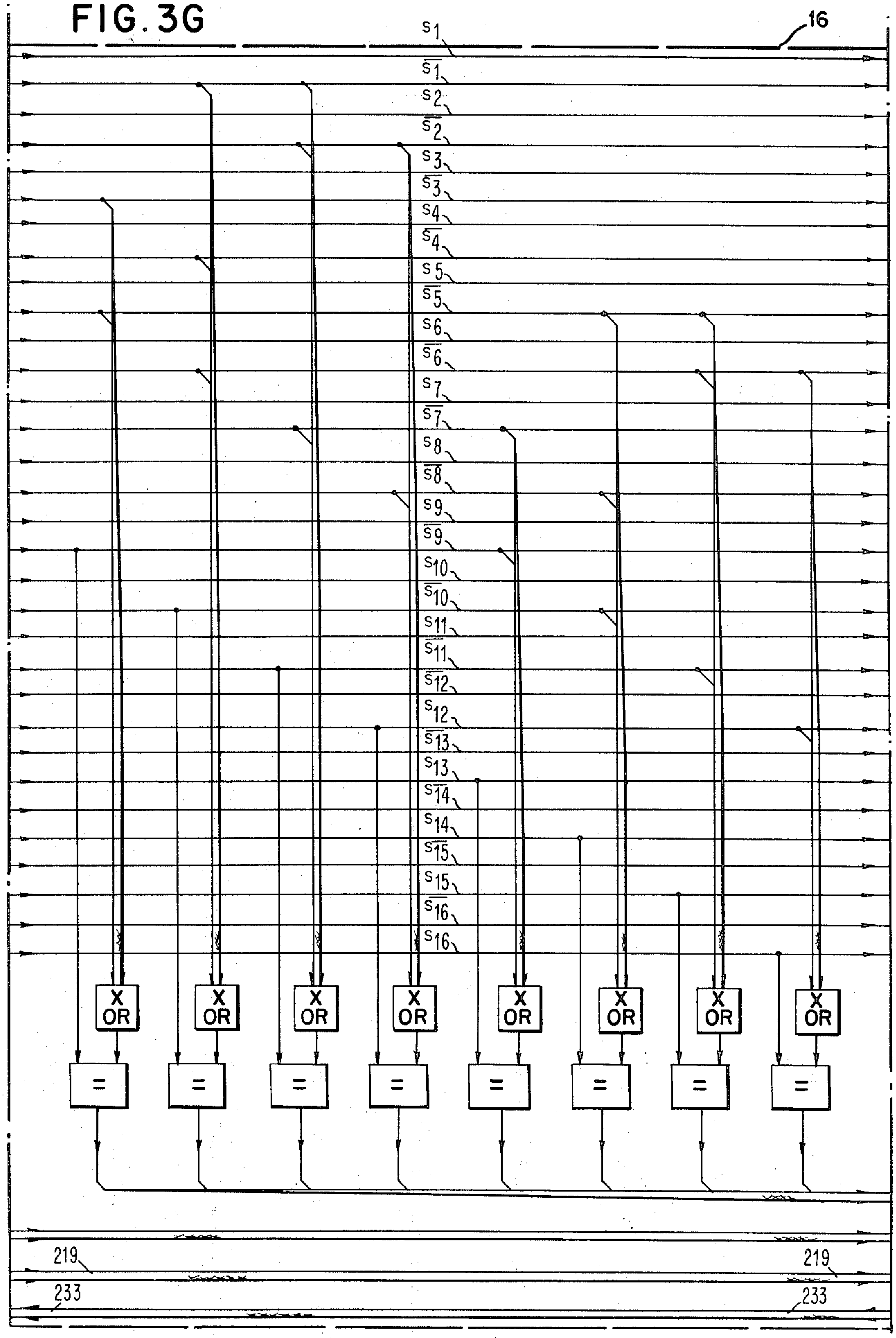
Figure 3H:
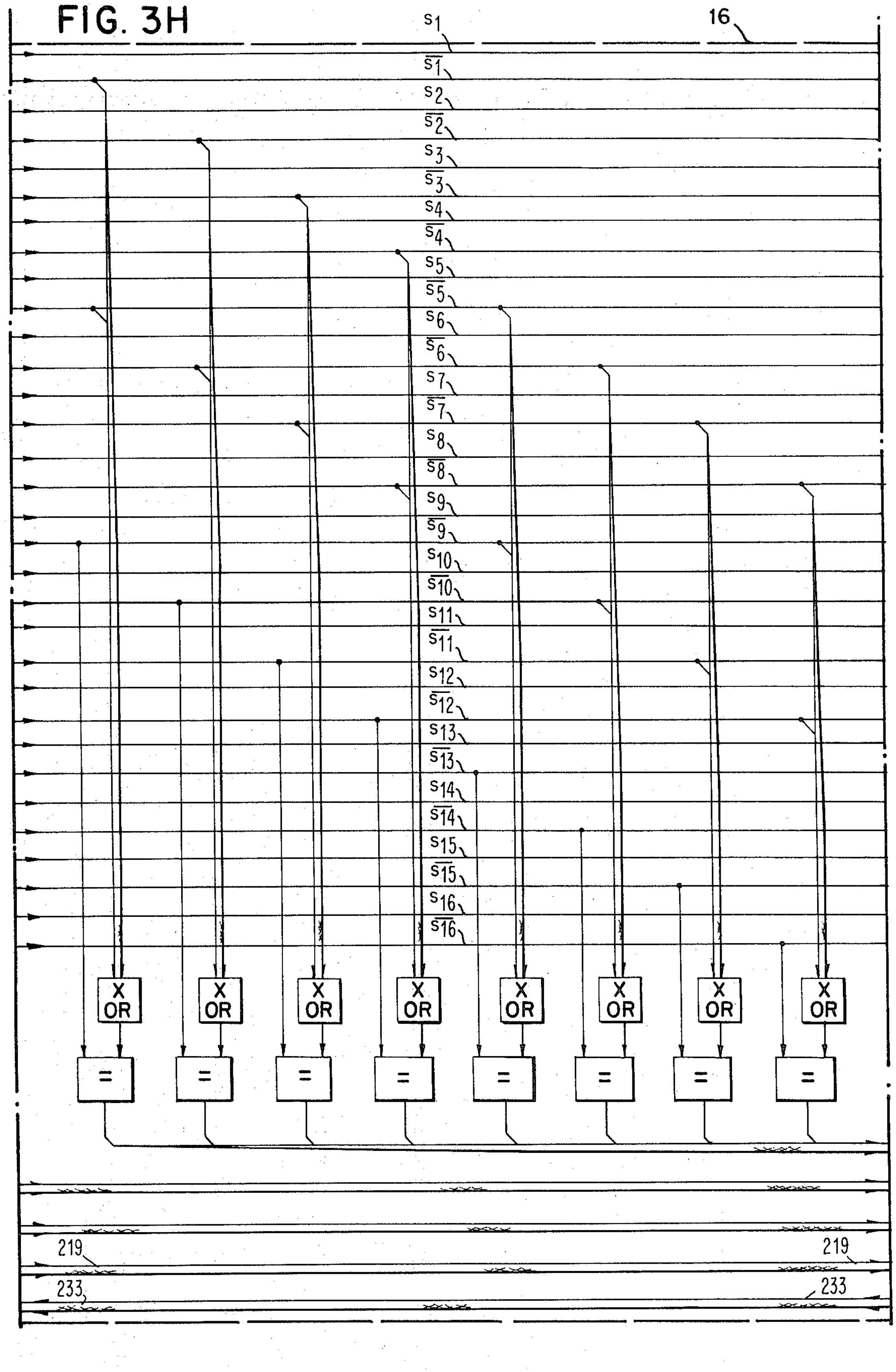
Figure 3I:
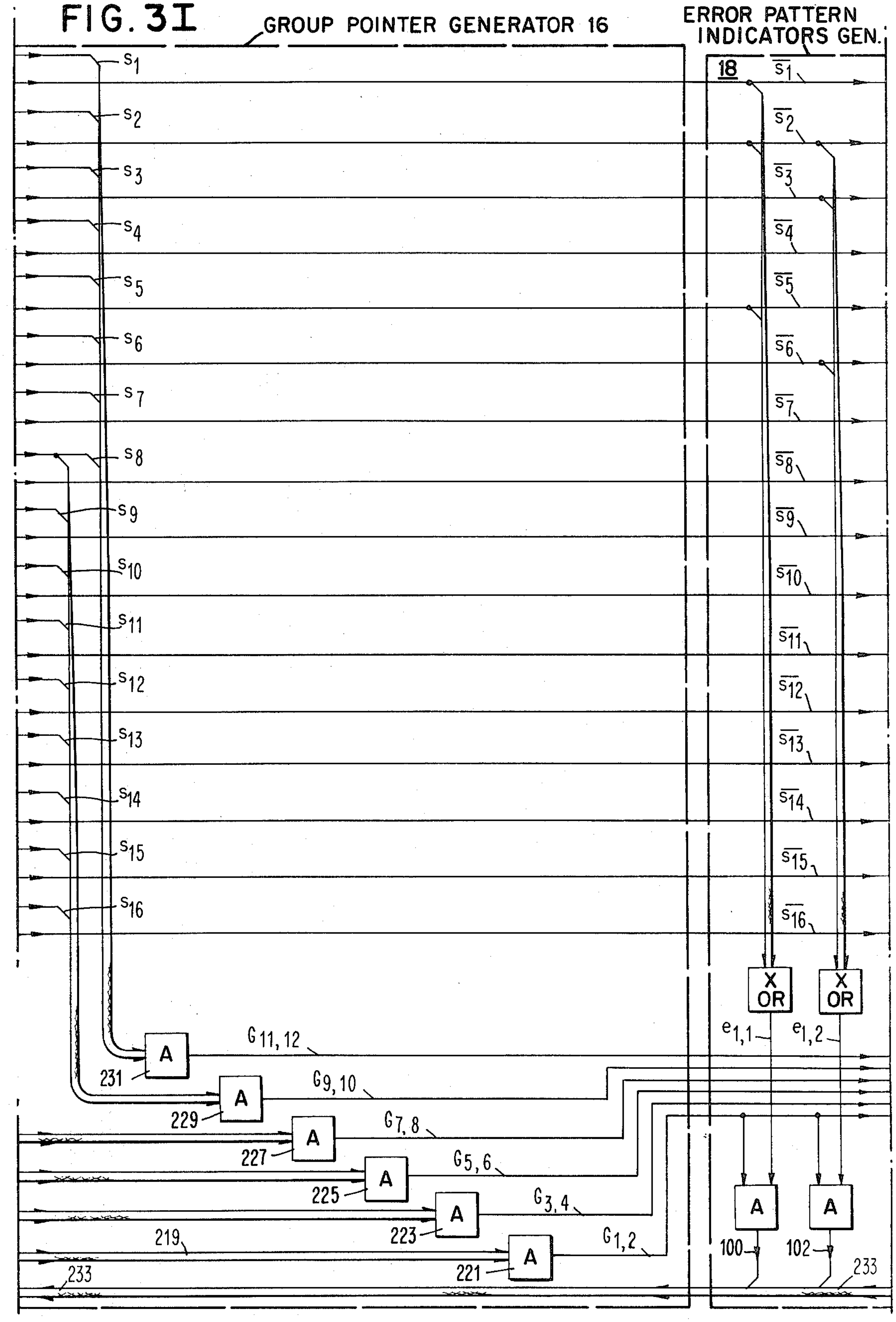
Figure 3J:
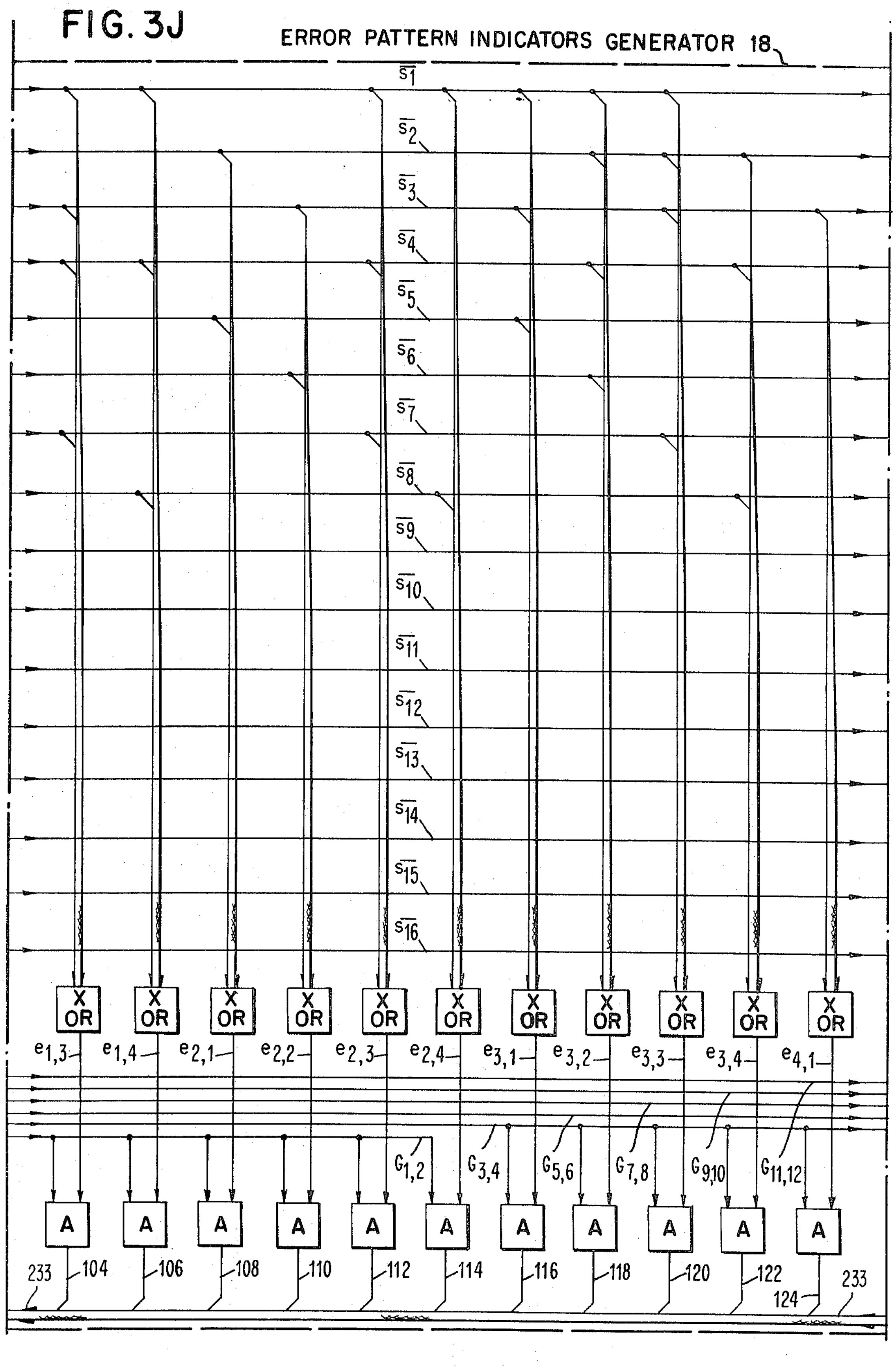
Figure 3K:
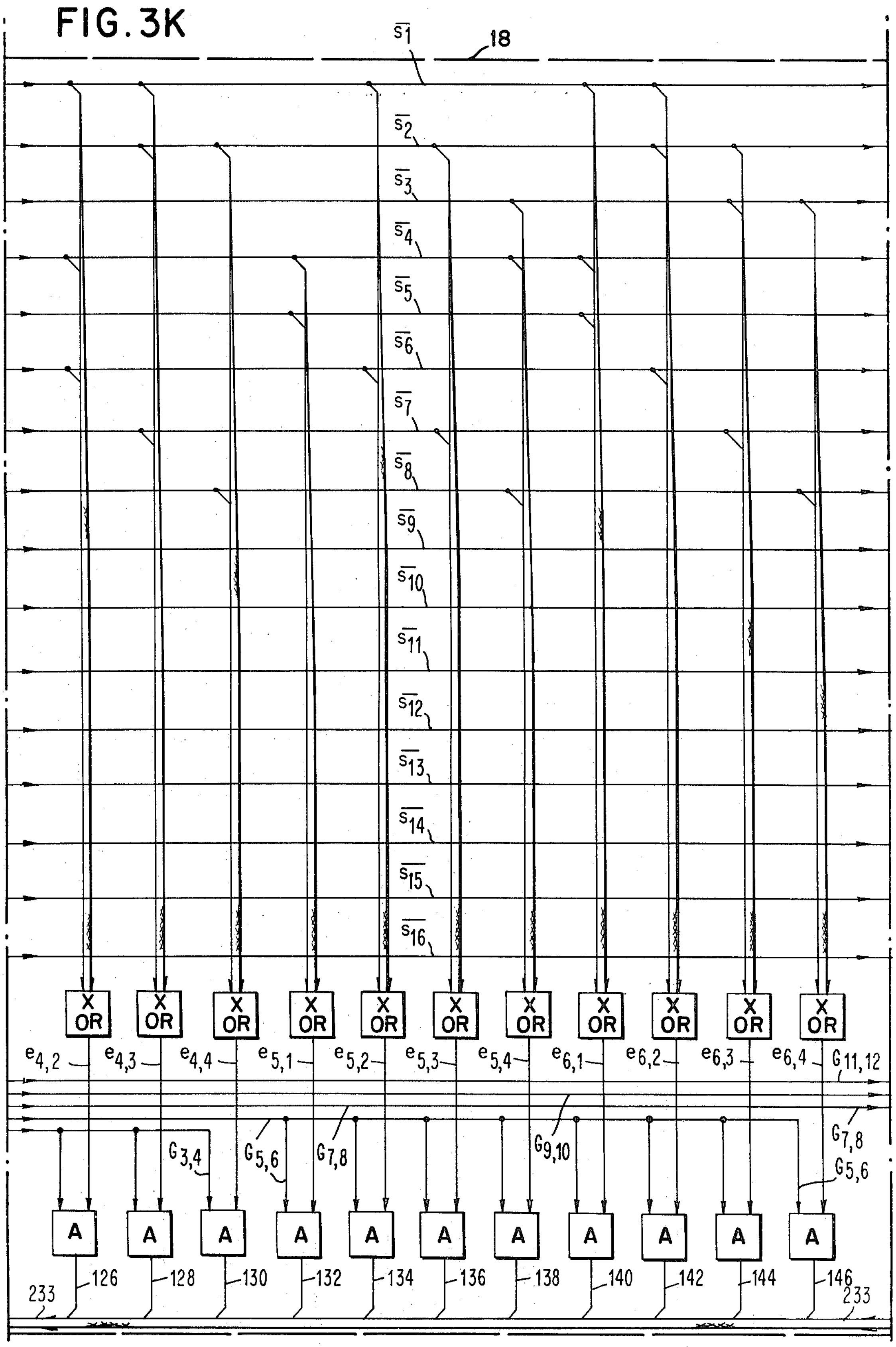
Figure 3L:
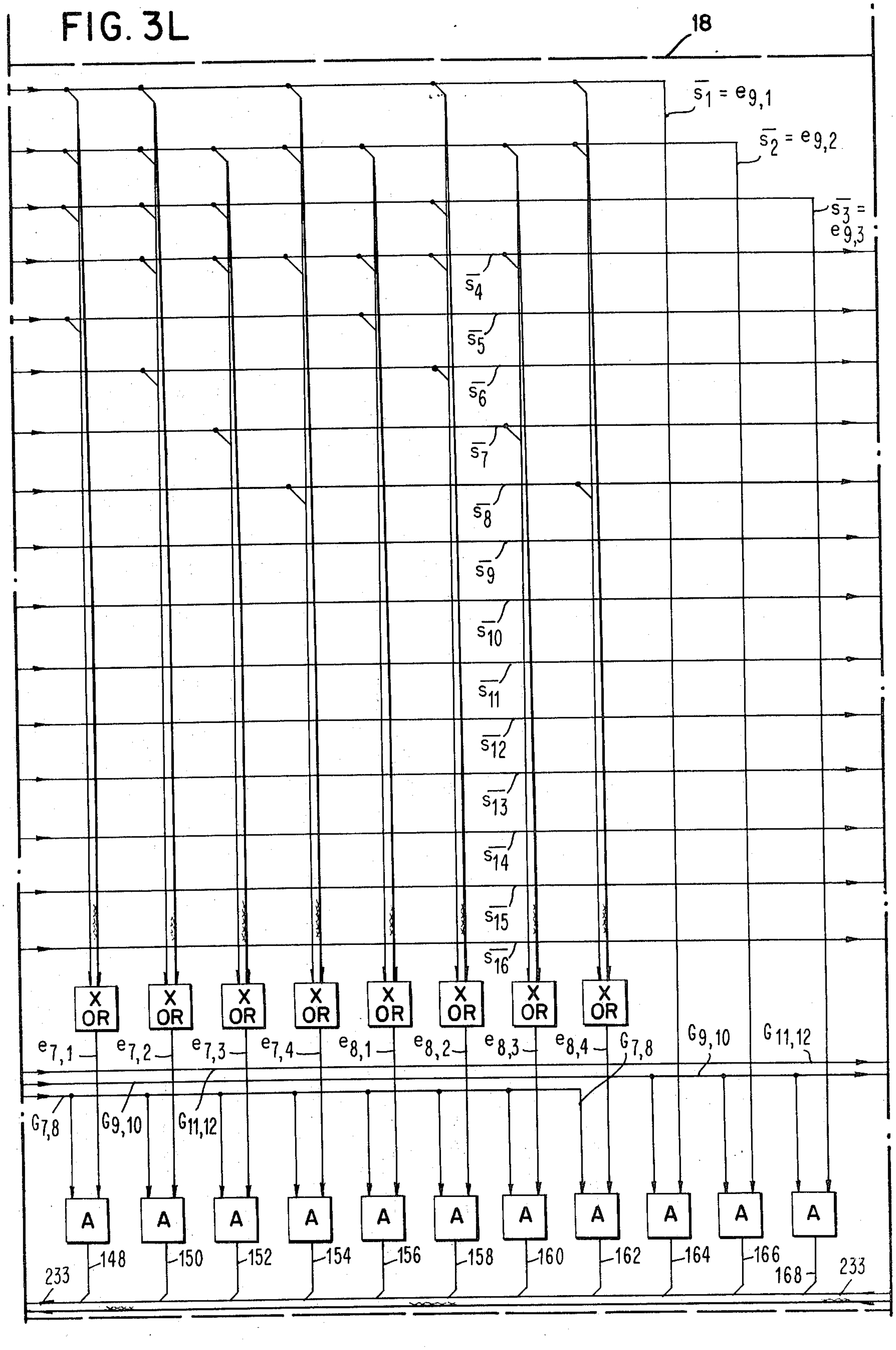
Figure 3M:
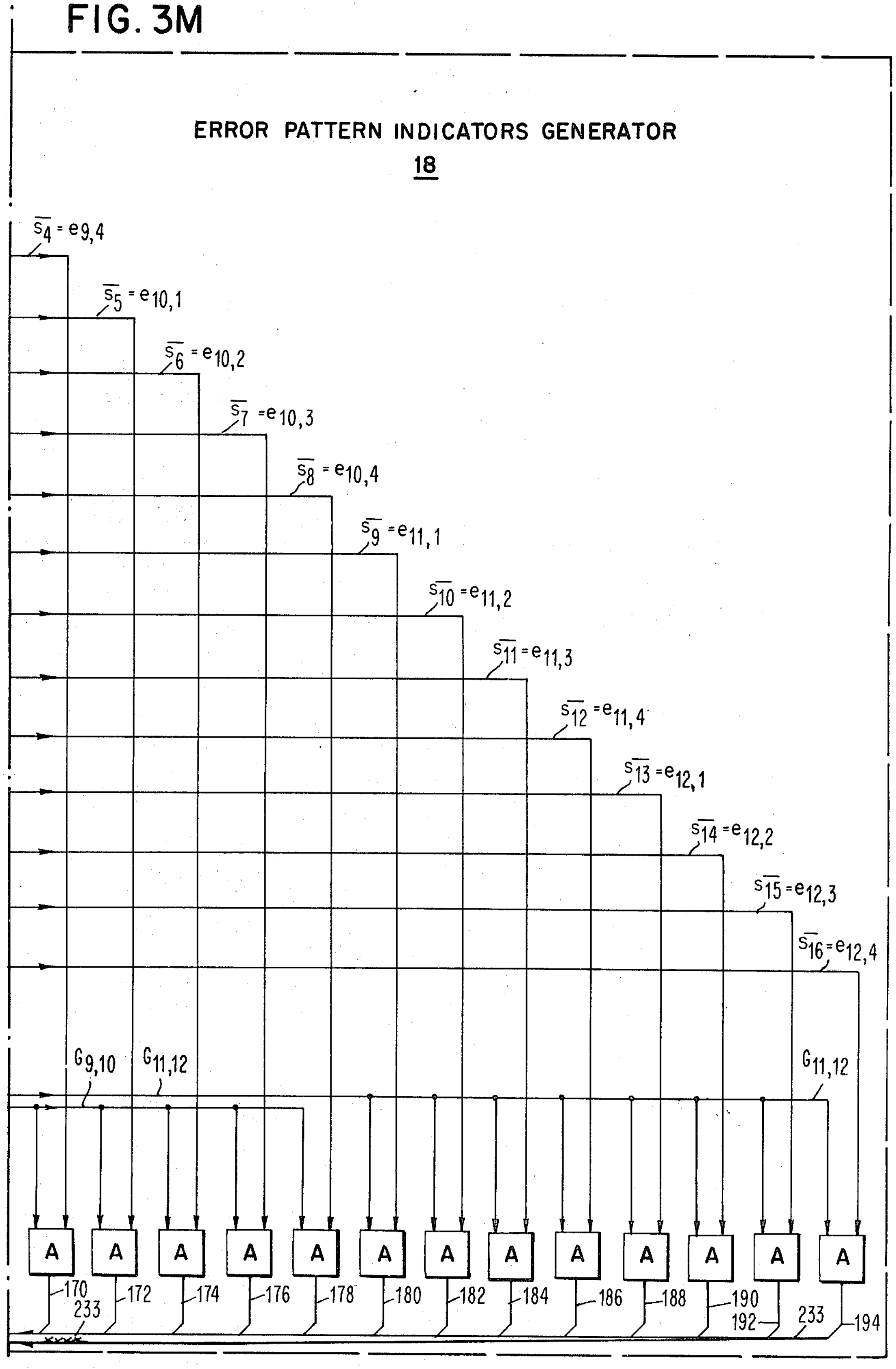
Figure 3N:
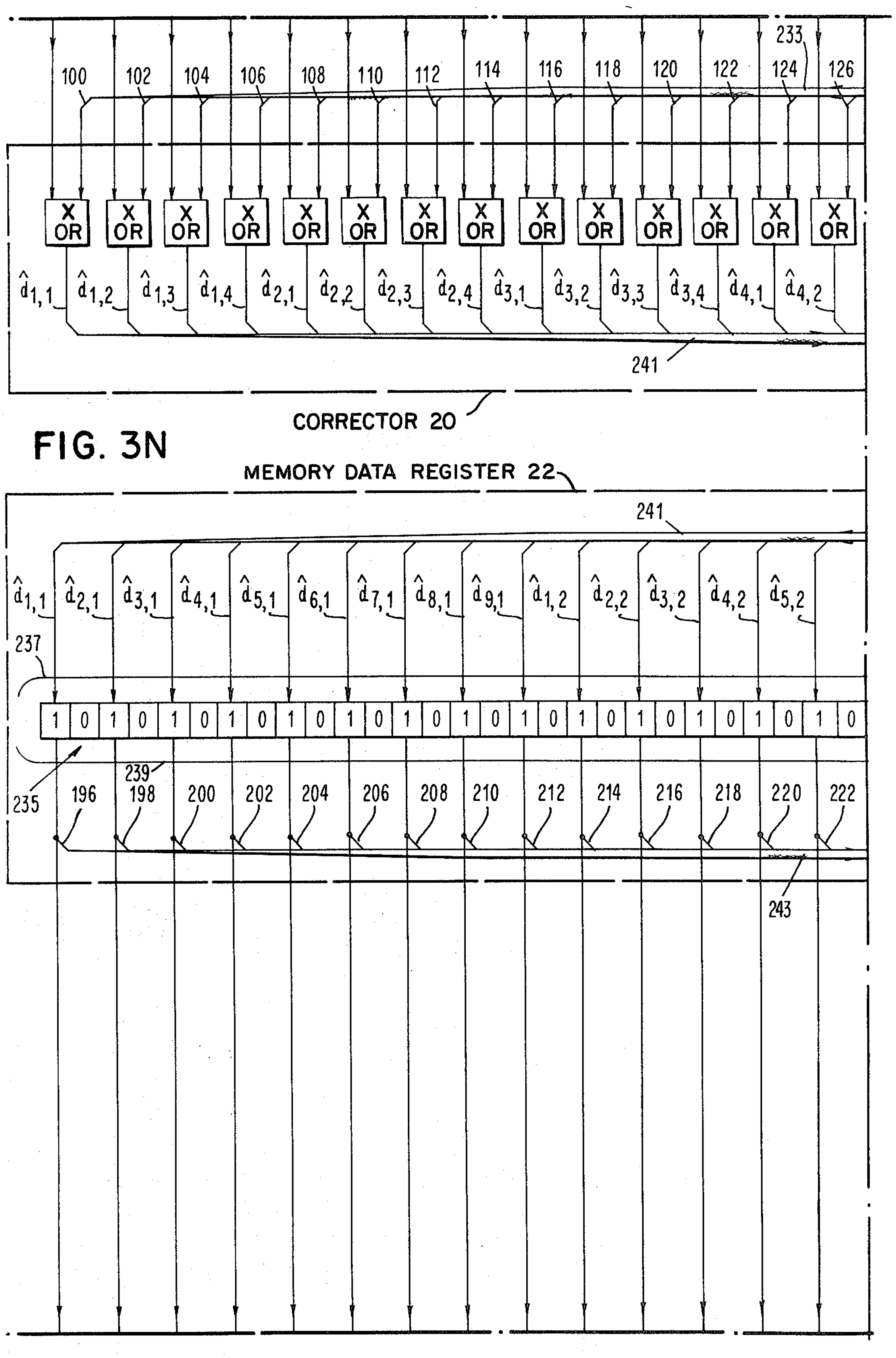
Figure 3P:
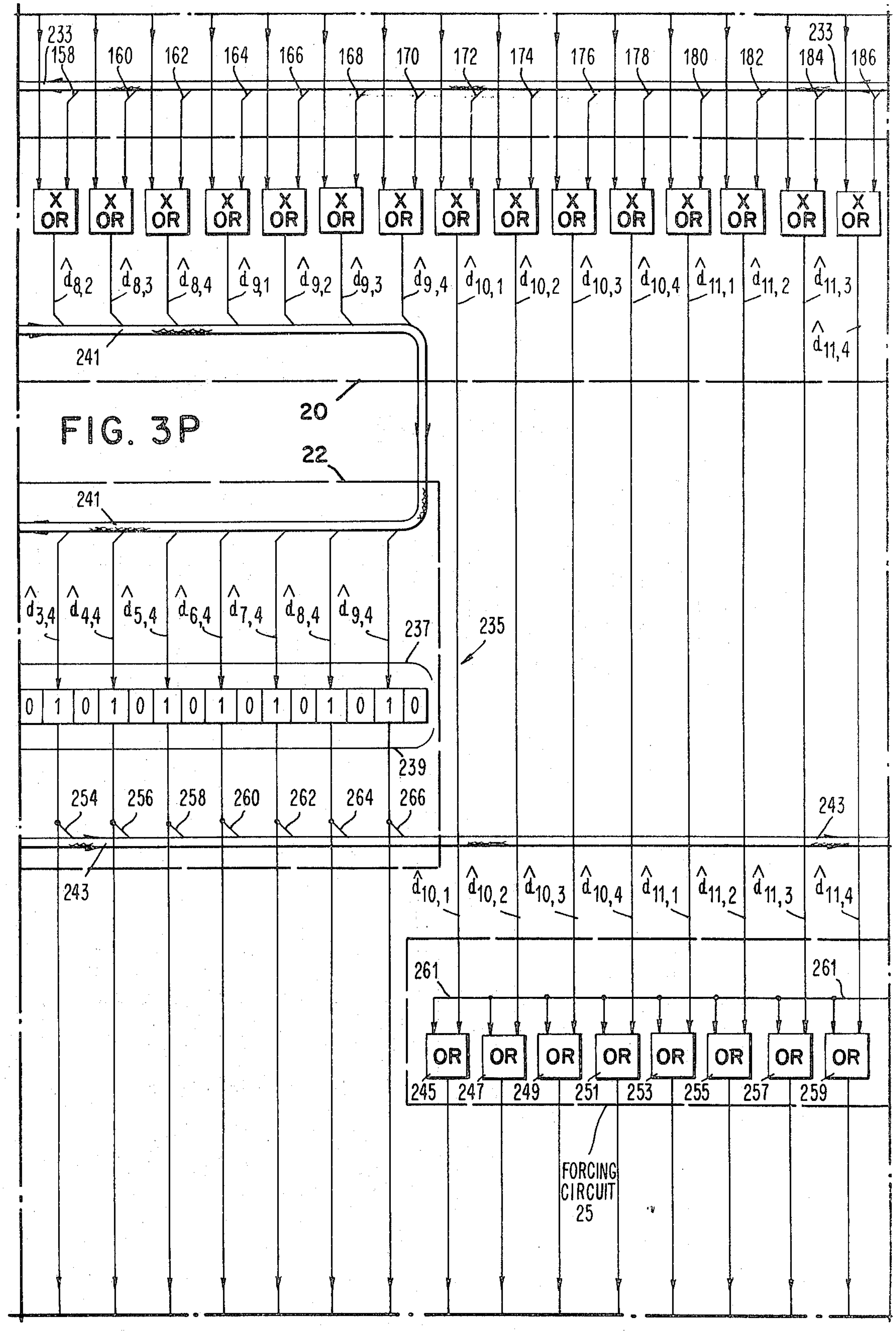
Figure 3Q:
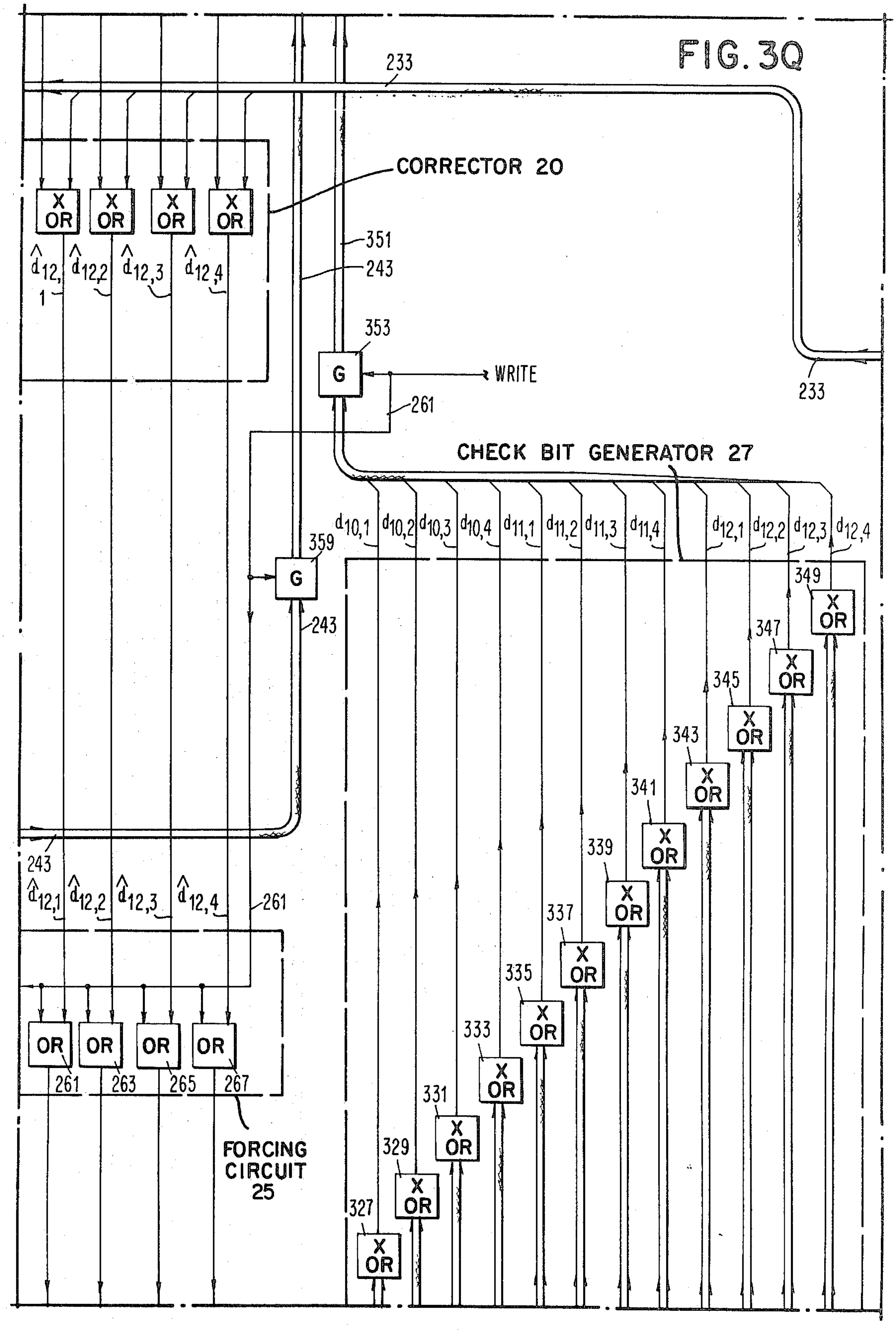
Figure 3R:
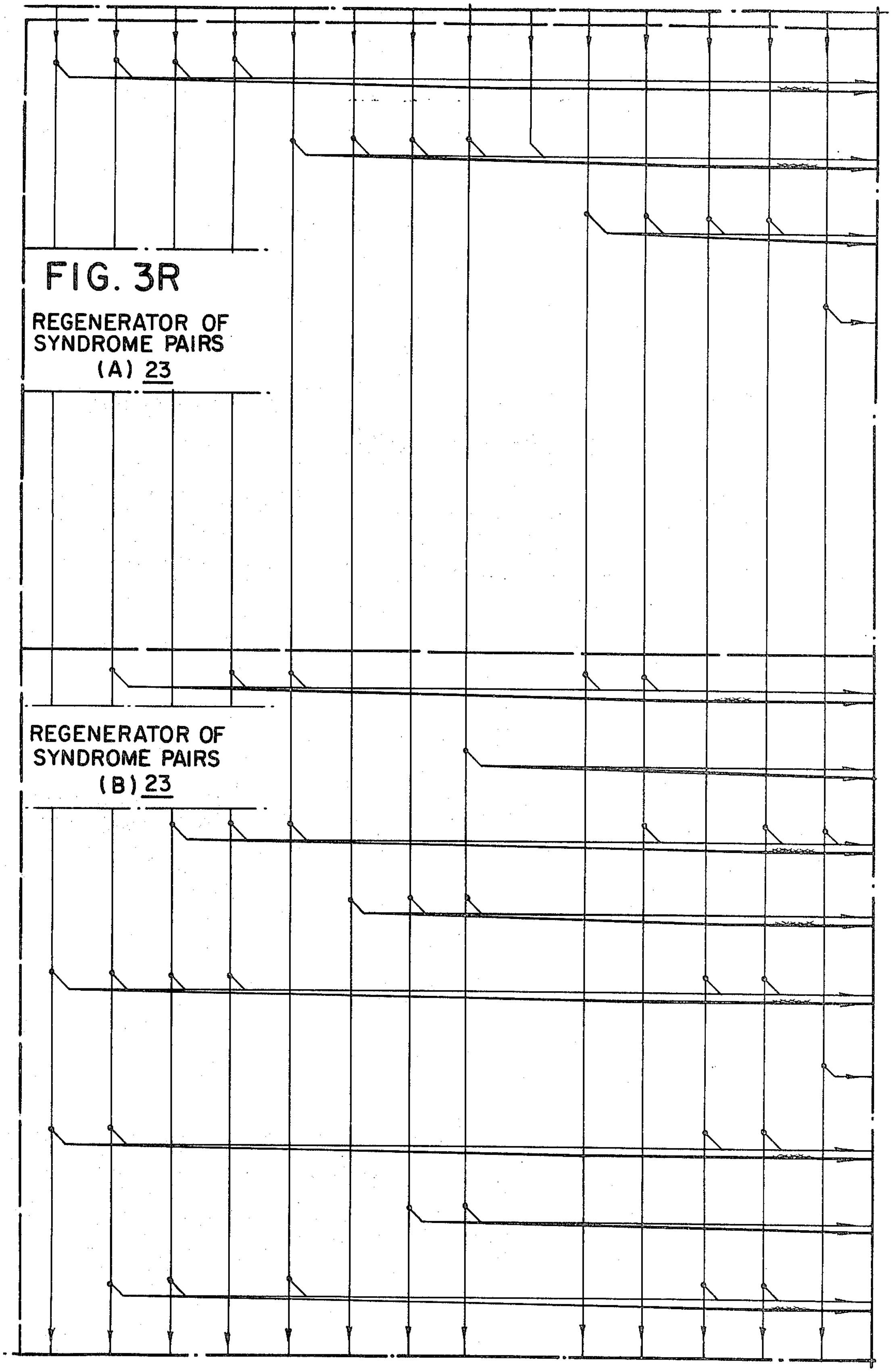
Figure 3S:
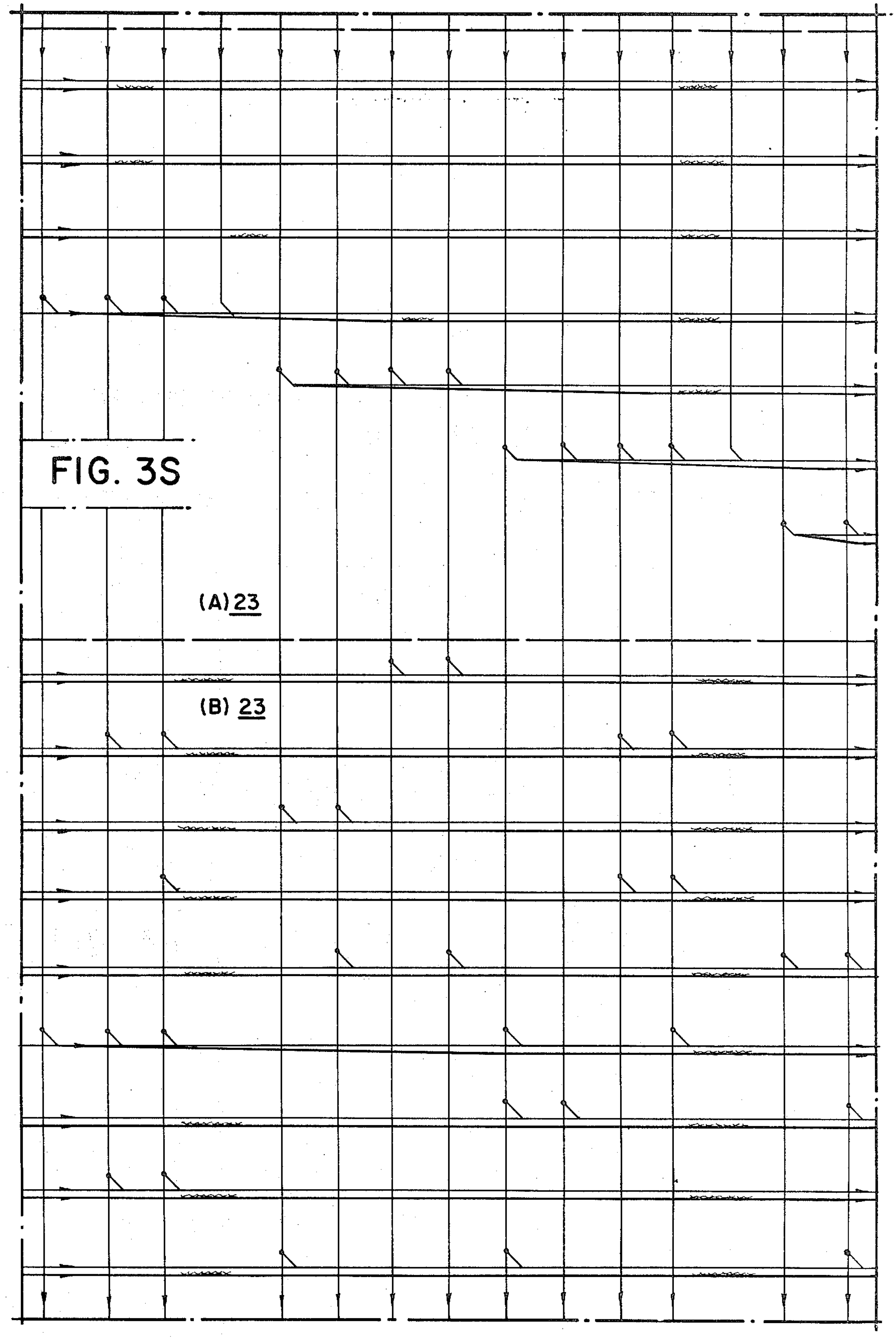
Figure 3T:
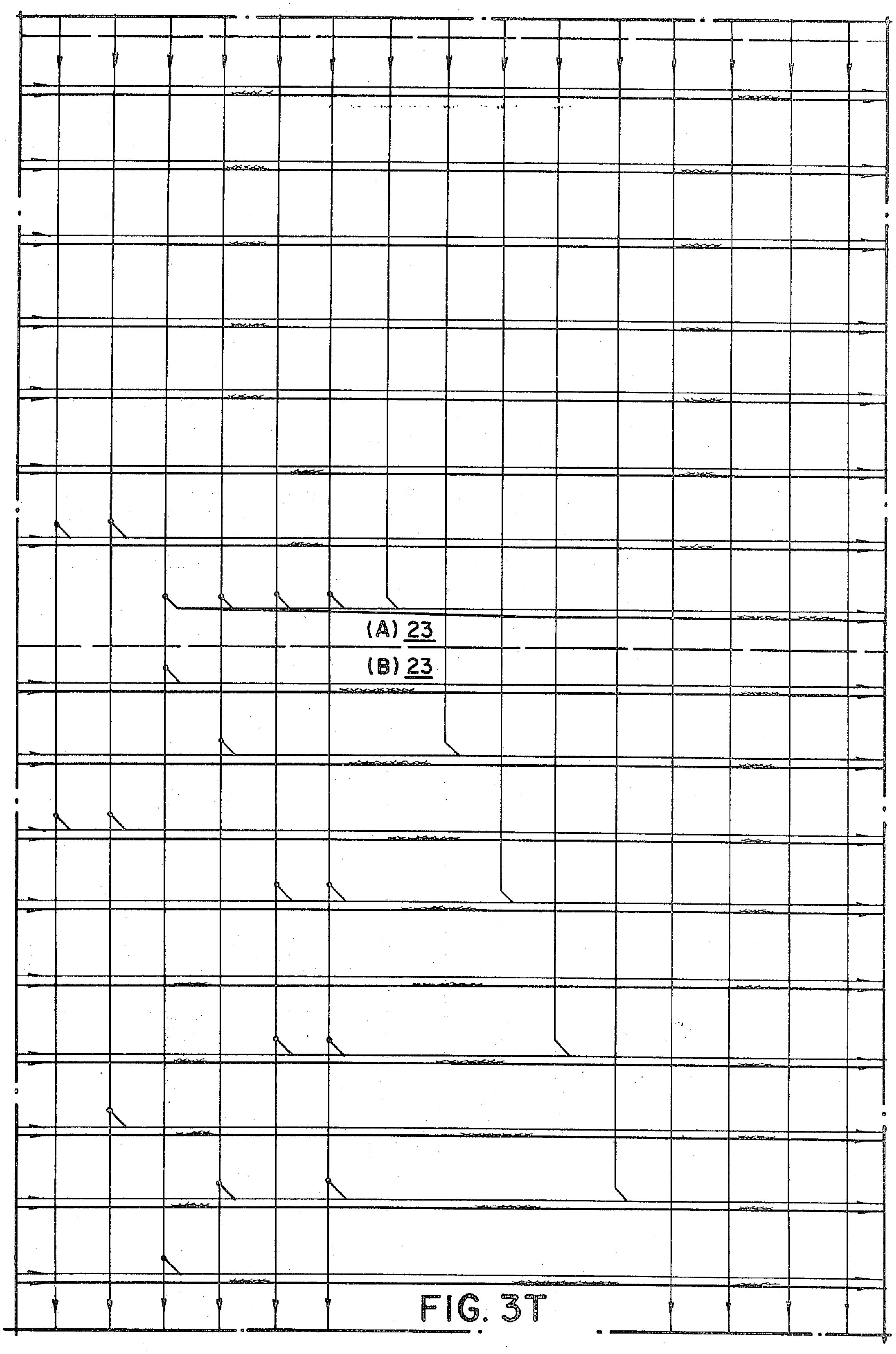
Figure 3U:
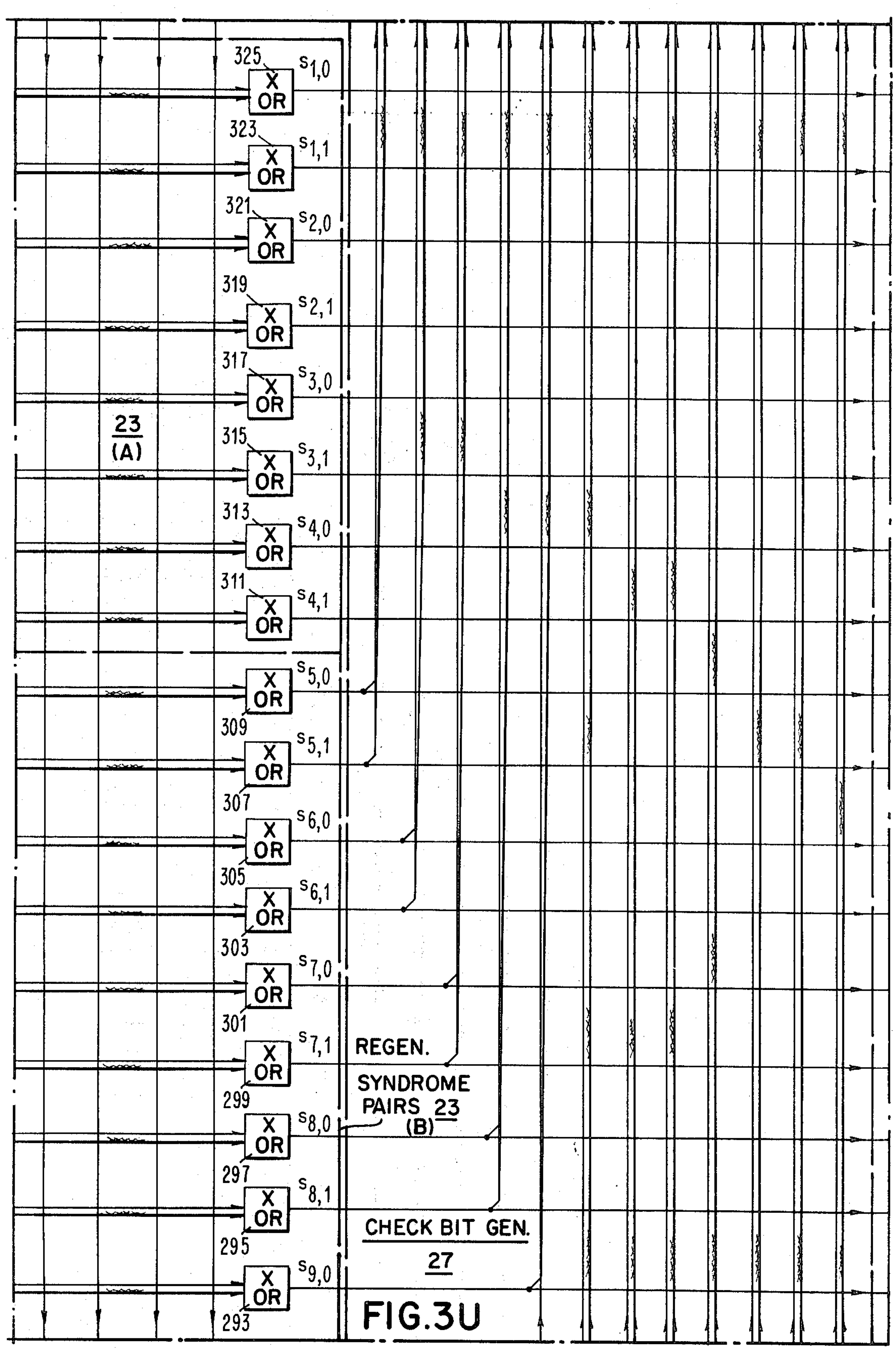
Figure 3V:
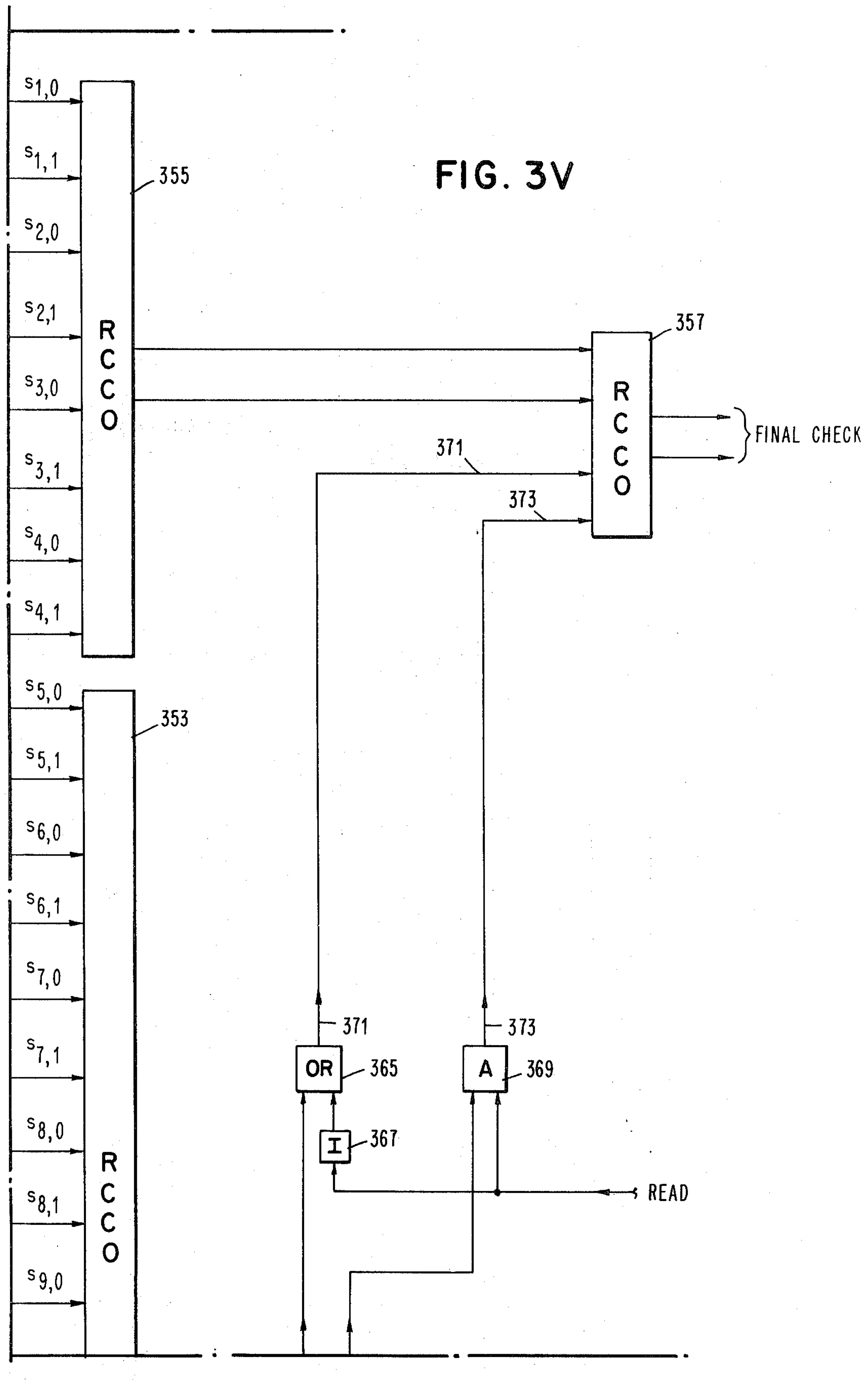
Figure 3W:
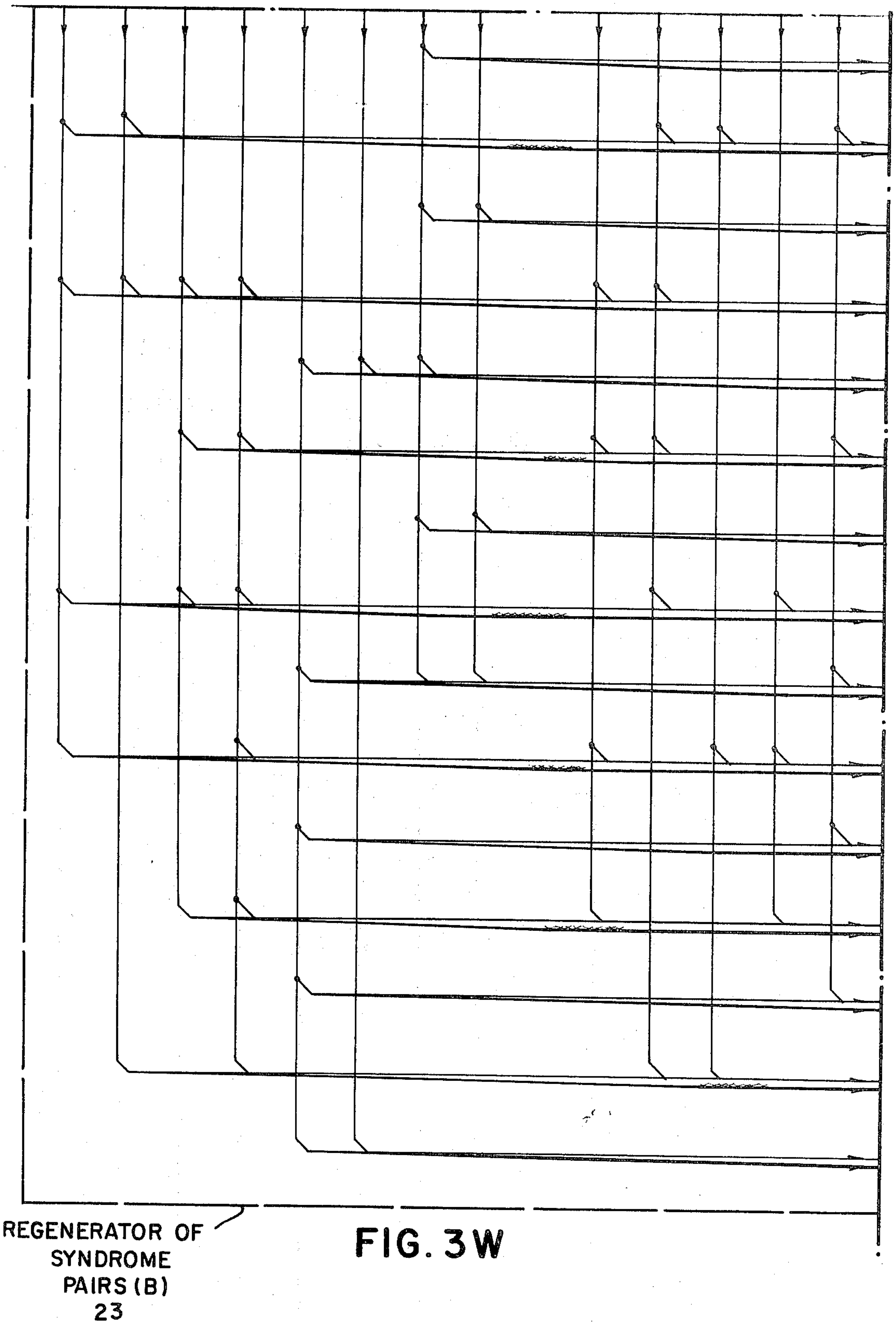
Figure 3X:
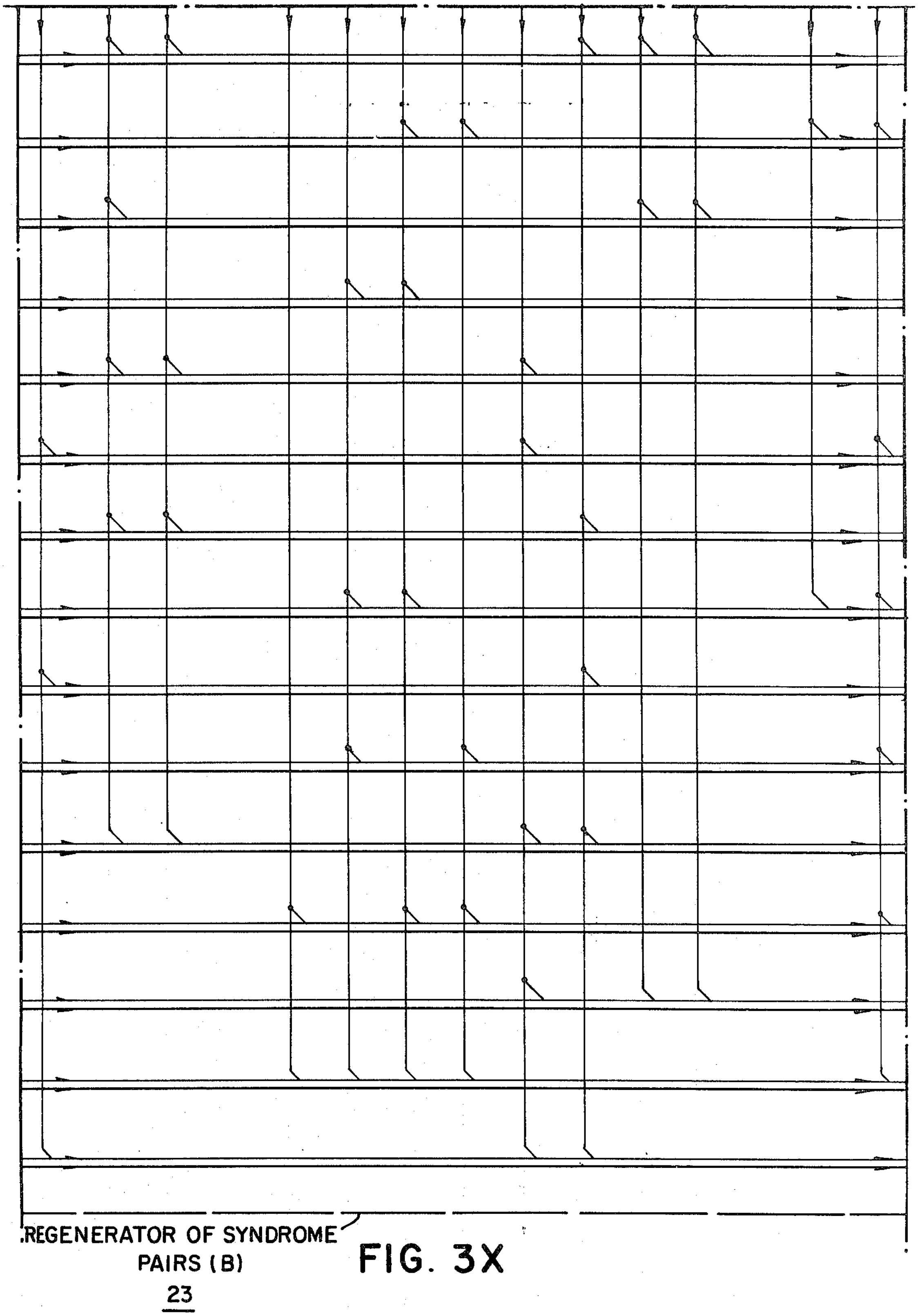
Figure 3Y:
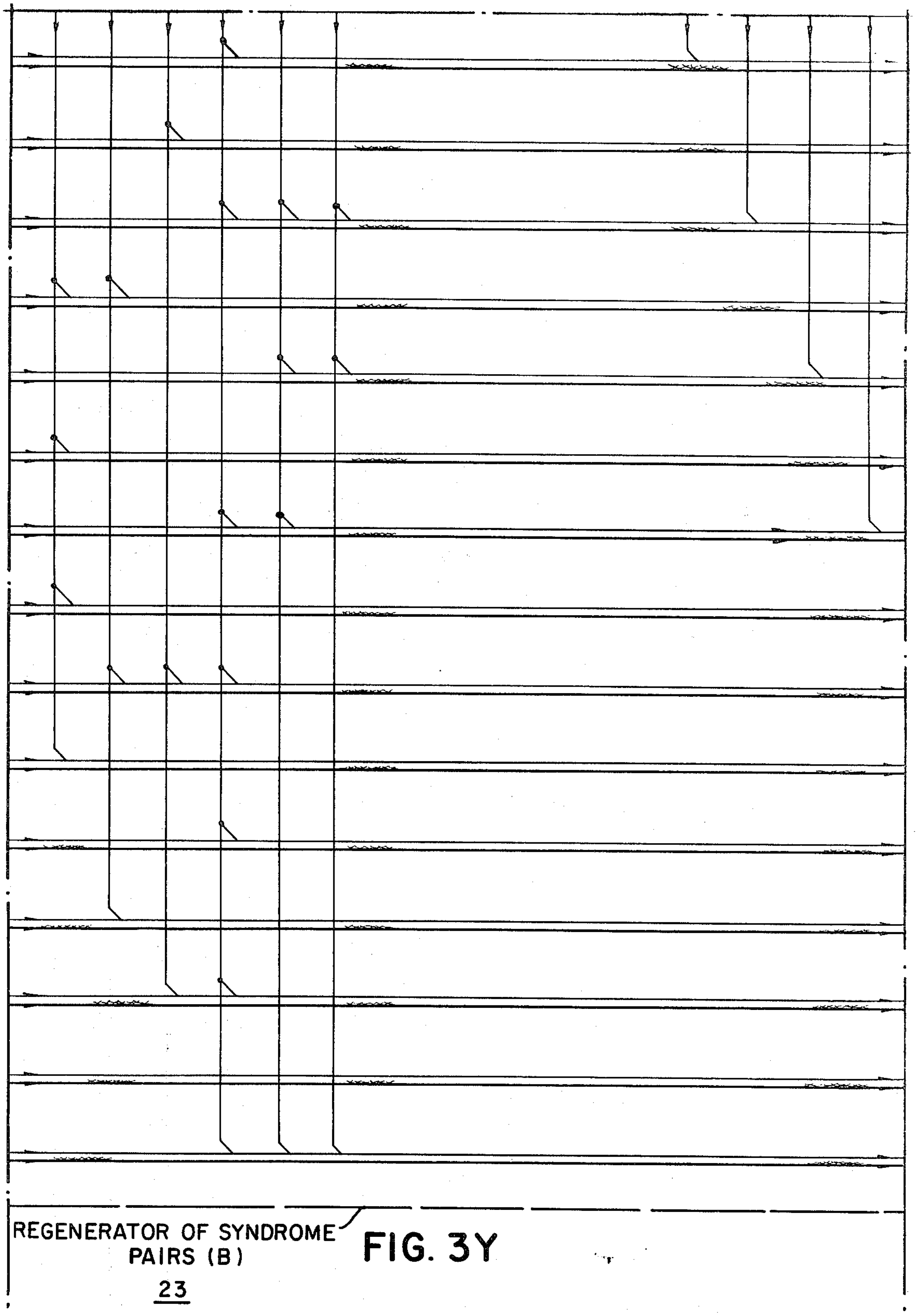
Figure 3Z:
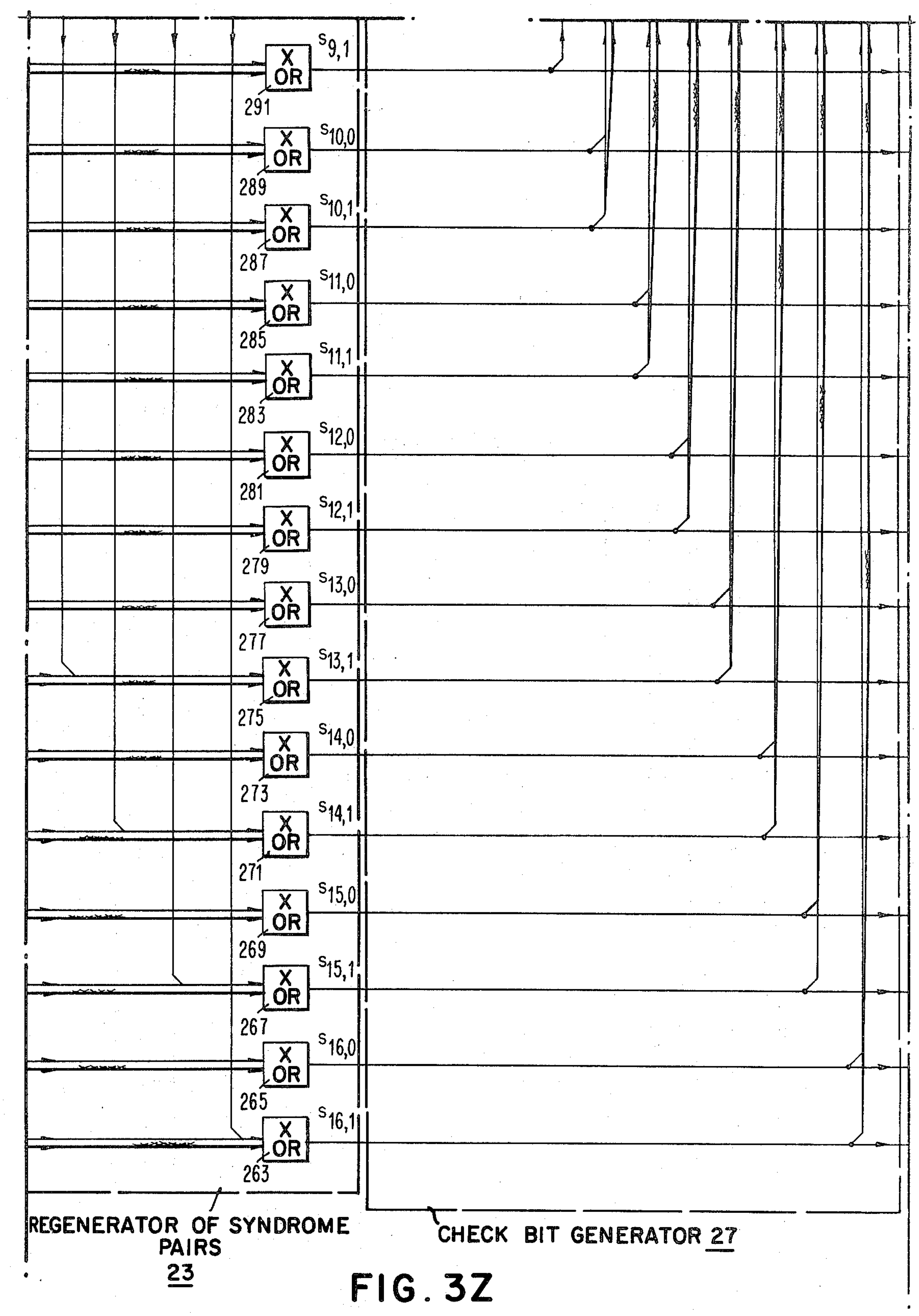
Figures 1, 3, 3Z:
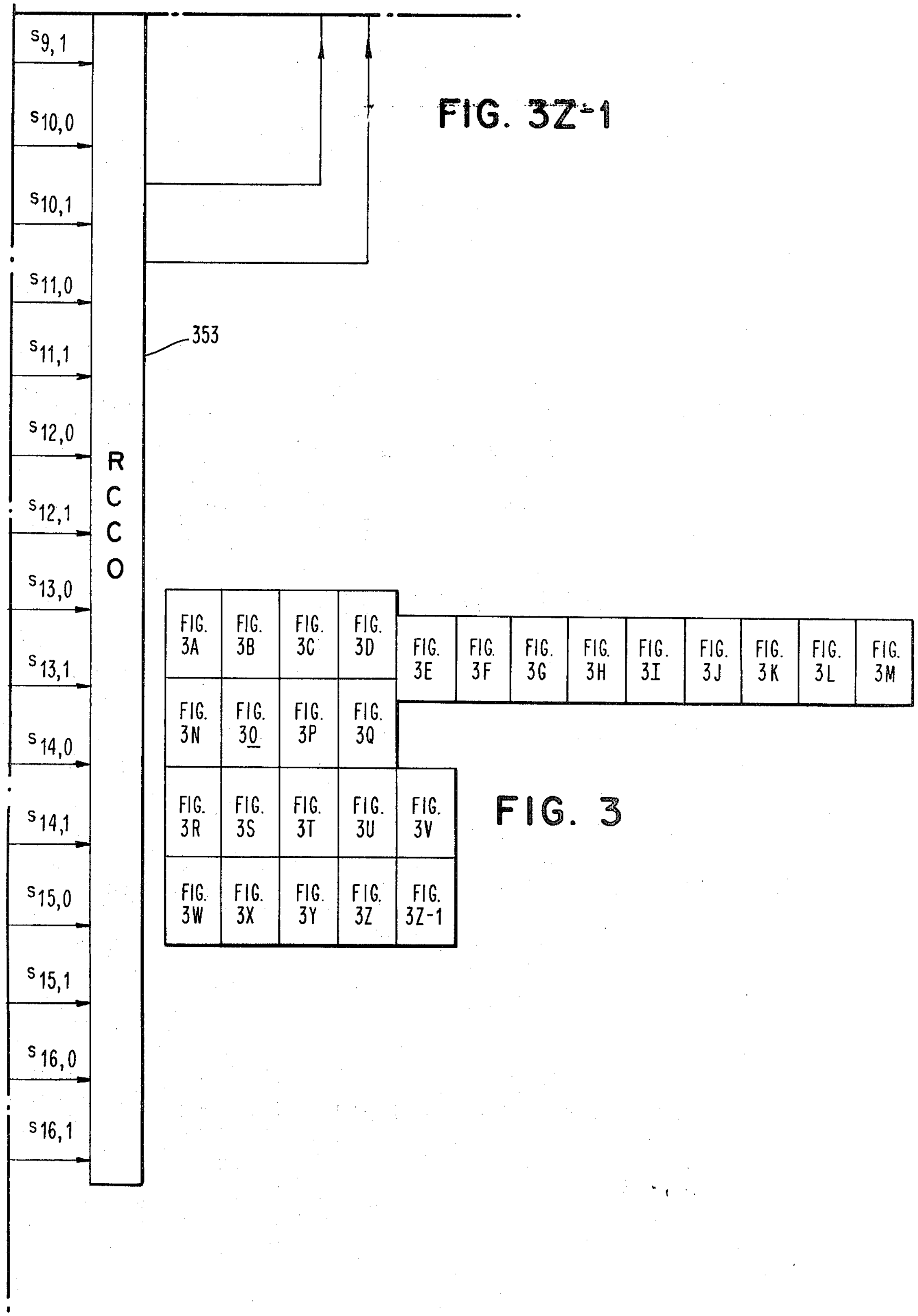

Reference is now made to FIGS. 3A-32-1, taken together as in FIG. 3, wherein there is depicted a detailed embodiment of the invention, the embodiment substantially being an implementation of the system according to the invention shown in the block diagram of FIG. 2.

Referring now to FIG. 3, a word is entered into the data word register 12 from memory 10. In the example shown in the implementation of FIG. 3, this word comprises 48 bits of which the first 36 bits are data bits and the remaining 12 bits are check bits. The assumption is made that the BSM's are four bit widths whereby accordingly, there are required nine BSM's, viz., modules 1–9, for providing the nine groups of four information bits and three BSM's, via., module 10–12 for providing three groups of four check bits. It is seen in the output lines from the flip-flops of data word register 12 that the data bits occur in the order $(d_{1,1}-d_{1,4})$ to $(d_{9,1}-d_{9,4})$. All of the first bits of each group i.e., $d_{1,1}$ to $d_{12,1}$ are applied to an exclusive OR circuit 135 via a cable 103 to produce the syndrome $s_1$. In the same manner, the second bits of each group, i.e., $d_{1,2}$ to $d_{12,2}$, the third bit of each group, i.e., $d_{1,3}$ to $d_{12,3}$, and the fourth bit $d_{1,4}$ to $d_{12,4}$ of each group are applied via cables 105, 107 and 109, respectively, to exclusive OR circuits 137, 139 and 141 to provide the syndromes $s_2$, $s_3$ and $s_4$.

Reference is now made to FIGS. 4A and 4B, taken together as in FIG. 4, wherein there are shown the equations pertaining to the syndrome generator. It is seen therein that a data word is composed of $d_{1,1}$, $d_{1,2}$, $d_{1,3}$, $d_{1,4}$, . . . , $d_{12,1}$, $d_{12,2}$, $d_{12,3}$ to $d_{12,4}$. The vectors $S_1$, $S_2 S_3$, $S_4$ are as shown in FIG. 4A.

The equations $s_i = d_{1,i} \oplus d_{2,i} \oplus \ldots \oplus d_{12,i}$ $i = 1,2,3,4$ are for generating the syndromes $s_1$–$s_4$. The remaining equations in FIG. 4 are the logical equations for generating the syndromes $s_5$–$s_{16}$ which are produced through exclusive OR circuits 145–165 by means of cables 111–133, respectively. The syndromes $s_1$–$s_{16}$ are all inverted in inverters 167–197, respectively to provide their complements, viz., $\overline{s}_1$–$\overline{s}_{16}$. These complements are applied to the group pointer generator.

The equations resulting from the operation of group pointer generator, i.e., the generation of group pointers $G_{1,2}$, $G_{3,4}$, $G_{5,6}$, $G_{7,8}$, $G_{9,10}$, and $G_{11,12}$, are shown in FIG. 5. Thus, for example, group pointer $G_{1,2}$ is generated by the output of a coincidence circuit 199, there being applied of coincidence circuit 199, the syndrome $\overline{s}_9$ and the output of an exclusive OR circuit 201, there being applied to exclusive OR circuit 201 via cable 203, the syndromes $\overline{s}_2$, $\overline{s}_4$ and $\overline{s}_5$. The outputs of coincidence circuits 199, 205, 207, 209, 211, 213, 215, and 217, are applied via a cable 219 to an AND circuit 221, the output of AND circuit 221 being the group pointer $G_{1,2}$. Following the equations shown in FIG. 5, it is readily seen how group pointer $G_{3,4}$ is produced from AND circuit 223, group pointer $G_{5,6}$ is produced from AND circuit 225, group pointer $G_{9,10}$ is produced from AND circuit 229 and group pointer $G_{11,12}$ is produced from AND circuit 231.

The outputs of inverters 167–197, i.e., $\overline{s}_1$–$\overline{s}_{16}$ are applied to the error pattern generator. In the error pattern generator, the latter terms are exclusively OR'ed in accordance with the equations shown in FIGS. 6A and 6B, taken together as in FIG. 6 to derive the error pattern indicators $e_{1,1}$ to $e_{12,4}$. In the derivation of these equations, $e_{i,j}$ represents the error in the $j^{th}$ bit of the $i^{th}$ group. The various error pattern indicators are now ANDed with the group pointers as shown in FIGS. 3I, 3J, 3K, 3L and 3M to produce outputs on the 48 lines, 100–194 from respective AND circuits wherein the ANDing of the error pattern indicators and the group pointers are ANDED in the combinations shown. The outputs on lines 100–194 are conveyed via a cable 233 to the corrector.

In the corrector, the signals appearing on lines 100–194 are respectively exclusively ORed ith the bits $d_{1,1}$–$d_{12,4}$ provided from the data word register to produce the corrected bits $d_{1,1}$ to $d_{12,4}$.

In the corrector, it is assumed that $\hat{d}_{i,j}$, denotes the corrected $j^{th}$ bit of the $i^{th}$ group. The equations for deriving the corrected bits $\hat{d}_{1,1}$–$\hat{d}_{12,4}$ are shown in FIGS. 8A to 8C taken together as in FIG. 8.

Reference is now made to the register 235 which corresponds to the memory data register of FIGS. 1 and 2. This register receives the 36 bit word from the processor via cable 237 and transmits the corrected 36 bit word to the processor on cable 239. The 36 bit word consists of 4 bytes with parity. The corrected word is produced by the application of the corrected bits $\hat{d}_{1,1}$ to $\hat{d}_{9,4}$ to the appropriate flip-flops in register 235 as shown. The outputs of the flip-flops in register 235 are applied to a cable 243 by means of 36 lines 196–266, respectively. The outputs on lines 196–266 are then applied to the first 36 flip-flops in the data word register. Thus, for example, line 196 which carries the corrected $\hat{d}_{1,1}$ bit is applied to the first flip-flop in the data word register. The output on line 198 which contains the corrected $d_{2,1}$ bit is applied to the fifth flip-flop in the data word register. It is seen that the outputs on lines 196–266 are applied to the first 36 flip flops in the data-word register by the actuation of a gate 359 at the time that WRITE line 261 is active.

At the point in the operation of the system that the corrected check bits $\hat{d}_{1,1}$–$\hat{d}_{9,4}$ are applied to the register 235, there are also generated the check bits replaced in the rightmost 12 flip-flops of the dataword register. To effect the generation of the checkbits, i.e., bits $\hat{d}_{10,1}$–$\hat{d}_{12,4}$ the corrected bits $\hat{d}_{10,1}$–$\hat{d}_{12,4}$ are applied to the twelve OR circuits 245–267. The outputs of the latter OR circuits during the READ cycle are essentially the correct check bits which are utilized to generate certain syndrome pairs as will be explained hereinbelow, certain exclusive OR combinations of these syndrome pairs resulting in the checkbits. Accordingly, reference is now made to the regeneration of syndrome pairs.

In the symdrome pair regenerator, the settings in the flip-flops of register 235 which respectively appears on lines 196–266 and the outputs of OR circuits 245–267 are applied in various combinations to a group of exclusive OR circuits 263–325. It is seen in FIG. 3, that to generate the syndrome pair $s_{1,0}$ there are applied to exclusive OR circuit, corrected bits $\hat{d}_{1,1}$, $\hat{d}_{2,1}$, $\hat{d}_{3,1}$ and $\hat{d}_{4,1}$. To generate the syndrome pair $s_{1,1}$ there are applied to the exclusive OR circuit 323, the corrected bits $\hat{d}_{5,1}\hat{d}_{6,1}$, $\hat{d}_{7,1}\hat{d}_{8,1}$ and $\hat{d}_{9,1}$. To generate the syndrome pair $s_{2,0}$, there are applied to exclusive OR circuit 321 the corrected bits $\hat{d}_{1,2}$–$\hat{d}_{4,2}$ and to produce the syndrome pair of a case as $s_{2,1}$ that are applied to exclusive OR circuit 319, the corrected bits $\hat{d}_{5,2}$–$\hat{d}_{9,2}$. With this type of the alternating of four and five successive corrected bit applications to an exclusive OR circuit, there are produced similarly through OR circuits 315, 313, and 311, the syndrome pairs $s_{3,1}$, $s_{4,0}$, $s_{4,1}$.

To produce the syndrome pairs $s_{5,0}$ to $s_{6,1}$, there are utilized the outputs appearing on lines 196–266 and the outputs of OR circuits 245–267. The logic equations for the syndrome pairs produced from exclusive OR circuits 309–269 as shown in FIGS. 7A and 7B, taken together as in FIG. 7 wherein there are set forth the equations for syndrome pairs $s_{5,0}-s_{16,1}$. In these equations, the assumption is made that $(s_{i,0}, s_{i,1})$ denote self-testable regenerated syndrome pairs corresponding to $s_i$, $i=1,\ldots,16$. Then, $s_{i,0} = PCi_1$ $i = 1,2,3$ and $s_{i,1} = PCi_2$ $i = 1,2,3,4$.

During the WRITE cycle, jthe checkbits $d_{10,1}$– $d_{12,4}$ can be generated from the syndrome pairs $s_{5,0}$ to $s_{16,1}$. As a result of $\hat{d}_{10,1}$–$\hat{d}_{12,4}$ being forced to 1 via the OR circuit in the checkbit generator, these syndrome pairs are applied successively in pairs to twelve exclusive OR circuits 327–349. Thus, to produce checkbit $d_{10,1}$, they are applied to exclusive OR circuit 327 the syndrome pairs $s_{5,0}$ and $s_{5,1}$. To generate the checkbit $d_{10,2}$, there are applied to exclusive OR circuit 329 the syndrome pairs $s_{6,0}$ and $s_{6,1}$, etc. Finally, to produce the checkbit $d_{12,4}$, there are applied to exclusive OR circuit 349 the syndrome pairs $s_{16,0}$ and $s_{16,1}$. The checkbits $d_{10,1}-d_{12,4}$ are applied via a cable to a gate 353 which is actuated by the active state of a line 261, i.e., the WRITE line is active whereby the checkbits are generated during the WRITE cycle. Cable 351 distributes the checkbits $d_{10,1}$– $d_{12,4}$ to the corresponding flip-flops in the dataword register.

It is to be noted that the regenerator of syndrome pairs 23 on FIG. 2 and on FIG. 3 are shown to have A and B sections. Section A is that portion which produces syndrome pairs $s_{1,0}$ to $s_{4,1}$ and section B is that portion which produces syndrome pairs $s_{5,0}$ to $s_{16,1}$.

The blocks 353 and 355 legended RCCO (reduction circuit for checker outputs) is a self-testng circuit. This type circuit is fully described in U.S. Pat. No. 3,559,167 and it functions to reduce several pairs of lines into a single pair of lines. The single output pair take on the values (0,1) or (1,0) when and only when all of the input pairs take on the values (0,1) or (1,0). The RCCO function of two pairs of lines $(a_{11}, a_{12})$ and $(a_{21}, a_{22})$ is given by RCCO $(a_{11,12} a_{21,22}) = (a_{11}a_{21} \vee a_{12}a_{22}, a_{11}a_{22} \vee a_{12}a_{21})$. The RCCO circuit 355 is for the byte parity checker and is a for input pair RCCO block with inputs $(PC1_1, PC1_2)$, $(PC2_1, PC2_2)$, $(PC3_1, PC3_2)$ and $(PC4_1, PC4_2)$.

Thus, the PC (parity check) inputs to RCCO circuit 355 are syndrome pairs $s_{1,0}$ $s_{1,1}$, $s_{2,0}$ $s_{2,1}$, $s_{3,0}$, $s_{3,1}$ and $s_{4,0}$ $s_{4,1}$. The RCCO circuit 353 is for the regenerated syndrome pairs $s_{5,0}$ to $s_{16,1}$, and is a twelve input pair RCCO stage with inputs $(s_{i,0}, s_{i,1})$ wherein $i$ is equal to 5, 6 . . . ,16.

The single ouput pair of lines RCCO circuit 355 is applied to RCCO circuit 357. One of the output pair of lines of RCCO circuit 355 is applied to OR circuit 365. The other input to OR circuit 365 being the read signal which is passed through an inverter 367, the output of inverter 367 being applied to OR circuit 365. The other line of the output pair from RCCO circuit 353 is applied to AND circuit 369. The read line is also applied as an input to AND circuit 369. Thus, during the read cycle, both of input lines 371 and 373 to RCCO circuit 357 will be active. When the read cycle is not occurring, i.e., when the read line is not active, then line 371 will be active but line 373 will not. The output pair of lines RCCO circuit 357 constitute the final check pair of lines which constitute a final check for all of circuitry between the data word register and the latter pair of lines.

It is to be noted that when the WRITE cycle is occurring, i.e., the WRITE line is active whereby corrected bits $\hat{d}_{10,1}$ to $\hat{d}_{12,4}$ are all forced to the binary 1 because all of all OR circuits 245–267 produce 1 outputs. This arrangement constitutes the forcing circuit.

The following equations are those for the generation of check bits during the WRITE cycle for $j = 1,2,3,4$.

$d_{9,j} = p_j$ $d_{10,j} = s_{4+j,0} \oplus s_{4+j,1}$ with $\hat{d}_{10,j}$ forced to 1

$d_{11,j} = s_{8+j,0} \oplus s_{8,j,1}$ with $\hat{d}_{11,j}$ forced to 1

$d_{12,j} = s_{12+j,0} \oplus s_{12+j,1}$ with $\hat{d}_{12,j}$ forced to 1 where $p_j$ are the parity bits of the incoming data word in MDR and $\hat{d}_{10,j}$, $\hat{d}_{11,j}$, $\hat{d}_{12,j}$ are from the corrector outputs.

With regard to the byte parity encoder, if it assumed that the $i^{th}$ byte is made up of the bits $d_{1,i}$, $d_{2,i}$, $d_{3,i}d_4$, $d_{5,i}$, $d_{6,i}$, $d_{7,i}$ and $d_{8,i}$, $r = 1,2,3,4$, the parity of the $i^{th}$ byte during the read cycle is given by $p_i = d_{9,i}$.

The equations which pertain to a byte parity checker circuit, assuming that $PCi_1$ and $PCi_2$ denote the outputs of the parity checker of the $i^{th}$ byte, then $$PCi_1 = \sum_{j=1}^{4} \hat{d}_{j,i} \text{ and } PCi_2 = \sum_{j=5}^{9} \hat{d}_{j,i}$$

In FIG. 9, there is shown an example of a coincidence or "equals" circuit suitable for use in the generation of group pointers in this circuit. In this circuit with inputs A and B, the AND circuit 400 is enabled to produce an output from an OR circuit 402. With inputs $\bar{A}$ and $\bar{B}$, their respective inversions by the inverters 404 and 408 enables the AND circuit 408 whereby an output is produced from OR circuit 402.

While the invention has been particularly shown and described with reference to preferred embodiments thereof, it will be understood by those skilled in the art that the foregoing and other changes in form and details may be made therein without departing from the spirit and scope of the invention.

We claim:

1. A self-checking translator for translating code data from a memory organization in a data processing system wherein said memory organization comprises $k$ basic storage modules, each of said last-named modules providing a group of a chosen quantity of information bits for a word and $r$ basic storage modules, each of said last-named modules providing said group of said chosen quantity of check bits for said word, said translator comprising:

data word register means connected to said memory organization for receiving thereinto and holding said $k$ information bit groups and said $r$ checkbit groups;

syndrome generator means for receiving said bits from said dataword register means to generate syndromes in response thereto;

group pointer generator means responsive to said syndromes for generating group pointers which indicate which of said bit groups are in error as a result of failures in up to $t$ basic storage modules;

error pattern indicator generator means responsive to said syndromes to produce a plurality of error patterns for errors in a group;

corrector means responsive to the input thereto of said group pointers and said error pattern indicator for providing the corrected information bits and check bits for said words;

parity coding means responsive to said corrected databits for generating byte parity bits;

memory data register means for storing translated words comprising said corrected information bits and said byte parity bits;

means responsive to said corrected information bits in said memory data register means and said corrected checkbits for regenerating a set of syndrome pairs from said corrected information and $d$ b-adjacent group error detection means responsive to said syndrome pairs and said corrected information bits and check bits to detect more than $t$ and up to $t+d$ storage modules in error;

detecting means responsive to said syndrome pairs and said corrected information bits and check bits to distinguish between code words and words correctable to code words and any other words even when formed by more than $t+d$ errors from said corrected check bits;

checkbit generating means responsive to said second set of snydrome pairs for providing checkbits for said data word register means during the WRITE cycle;

and means for providing the corrected information bits from said memory data register means to said dataword register means.

2. A translator as defined in claim 1 and further including:

self-testing parity check means for receiving the decoded information bits in said memory data register means to produce a plurality of self-testable pairs to check whether said decoded information in said memory data register means is corrected, and first reduction circuit means for receiving said self-testable pairs to provide a signle pair of self-testing signals for indicating parity errors.

3. The translator as defined in claim 2 and further including:

second reduction circuit means for receiving said requested syndrome pairs to provide a single self-testable pair of signals.

4. The translator as defined in claim 3 wherein said second reduction circuit means comprises a first reduction circuit for receiving a first set of said syndrome pairs to provide the first pair of self-testable signals for detecting groups of miscorrections in the corrected word in said memory data register means;

a second reduction circuit for receiving a second set of syndrome pairs to provide a self-testing pair of signals which indicate parity errors in said memory data register means; and a third reduction circuit for receiving that first self-testable pair of signals from said first reduction circuit and said second self-testable pair of signals from said second reduction circuit during a read cycle to provide a third and final check pair of self-testable signals.

5. The translator as defined in claim 4 wherein said checkbits for said dataword register means are generated during a write cycle.

6. A self-checking translator as defined in claim 3 wherein said second reduction circuit is arranged such that it produces a $$\begin{Bmatrix}01\\10\end{Bmatrix}$$

output if and only if all of the regenerated syndrome pairs applied thereto assume the value $$\begin{Bmatrix}01\\10\end{Bmatrix}$$

and produces a $$\begin{Bmatrix}00\\11\end{Bmatrix}$$

output in response to a $t+d$ b-adjacent bit group error in said input word received in said data word register means, or in response to a $t+d+j$ b-adjacent bit group error which does not produce a code word or correctable word or in response to the case of a circuit failure in the translator that causes miscorrection in the corrected word as above.

7. A self-checking translator for translating coded data from a memory organization in a data processing system wherein said memory organization comprises a $k$ quantity of b-width basic storage modules for providing respective b-bit groups of data for a word and an $r$ quantity of b-width basic storage modules for providing b-bit groups of check bits for said word wherein $r = 2t+d$ in which $t$ is the quantity of b-adjacent errors desired to be corrected and $d$ is the quantity of additional b-adjacent errors desired to be detected comprising:

means for providing an error correcting and detecting code which is defined by choosing particular columns of the matrix $$M=\begin{pmatrix} I & I & \ldots & I & \ldots & I & I & 0 & 0 & 0 \\ I & A & & A^{i} & & A^{k-1} & 0 & I & 0 & 0 \\ I & A^{2} & & A^{2i} & & A^{2(k-1)} & 0 & 0 & I & 0 \\ \cdot & \cdot & & \cdot & & \cdot & \cdot & \cdot & \cdot & \cdot \\ \cdot & \cdot & & \cdot & & \cdot & \cdot & \cdot & \cdot & \cdot \\ \cdot & \cdot & & \cdot & & \cdot & \cdot & \cdot & \cdot & \cdot \\ I & A^{r-1} & & A^{(r-1)i} & & A^{(r-1)(k-1)} & 0 & 0 & 0 & I \end{pmatrix}$$

so that any $2t+d$ columns of the chosen set are linearly independent to constitute the columns of a parity check matrix corresponding to the code, wherein A is a bxb matrix which generates the multiplicative group of GF$[2^b]$ I is a bxb identity matrix, $2^b-1 > r$, and $k<2^{b-1}$, said code comprising $mk$ groups of $b/m$ bits where $m$ divides $b$ for data and $mr$ groups of b/m bits for check bits with said code being capable of correcting combinations of $mt$ $(b/m)$-adjacent errors, detecting $m(t+d)$ $(b/m)$-adjacent errors not corrected and detect all $(m(t+d)+j)$ $(b/m)$-adjacent bit group errors ($j \geqslant l$) which do not change a code word into a correctable word, said errors occurring with probability $$\max. \left\{0,\ 1-\binom{mk+mt-j}{mt} \frac{2^{j(b/m)}-1}{(2^{b/m}-1)^{mr}}\right\}$$

among the set of all possible $(m(t+d)tj)$ $(b/m)$-adjacent bit group errors, data word register means connected to said memory organization for receiving and holding said mk data groups of b/m width and said mr check bit groups of b/m width;

syndrome generator means for receiving said bits from said data word register means to generate syndromes in response thereto in accordance with said parity check matrix;

group pointer generator means responsive to said syndromes for generating group pointers as logical assertions on said syndromes, said group pointers indicating which of said b-width groups are in error as the result of failures in a up to t basic storage modules;

error pattern indicator generating means responsive to said syndromes to produce error pattern indicators;

correction means responsive to the input thereto of said group pointers and said error pattern indicators for providing the corrected data bits and check bits of said word;

parity encoding means responsive to said corrected data bits for generating byte parity bits;

memory data register means for storing translated words comprising said corrected data bits and said byte parity bits;

multiple group error detection means responsive to said corrected data bits in said memory data register means and said corrected check bits for generating a first set of syndrome pairs from said corrected data bits and a second set of syndrome pairs from said corrected check bits;

check bit generating means responsive to said second set of syndrome pairs derived from the incoming data word for providing check bits for said data word register means during the WRITE cycle; and means for providing the corrected data bits from said memory data register means to said data word register means.

8. A self-checking translator as defined in claim 7 wherein there is further included:

reduction circuit means, said reduction circuit means comprising a first reduction circuit for receiving said second set of syndrome pairs to provide a first pair of self-testable signals;

a second reduction circuit for receiving said first set of syndrome pairs to produce a second set of self-testable signals;

and a third reduction circuit for receiving said second set of self-testable signals and said first set of self-testable signals during a read cycle, to produce a third and final pair of self-testable signals.

9. A self-checking translator as defined in claim 8 wherein said check bits for said data word register means are produced during a WRITE cycle.

10. The self-checking translator defined in claim 7 and further including:

self-testing parity check means for receiving said bits from memory data register means to produce a self-testable signal for each byte and its parity bit from said memory data register means;

a first reduction circuit for reducing said signal pass produced by said self-testing parity check means to a single pair of self-testable signals for detecting any failure between said corrector means and said last-named single pair of self-testable signals;

and a second reduction circuit for receiving said syndrome pairs to produce a single pair of self-testable signals for detecting multiple errors in said input word in said data word register means, corrected word in said memory data register means, and any single failure in translator circuitry.

11. A self-checking translator as defined in claim 10 wherein said check bits for said data word register means are produced during a WRITE cycle.

12. A self-checking translator for translating coded data from a memory organization in a data processing system comprising:

a memory organization which comprises a quantity $k$ of b-bits width basic storage modules for providing $kb$ bits for a word and a quantity $r$ of b-bits width basic storage modules for providing $rb$ check bits for said word;

means for generating a parity check matrix H for a single b-adjacent bit group error correction using an $m$ $(b/m)$-adjacent bit group error detection code, said parity check matrix H having the following form with columns arranged in sets of m as shown $$H=\begin{pmatrix} I & I & \ldots I & \ldots I & \ldots I \\ A & A^2 & \ldots A^m & \ldots A^{jm+m} & \ldots A^{jm+m} \\ \cdot & \cdot & \cdots & \cdots & \cdots \\ \cdot & \cdot & \cdots & \cdots & \cdots \\ \cdot & \cdot & \cdots & \cdots & \cdots \\ A^{2m-1} & A^{2(2m-1)} & \ldots A^{m(2m-1)} & \ldots A^{(2m-1)(jm+1)} & \ldots A^{(2m-1)(jm+m)} \end{pmatrix}$$

wherein $m$ divides $b$, $j = 0, 1, 2, \ldots, k+1$, $(k+2)m \leqslant 2^{b/m}-2$, $A = b/m \times b/m$ matrix over GF[2] wherein GF signifies Galois Field, whose characteristic polynominal is a primitive polynominal of degree b/m, the number of check bits used is $2b$, the maximum number of information bits is $(b/m)(2^{b/m}-2)$, with corrections being made on up to $m$ of the $(b/m)$-wide groups;

data word register means for receiving and holding the k quantity b-width groups of data bits and $r$ quantity b-width groups of check bits from said basic storage modules;

syndrome generator means for generating syndromes from the bits in said data word register means according to said parity check matrix H, said syndrome generator means being chosen such that if $w$ is a word in the data word register means, the corresponding syndrome S is given by the equation $$S = 1+Hw$$

wherein 1 is a $2b \times 1$ matrix of all 1's and $$w=\begin{matrix} d_{1,1} \\ \cdot \\ \cdot \\ \cdot \\ d_{1,b/m} \\ \cdot \\ \cdot \\ d_{(k+2)m,1} \\ \cdot \\ \cdot \\ \cdot \\ d_{(k+2)m,b/m} \end{matrix}$$

wherein $d_{i,1} \ldots d_{i,b/m}$ is a bit group in said data word register means, whereby all syndrome bits are equal to 1 when $w$ is a code word;

group pointer generating means responsive to said syndromes for generating the group pointers $G_A$ where A is any combination of $m$ numbers from the set $1,2,3, \ldots ,m(k+2)$ wherein there are $$\binom{m(k+2)}{m}$$

pointers as logical assertions on said syndrome bits, said group pointers indicating which of the b-adjacent bit groups are in error as the result of failures in a single basic storage module;

error pattern indicator generating means responsive to said syndromes for generating error patterns for said bits in said data word register means to indicate which error patterns are to be corrected;

corrector means responsive to said error patterns indicators and said group pointers for performing single b-adjacent bit group error correction;

parity generating means responsive to the data bits corrected by said corrector means for generating byte parity bits for said corrected data bits;

memory data register means for storing translated words comprising said corrected data bits and said byte parity bits;

syndrome pair regenerating means responsive to said corrected data bits in said memory data register means and said corrected check bits from said corrector means for regenerating a set of self-testable syndrome pairs;

self-testing parity check means responsive to said corrected data bits and said byte parity bits in said memory data register means for providing a set of self-testable pairs of signals;

a first reduction circuit for receiving said set of self-testable pairs of signals from said self-testing parity check means to produce a single pair of self-testable signals which are capable of detecting any failure occurring between said corrector means and said last-named pair of self-testable signals;

a second reduction circuit responsive to said regenerated syndrome pairs for producing a single pair of self-testable signals, said last-named pair of signals being capable of detecting b-adjacent bit group errors in the input word received which errors do not produce a code word or word correctable to a code word by said data word register means and up to four b/m-adjacent bit groups of miscorrection in the corrected word produced by said corrector means due to failures in said translator; and means responsive to said regenerated syndrome pairs produced from said corrected check bits for providing check bits to said data word register means during a write cycle.

13. A self-checking translator as defined in claim 12 wherein:

$$r=2;$$

a syndrome S produced by said syndrome generating means is constituted by $2m(b/m)$-bit vectors $S_1, S_2, \ldots, S_{2m}$ wherein $$S=\begin{bmatrix} S_1 \\ S_2 \\ \cdot \\ \cdot \\ \cdot \\ S_{2m} \end{bmatrix}, \quad S_1=\begin{bmatrix} s_1 \\ \cdot \\ \cdot \\ \cdot \\ \cdot \\ s_{b/m} \end{bmatrix}, \quad S_2=\begin{bmatrix} s_{(b/m)+1} \\ \cdot \\ \cdot \\ \cdot \\ \cdot \\ s_{(b/m)+b/m} \end{bmatrix},$$

$$S_{2m}=\begin{bmatrix} s_{(2m-1)(b/m)+1} \\ \cdot \\ \cdot \\ \cdot \\ s_{(2m-1)(b/m)+b/m} \end{bmatrix}$$

wherein $s_i$ is a syndrome bit whereby if up to the $m$ b/m-adjacent bit groups $i_1, \ldots i_m$, of the word $w$ are in error with $m$ (b/m) wide error pattern indicators $e_{i1}, \ldots ,e_{im}$, respectively, then $$\begin{bmatrix} \bar{S}_1 \\ \cdot \\ \cdot \\ \cdot \\ \bar{S}_{2m} \end{bmatrix} = \begin{bmatrix} I & \ldots & I \\ A^{i_1} & & A^{i_m} \\ & & \\ A^{(2m-1)i_1} & \ldots & A^{(2m-1)i_m} \end{bmatrix} \begin{bmatrix} e_{i1} \\ \cdot \\ \cdot \\ \cdot \\ e_{im} \end{bmatrix}$$

wherein $\bar{S}_i$ is a vector whose elements are complements of the elements of the b/m-bit vector $S_i$;

said translator further including means for providing the complements $\bar{S}$ of said syndromes generated by said syndrome generating means whereby the error pattern indicators are given by logic equations derived from $$\begin{bmatrix} e_{i1} \\ \cdot \\ \cdot \\ \cdot \\ e_{im} \end{bmatrix} = \begin{bmatrix} I & \ldots & I \\ A^{i_1} & \ldots & A^{i_m} \\ & & \\ A^{(2m-1)i_1} & \ldots & A^{(2m-1)i_m} \end{bmatrix}^{-1} \begin{bmatrix} \bar{S}_1 \\ \cdot \\ \cdot \\ \cdot \\ \bar{S}_m \end{bmatrix}$$

and the $$\begin{matrix} m(k+2) \\ m \end{matrix}$$

group pointers $G_A$ for $A=i_1, i_2, \ldots ,i_m$ are derived from $$G_A = [\bar{S}_{m+1} \oplus \bar{S}_m \rho_m^{\ 1} \oplus \bar{S}_{m-1} \rho_m^{\ 2} \oplus \ldots \oplus \bar{S}_1 \rho_m^{\ m} = 0] \Lambda$$
$$[\bar{S}_{m+2} \oplus \bar{S}_{m+1} \rho_m^{\ 1} \oplus \ldots \oplus \bar{S}_2 \rho_m^{\ m} = 0] \Lambda$$
$$[\bar{S}_{2m} \oplus \bar{S}_{2m-1} \rho_m^{\ 1} \oplus \ldots \oplus \bar{S}_m \rho_m^{\ m} = 0]$$

where $\rho^1_m, \rho^2_m, \ldots, \rho_m^{\ m}$ are the symmetric functions formed from $A^{i_1}, \ldots ,A^{i_m}$.

14. A self-checking translator for translating coded data from a memory organization in a data processing system comprising:

a memory organization which comprises a quantity $k$ of b-bits width basic storage modules for providing $kb$ bits for a word and a quantity $r$ of b-bits width basic storage modules for providing rb check bits for said word;

means for generating a parity check matrix H for a single b-adjacent bit group error correction using an $m$ (b/m)-adjacent bit group error detection code, said parity check matrix H having the following form with columns arranged in sets of m as shown $$H=\begin{bmatrix} I & I & \ldots I & \ldots I & \ldots I \\ A & A^2 & \ldots A^m & \ldots A^{jm+1} & \ldots A^{jm+m} \\ \vdots & \vdots & \vdots & \vdots & \vdots \\ A^{2m-1} & A^{2(2m-1)} & \ldots A^{m(2m-1)} & \ldots A^{(2m-1)(jm+1)} & \ldots A^{(2m-1)(jm+m)} \end{bmatrix}$$

wherein $m$ divides $b$, $j = 0, 1, 2, \ldots, k+1$, $(k+2)m \leq 2^{b/m}-1$, $A = b/m \times b/m$ matrix over GF[2] wherein GF signifies Galois Field, whose characteristic polynomial is a primitive polynomial of degree b/m, the number of check bits used is $2b$, the maximum number of information bits is $kb$ with the $m$ columns in one set being used to make corrections in the b-wide group spanned by the m columns;

data word register means for receiving and holding the $k$ quantity b-width groups of data bits and $r$ quantity b-width groups of check bits from said basic storage modules;

syndrome generator means for generating syndromes from the bits in said data word register means according to said parity check matrix H, said syndrome generator means being chosen such that if $w$ is a word in the data word register means, the corresponding syndrome S is given by the equation $$S = \mathbf{1}\ Hw$$

wherein 1 is a $2b \times 1$ matrix of all 1's and $$w=\begin{bmatrix} d_{1,1} \\ \vdots \\ d_{1,b/m} \\ \vdots \\ d_{(k+2)m,1} \\ \vdots \\ d_{(k+2)m,b/m} \end{bmatrix}$$

wherein $d_{i,1} \ldots d_{i,b/m}$ is a bit group in said data word register means, whereby all syndrome bits are equal to 1 when $w$ is a code word;

group pointer generating means responsive to said syndromes for generating the group pointers $G_{A_1}$, $G_{A_2}, \ldots, G_{A(k+2)}$ where $A_1 = 1,2 \ldots m$, $A_2 = (m+1) \ldots (m+m), \ldots A_j = ((j-1)\,m+1) \ldots ((j-1)m+m), \ldots A_{(k+2)} = ((k+1)m+1) \ldots ((k+1)m+m)$ wherein there are $k+2$ pointers as logical assertions on said syndrome bits, said group pointers indicating which of the b-adjacent bit groups are in error as the result of failures in a single basic storage module;

error pattern indicator generating means responsive to said syndromes for generating error patterns for said bits in said data word register means to indicate which error patterns are to be corrected;

corrector means responsive to said error patterns indicators and said group pointers for performing single b-adjacent bit group error correction;

parity generating means responsive to the data bits corrected by said corrector means for generating byte parity bits for said corrected data bits;

memory data register means for storing translated words comprising said corrected data bits and said byte parity bits;

syndrome pair regenerating means responsive to said corrected data bits in said memory data register means and said corrected check bits from said corrector means for regenerating a set of self-testable syndrome pairs;

self-testing parity check means responsive to said corrected data bits and said byte parity bits in said memory data register means for providing a set of self-testable pairs of signals;

a first reduction circuit for receiving said set of self-testable pairs of signals from said self-testing parity check means to produce a single pair of self-testable signals which are capable of detecting any failure occurring between said corrector means and said last-named pair of self-testable signals;

a second reduction circuit responsive to said regenerated syndrome pairs for producing a single pair of self-testable signals, said last-named pair of signals being capable of detecting b-adjacent bit group errors in the input word received which errors do not produce a code word or word correctable to a code word by said data word register means and up to four b/m-adjacent bit groups of miscorrection in the corrected word produced by said corrector means due to failures in said translator; and means responsive to said regenerated syndrome pairs produced from said corrected check bits for providing check bits to said data word register means during a write cycle.

15. A self-checking translator as defined in claim 14 wherein:

a syndrome S produced by said syndrome generating means is constituted by $2m$ $(b/m)$-bit vectors $S_1, S_2, \ldots, S_{2m}$ wherein $$S=\begin{bmatrix} S_1 \\ S_2 \\ \vdots \\ S_{2m} \end{bmatrix};\ S_1=\begin{bmatrix} s_1 \\ \vdots \\ s_{b/m} \end{bmatrix},\ S_2=\begin{bmatrix} s_{(b/m)+1} \\ \vdots \\ s_{(b/m)+(b/m)} \end{bmatrix},$$

$$S_{2m}=\begin{bmatrix} s_{(2m-1)(b/m)+1} \\ \vdots \\ s_{(2m-1)(b/m)+b/m} \end{bmatrix}$$

wherein $s_i$ is a syndrome bit whereby if in the up to $m$ (b/m)-adjacent bit groups in the $j^{th}$ b-adjacent storage module, i.e., $(b/m)$ wide groups $((j-1)((j-1)m+2) \ldots ((j-1)m+m)$ of the word $w$ are in error with error patterns $e_{j1}, e_{j2} \ldots e_{jm}$, respectively, then $$\begin{bmatrix} \overline{S}_1 \\ \cdot \\ \cdot \\ \cdot \\ \overline{S}_{2m} \end{bmatrix} = \begin{bmatrix} I & \ldots & I \\ A^{(j-1)m+1} & & A^{(j-1)m+n} \\ \cdot & & \cdot \\ \cdot & & \cdot \\ A^{(2m-1)((j-1)m+1)} & \ldots & A^{(2m-1)jm} \end{bmatrix} \begin{bmatrix} e_{j,1} \\ \cdot \\ \cdot \\ \cdot \\ e_{j,m} \end{bmatrix}$$

wherein $\overline{S}_i$ is a vector whose elements are complements of the elements of the b/2-bit vector $S_i$;

said translator further including means for providing the complements $\overline{S}$ of said syndromes generated by said syndrome generating means whereby the error pattern indicators for the $j^{th}$ b-adjacent storage module are given by logic equations derived from the $m(b/m)$ wide error patterns $$\begin{bmatrix} e_{j,1} \\ \cdot \\ \cdot \\ \cdot \\ e_{j,m} \end{bmatrix} = \begin{bmatrix} I & \ldots & I \\ A^{(j-1)m+1} & \ldots & A^{jm} \\ \cdot & & \cdot \\ \cdot & & \cdot \\ A^{(2m-1)((j-1)m+1)} & \ldots & A^{(2m-1)jm} \end{bmatrix}^{-1} \begin{bmatrix} \overline{S}_1 \\ \cdot \\ \cdot \\ \cdot \\ \overline{S}_m \end{bmatrix}$$

and the $(k+2)$ group pointers $G_j$ are derived from $$G_j = [\overline{S}_{m+1} \oplus \overline{S}_m \rho_m{}' \oplus \overline{S}_{m-1} \rho_m{}^2 \oplus \ldots \oplus \overline{S}_1 \rho_m{}^m = 0]\ \Lambda$$
$$[\overline{S}_{m+2} \oplus \overline{S}_{m+1} \rho_m{}' \oplus \ldots \oplus \overline{S}_2 \rho_m{}^m = 0]\ \Lambda$$
$$[\overline{S}_{2m} \oplus \overline{S}_{2m-1} \rho_m{}' \oplus \ldots \oplus \overline{S}_m \rho_m{}^m = 0\ ]$$

where $\rho_m{}'$, $\rho_m{}^2$, . . . $\rho_m{}^m$ are the symmetric functions formed from $A^{(j-1)m+1}$, $A^{(j-1)m+2}$, . . . ,$A^{(j-1)m+n}$.

16. A self-checking translator for translating coded data from a memory organization in a data processing system comprising:

a memory organization which comprises a quantity $k$ of b-bits width basic storage modules for providing $kb$ information bits for a word and a quantity $r$ of b-bits width basic storage modules for providing $rb$ checkbits for a word;

means for generating a parity check matrix for single b-adjacent bit group error correction by means of a $m$ $(b/m)$ adjacent bit group error correcting code;

data word register means for receiving and holding the b-width groups of information bits and checkbits from said basic storage modules;

syndrome generator means for generating syndromes from the bits in said data word register means according to said parity check matrix;

group pointer generator means responsive to said syndromes for generating the group pointers as logical assertions on said syndrome bits, said group pointers indicating which of the up to $m$ $(b/m)$-width parts of a b-adjacent bit group are in error as a result of failures in a single basic storage module;

error pattern indicator generating means responsive to said syndromes for generating error pattern indicators for said bits in said data word register means to indicate which error patterns are to be corrected;

corrector means responsive to said error patterns and said group pointers for performing single b-adjacent bit group error correction;

parity generating means responsive to the information bits corrected by said corrector means for generating byte parity bits for said corrected information bits;

memory data register means for storing translated words comprising said corrected information bits and said byte parity bits;

syndrome pair regenerating means responsive to said corrected information bits in said memory data register means and said corrected check bits from said corrector means for generating a set of self-testable syndrome pairs;

self-testing parity check means responsive to said corrected information bits and said byte parity bits in said memory data register means for providing a set of self-testable pairs of signals;

a first reduction circuit for receiving said set of self-testable pairs of signals from said self-testing parity check means to produce a single pair of self-testable signals capable of detecting any failure occurring between said corrector means and said last-named pair of self-testable signals;

a second reduction circuit responsive to said regenerated syndrome pairs for producing a single pair of self-testable signals, said last-named pair of signals being capable of detecting the multiple $(b/m)$-adjacent errors in the b-width storage module or a correctable modification of a code word in the input word received by said data word register means and up to four b/m-adjacent bit groups of miscorrection in the corrected word produced by said corrector means due to failures in said translator;

and means responsive to said regenerated syndrome pairs produced from said corrected check bits for providing check bits to said data word register means during a write cycle.

17. A self-checking translator for translating coded data from a memory organization in a data processing system comprising:

a memory organization which comprises a quantity $k$ of b-bits width basic storage modules for providing $kb$ information bits for a word and a quantity $r$ of b-bits width basic storage modules for providing $rb$ checkbits for a word;

means for generating a parity check matrix for a single b-adjacent bit group error correction by means of a $m$ $(b/m)$-adjacent bit group error correcting code;

data word register means for receiving and holding the b-width groups of information bits and checkbits from said basic storage modules;

syndrome generator means for generator syndromes from the bits in said data word register means according to said parity check matrix;

group pointer generator means responsive to said syndromes for generating the group pointers as logical assertions on said syndrome bits, said group pointers indicating which of the b/m-adjacent bit groups are in error as a result of failures in up to $m$ basic storage modules;

error pattern indicator generating means responsive to said syndromes for generating error pattern indicators for said bits in said data word register means to indicate which error patterns are to be corrected;

corrector means responsive to said error patterns and said group pointers for performing up to m b/m-adjacent bit group error correction;

parity generating means responsive to the information bits corrected by said corrector means for generating byte parity bits for said corrected information bits;

memory data register means for storing translated words comprising said corrected information bits and said byte parity bits;

syndrome pair regenerating means responsive to said corrected information bits in said memory data register means and said corrected check bits from said corrector means for generating a set of self-testable syndrome pairs;

self-testing parity check means responsive to said corrected information bits and said byte parity bits in said memory data register means for providing a set of self-testable pairs of signals;

a first reduction circuit for receiving said set of self-testable pairs of signals from said self-testing parity check means to produce a single pair of self-testable signals capable of detecting any failure occurring between said corrector means and said last-named pair of self-testable signals;

a second reduction circuit responsive to said regenerated syndrome pairs for producing a single pair of self-testable signals, said last-named pair of signals being capable of detecting the more than $m$ $(b/m)$-adjacent errors in the b/m width groups which did not result in a code word or correctable modification of a code word in the input word received by said data word register means and up to four $(b/m)$-adjacent bit groups of miscorrection in the corrected word produced by said corrector means due to failures in said translator;

and means responsive to said regenerated syndrome pairs produced from said corrected check bits for providing check bits to said data word register means during a write cycle.

18. A self-checking translator as defined in claim 17 wherein:

said parity check matrix H has the following form:

Iuformation Bits | Check Bits $$H=\begin{pmatrix} I & I & I & I & \dots & I & I & I & 0 & 0 & 0 \\ A & A\oplus I & A^2 & A^2\oplus I & \dots & A^k & A^k\oplus I & 0 & I & 0 & 0 \\ A^2 & (A\oplus I)^2 & A^4 & (A^2\oplus I)^2 & \dots & A^{2k} & (A^k\oplus I)^2 & 0 & 0 & I & 0 \\ A^3 & (A\oplus I)^3 & A^6 & (A^2\oplus I)^3 & \dots & A^{3k} & (A^k\oplus I)^3 & 0 & 0 & 0 & I \end{pmatrix}$$

wherein $k \leq 2^{b/2}-2$, I is a $b/2 \times b/2$ identity matrix, A is a $b/2 \times b/2$ matrix over GF[2], where GF is Galois Field, whose characteristic polynomial is a primitive polynominal of degree $b/2$, wherein $m = 2$, 2 divides $b$, wherein the number of check bits $= 2b$ and wherein the maximum number of information bits is $b/2(2^{b/2}-2)$, and all columns are distinct.

19. A self-checking translator as defined in claim 18 wherein:

said parity check matrix H is for an 8-bit/basic storage module memory organization with a word having 32 information bits and 16 check bits and has the following form:

|←Information Bits→|←Check Bits→|

$$H=\begin{pmatrix} I & I & I & I & I & I & I & I & I & 0 & 0 & 0 \\ A & A^4 & A^2 & A^8 & A^3 & A^{14} & A_5 & A^{10} & 0 & I & 0 & 0 \\ A^2 & A^8 & A^4 & A & A^6 & A^{13} & A^{10} & A^5 & 0 & 0 & I & 0 \\ A^3 & A^{12} & A^6 & A^9 & A^9 & A^{12} & A & A & 0 & 0 & 0 & I \end{pmatrix}$$

wherein $k = 4$, $m = 2$, I is a $4 \times 4$ identity matrix and A is a $4 \times 4$ matrix over GF [2] where GF is Galois Field, and whose characteristic polynomial is a primitive polynomial of A having the form:

$$A=\begin{bmatrix} 0 & 1 & 0 & 0 \\ 0 & 0 & 1 & 0 \\ 1 & 0 & 0 & 1 \\ 1 & 0 & 0 & 0 \end{bmatrix}$$

said syndrome generator means being arranged such that if $w$ is a word in the data word register means, the corresponding syndrome S is given by the equation $$S = 1\oplus Hw$$

wherein 1 is a $2b\times 1$ matrix of all 1's and $$w=\begin{bmatrix} d_{1,1} \\ \cdot \\ \cdot \\ d_{1,4} \\ \cdot \\ \cdot \\ \cdot \\ d_{12,1} \\ \cdot \\ \cdot \\ d_{12,4} \end{bmatrix}$$

wherein $d_{ij}$ is a bit group in said data word register whereby all syndrome bits are equal to 1 when $w$ is a code word, wherein said error pattern indicators are:

$$e_{11} = A^4\overline{S}_1\oplus\overline{S}_2$$
$$e_{12} = A\overline{S}_1\oplus\overline{S}_2$$
$$e_{21} = A^8\overline{S}_1\oplus\overline{S}_2$$
$$e_{22} = A^2\overline{S}_1\oplus\overline{S}_2$$
$$e_{31} = A^{14}\overline{S}_1\oplus\overline{S}_2$$
$$e_{32} = A^3\overline{S}_1\oplus\overline{S}_2$$
$$e_{41} = A^{10}\overline{S}_1\oplus\overline{S}_2$$
$$e_{42} = A^5\overline{S}_1\oplus\overline{S}_2$$
$$e_{51} = \overline{S}_1$$
$$e_{52} = \overline{S}_2$$
$$e_{61} = \overline{S}_3$$
$$e_{62} = \overline{S}_4$$

said group pointers for said 8 bit/basic storage module memory organization eaving the following forms:

$$G_1 = [\overline{S}_3 = (\overline{S}_2\oplus A^5\overline{S}_1)\Lambda[\overline{S}_4 = (\overline{S}_3\oplus A^5\overline{S}_2)]$$
$$G_2 = [\overline{S}_3 = (\overline{S}_2\oplus A^{10}\overline{S}_1)]\Lambda[\overline{S}_4 = (\overline{S}_3\oplus A^{10}\overline{S}_2)]$$
$$G_3 = [\overline{S}_3 = (\overline{S}_2\oplus A^2\overline{S}_1)]\Lambda[\overline{S}_4 = (\overline{S}_3\oplus A^2\overline{S}_2)]$$
$$G_4 = [\overline{S}_3 = (\overline{S}_2\oplus\overline{S}_1)]\Lambda[\overline{S}_4 = (\overline{S}_3\oplus\overline{S}_2)]$$

$$G_5 = \bigwedge_{i=8}^{16} (\overline{s}_i = 0)$$

$$G_6 = \bigwedge_{i=1}^{8} (\overline{s}_i = 0)$$

20. A self-checking translator as defined in claim 18 wherein said group pointers have the following properties;

a. In code space all of said group pointers $G_{ij} = 1$ and all of said error patterns $e_i = 0$:

b. In single b/2-adjacent bit group error space, exactly one group pointer $G_i = 1$ and either error pattern indicator $e_{i,l} \neq 0$ or $e_{i,2} \neq 0$, and $e_{j,l}\theta$ wherein $j, 1 = \theta \neq i,j\ i,\ ir\ i,2$ are non-zero, c. In single b-adjacent bit group error space, exactly one $G_i = 1$ and all $e_{j,l}$ and $e_{j,2}$ are non-zero, $1 \leq j \leq k+2$.

d. In double b/2-adjacent bit group error space, e.g. $(b/2)$-adjacent errors in two b-adjacent bit groups, all $G_i = 0$.

21. A self-checking translator as defined in claim 18 wherein said corrector means in response to the input thereto of said group pointers and said error patterns effects single b-adjacent bit group correction according to the following equation $$d_{i,l} = d_{i,l} + G_i\, l_{i,l}\ 1 \leq i \leq k+2$$

for the b-adjacent bit group consisting of the b/2 adjacent bit groups i, i + 1 where $$l_{i1} = \begin{bmatrix} e_{i,1} \\ \cdot \\ \cdot \\ \cdot \\ e_{i,b/2} \end{bmatrix}$$

the ith b/2-adjacent bit group.

22. A self-checking translator as defined in claim 18 wherein:

a syndrome S produced by said syndrome generating means is constituted by four b/2-bit vectors $S_1$, $S_2$, $S_3$, $S_4$ wherein $$S = \begin{bmatrix} S_1 \\ S_2 \\ S_3 \\ S_4 \end{bmatrix};\ S_1 = \begin{bmatrix} s_1 \\ \cdot \\ \cdot \\ \cdot \\ s_{b/2} \end{bmatrix},\ S_2 = \begin{bmatrix} s_{(b/2)+1} \\ \cdot \\ \cdot \\ \cdot \\ s_b \end{bmatrix},\ S_3 = \begin{bmatrix} s_{b+1} \\ \cdot \\ \cdot \\ \cdot \\ s_{3b/2} \end{bmatrix},$$

$$S_4 = \begin{bmatrix} s_{(3b/2)+1} \\ \cdot \\ \cdot \\ \cdot \\ S_{2b} \end{bmatrix}$$

wherein $s_i$ is a syndrome bit whereby, if one or both of the b/2-adjacent bit groups $2(i-1)+1$ and $2i$, wherein $2(i-1)+1$ and $2i$ are both in the same $i^{th}$ b-adjacent group of the word w are in error with error patterns $e_{i,1}$ and $e_{i,2}$, respectively, corresponding to columns defined by matrices $A^{k_i}$, $A^{j_i} \oplus I$ then $$\bar{S}_1 = e_{il} \oplus e_{i2}$$

$$\bar{S}_2 = A^{j_i} e_{il} \oplus (A \oplus I) e_{i2}$$

$$\bar{S}_3 = A^{2j_i} e_{il} \oplus (A \oplus I)^2 e_{i2}$$

$$\bar{S}_4 = A^{3j_i} e_{il} \oplus (A \oplus I)^3 e_{i2}$$

wherein $\bar{S}_i$ is a vector whose elements are complements of the elements of the b/2-bit vector $S_i$;

said translator further including means for providing the complements $\bar{S}$ of said syndromes generated by said syndrome generating means whereby error pattern indicator $e_{i,1} = (A^{j_i}+1)\bar{S}_1 \oplus \bar{S}_2$ and error pattern indicator $e_{i2} = A^{j_i}\bar{S}_1 \oplus \bar{S}_2$ and wherein the error patterns indicator for the check bit group are $e_{k+1} = \bar{S}_1$, $e_{k\ \ 2} = \bar{S}_2$, $e_{k+3} = \bar{S}_3$ and $e_{k+4} = \bar{S}_4$ whereby the group pointers for the information bit group, i.e., $G_i$ $i = 1, 2, \ldots, k, k+1, k+2$ where $G_i$ corresponds to two b/2-adjacent groups $2(i-1)+1$, $2i$ with columns defined by $A^{j_i}$, $A^{j_i} + I$ $$G_{ij} = [\bar{S}_3 = (\bar{S}_2 \oplus B S_1)]\Lambda[\bar{S}_4 = (\bar{S}_3 \oplus B\bar{S}_2)] \text{ with } B = A^{j_i}(A^{j_i} \oplus I)$$

and the group pointers for the check bits group are $$G_{k+1'} = \bigwedge_{i=2b}^{4b} \bar{s}_i = 0 \text{ and } G_{k+3'} = \bigwedge_{i=1}^{2b} \bar{s}_i = 0.$$

23. A self-checking translator for translating coded data from a memory organization in a data processing system comprising:

a memory organization which comprises a quantity $k$ of b-bits width basic storage modules for providing $kb$ information bits for a word and a quantity $r$ of b-bits width basic storage modules for providing $rb$ check bits for said word;

means for generating a parity check matrix for a single b-adjacent bit group error correcting double b-adjacent bit group error detection code, said code also having the capability of detecting with a very high probability triple and multiple b-adjacent group errors;

data word register means for receiving and holding the b-width groups of information bits and check bits from said basic storage modules;

syndrome generator means for generating syndromes from the bits in said data word register means according to said parity check matrix;

group pointer generating means responsive to said syndromes for generating group pointers as logical assertions on the syndrome bits of said syndromes, said group pointers indicating which of the b-adjacent bit groups are in error as the results of failures in a single basic storage module;

error pattern indicators generating means responsive to said syndromes for generating error patterns for said bits in said data word register means to indicate which error patterns are to be corrected;

corrector means responsive to said error pattern indicators and said group pointers for performing single b-adjacent group error correction;

parity generating means responsive to the data bits corrected by said corrector means for generating byte parity bits for said corrected information;

memory data register means for storing translated words comprising said corrected information bits and said byte parity bits;

syndrome pair regenerating means responsive to said corrected information bits and said corrected check bits from said corrector means for regenerating a first set of self-testable syndrome pairs from said corrected information bits and a second set of self-testable syndrome pairs from said corrected check bits;

a first reduction circuit responsive to the application thereto of said first said of syndrome pairs for providing a self-testable pair of signals;

a second reduction circuit for having applied thereto said second set of syndrome pairs to produce a second set of self-testable signals;

a third reduction circuit for having applied thereto said first pair of self-teatable signals and said second pair of self-testable signals during a read cycle to produce a final output pair of self-testable signals which can detect up to three groups of miscorrection in the corrected word due to circuit failures in said translator; and means responsive to said second set of the generated syndrome pairs for providing check bits to said data word register means during a write cycle.

24. A self-checking translator as defined in claim 23 wherein:

said parity check matrix has the following form;

$$H=\begin{pmatrix} \multicolumn{6}{c}{\underline{\text{Information Bits}}} & \multicolumn{3}{c}{\underline{\text{Check Bits}}} \\ I & I & I & \ldots I & \ldots I & & I & 0 & 0 \\ I & A & A^2 & \ldots I & \ldots A^k & & 0 & I & 0 \\ I & A^2 & A^4 & \ldots I^{2i} & \ldots A^{2k} & & 0 & 0 & I \end{pmatrix}$$

wherein $k \leq 2^b-2$, I is a $b \times b$ identity matrix, the maximum number of information bits $= b(k+1)$, the number of check bits $= 3b$, A is the $b \times b$ matrix over GF[2] whose characteristic polynomial is a primitive polynomial of degree $b$ and $j$ denotes the number of an adjacent bit group;

said syndrome generator means being arranged such that if $w$ is a word in the data word register means, the corresponding syndrome S is given by the equation $$S = 1 \oplus Hw$$

wherein 1 is a $3b \times 1$ matrix of all 1's and

$$w=\begin{bmatrix} do,\ 1 \\ \cdot \\ \cdot \\ do,\ b \\ \cdot \\ \cdot \\ \cdot \\ d_{k+3,1} \\ \cdot \\ \cdot \\ \cdot \\ d_{k+3,b} \end{bmatrix}$$

whereby all syndrome bits are equal to 1 when $w$ is a code word.

25. A self-checking translator as defined in claim 24 wherein a syndrome S, generated by said syndrome generating means, is constituted by three b-bit vectors S1, S2, S3 wherein:

$$S=\begin{bmatrix} S1 \\ S2 \\ S3 \end{bmatrix};\ S_1=\begin{bmatrix} s_1 \\ \cdot \\ \cdot \\ \cdot \\ s_b \end{bmatrix},\ S_2=\begin{bmatrix} s_{b+1} \\ \cdot \\ \cdot \\ \cdot \\ s_{2b} \end{bmatrix},\ S_3=\begin{bmatrix} s_{2b+1} \\ \cdot \\ \cdot \\ \cdot \\ s_{3b} \end{bmatrix}$$

whereby, if bit group $i$, wherein $i \leq k$, of the word $w$ is in error with error pattern $e$, then $$\overline{S}_1 = e, \overline{S}_2 = A^i e = A^i s_1, \text{ and } \overline{S}_3 = A^{2i} e = A^{2i}\overline{S}_1 = A^i\overline{S}_2$$

wherein $\overline{S}_i$ is a vector whose elements are complements of the elements of the b-bit vector $S_i$;

said translator further including means for providng the complements S of said syndrome generated by said syndrome generating means wereby the group pointers $G_i$ for said data bit groups are $$G_i = [\overline{S}_2 = (A^i\overline{S}_1)\ ] \Lambda [\overline{S}_3 = (A^{2i}\overline{S}_1)]$$

and said group pointers $G_{k+1}$, $G_{k+2}$ and $G_{k+3}$ for said check bit group are $$G_{k+1} = \bigwedge_{1=b}^{3b} (\overline{s}_i = 0)$$

$$G_{k+2} = \bigwedge_{i=b}^{b} (\overline{s}_i = 0) \Lambda \bigwedge_{i=2b}^{3b} (\overline{s}_i = 0)$$

$$G_{k+3} = \bigwedge_{i=1}^{2b} (\overline{s}_i = 0)$$

26. A self-checking translator as defined in claim 25 wherein said group pointers are arranged to have the following properties:

a. In code space, $G_i = 1$ for all $i$, b. In single b-bit group error space, $G_i = 1$ for exactly one $i$.

c. In double b-bit group error space, $G_i = 0$ for all $i$.

27. A self-checking translator as defined in claim 26 wherein said corrector means in response to the input thereto of said group pointers and said error patterns effects the correction of a single b-adjacent bit group error according to the following equations:

$$\hat{d}_{ij} = d_{ij} \oplus G_i S_j \text{ where } 0 \leq i \leq k,\ 1 \leq j \leq b$$

where $d_{ij}$ is the jth bit of the ith group to effect information bits correction and $$\hat{d}_{k+1,j} = d_{k+1,j} \oplus G_{k+1}\overline{s}_j$$

$$\hat{d}_{K+2,j} = d_{k+2,j} \oplus G_{k+2} \cdot \overline{s}_{j+b}$$

$$\hat{d}_{k+3,j} = d_{k+3,j} \oplus G_{k+3} \cdot \overline{s}_{j+2b} \text{ wherein } 1 \leq j \leq b \text{ to effect check bits correction.}$$

28. A self-checking translator as defined in claim 24 wherein said parity check matrix is for a 4-bit/basic storage module memory organization wherein there are provided for said dataword register means 32 information bits and 12 check bits, said matrix having the form $$H=\begin{pmatrix} I & I & I & I & I & I & I & I & I & 0 & 0 \\ I & A & A^2 & A^3 & A^7 & A^8 & A^{13} & A^{14} & 0 & I & 0 \\ I & A^2 & A^4 & A^6 & A^{14} & A & A^{11} & A^{13} & 0 & 0 & I \end{pmatrix}$$

said matrix A having the form $$A=\begin{bmatrix} 0100 \\ 0010 \\ 1001 \\ 1000 \end{bmatrix}$$

* * * * *